March 28, 1950 S. B. WILLIAMS 2,502,360

ELECTRONIC COMPUTER

Filed March 14, 1947 41 Sheets-Sheet 1

INVENTOR
S. B. WILLIAMS
BY [signature]
ATTORNEY

INVENTOR
S. B. WILLIAMS
BY John A. Hall
ATTORNEY

INVENTOR
S. B. WILLIAMS
BY [signature]
ATTORNEY

INVENTOR
S. B. WILLIAMS
BY John A. Hall
ATTORNEY

March 28, 1950 S. B. WILLIAMS 2,502,360

ELECTRONIC COMPUTER

Filed March 14, 1947 41 Sheets-Sheet 5

FOR ADVANCING SUBTRAHEND SYNTHESIZER COUNTERS

FOR ADVANCING RESULT DIGIT COUNTERS

INVENTOR
S. B. WILLIAMS
BY John A. Hall
ATTORNEY

ELECTRONIC COMPUTER

Filed March 14, 1947 41 Sheets-Sheet 6

INVENTOR
S. B. WILLIAMS
BY John A. Hall
ATTORNEY

March 28, 1950 S. B. WILLIAMS 2,502,360

ELECTRONIC COMPUTER

Filed March 14, 1947 41 Sheets-Sheet 7

INVENTOR
S. B. WILLIAMS
BY John A. Hall
ATTORNEY

POSITIVE GENERATOR

INVENTOR
S. B. WILLIAMS
BY John A. Hall
ATTORNEY

March 28, 1950 S. B. WILLIAMS 2,502,360

ELECTRONIC COMPUTER

Filed March 14, 1947 41 Sheets-Sheet 9

INVENTOR
S. B. WILLIAMS
BY John A. Hall
ATTORNEY

March 28, 1950 S. B. WILLIAMS 2,502,360

ELECTRONIC COMPUTER

Filed March 14, 1947 41 Sheets-Sheet 10

INVENTOR
S. B. WILLIAMS
BY John A. Hall
ATTORNEY

March 28, 1950 S. B. WILLIAMS 2,502,360

ELECTRONIC COMPUTER

Filed March 14, 1947 41 Sheets-Sheet 11

INVENTOR
S. B. WILLIAMS
BY John A. Hall
ATTORNEY

March 28, 1950

S. B. WILLIAMS 2,502,360

ELECTRONIC COMPUTER

Filed March 14, 1947

41 Sheets-Sheet 12

INVENTOR
S. B. WILLIAMS
BY John A. Hall
ATTORNEY

INVENTOR
S. B. WILLIAMS
BY [signature]
ATTORNEY

INVENTOR
S. B. WILLIAMS
BY [signature]
ATTORNEY

INVENTOR
S. B. WILLIAMS
BY John C. Hall
ATTORNEY

INVENTOR
S. B. WILLIAMS
BY John A. Hall
ATTORNEY

March 28, 1950 S. B. WILLIAMS 2,502,360

ELECTRONIC COMPUTER

Filed March 14, 1947 41 Sheets-Sheet 17

INVENTOR
S. B. WILLIAMS
BY [signature]
ATTORNEY

March 28, 1950 S. B. WILLIAMS 2,502,360

ELECTRONIC COMPUTER

Filed March 14, 1947 41 Sheets-Sheet 18

INVENTOR
S. B. WILLIAMS
BY John A. Hall
ATTORNEY

March 28, 1950 S. B. WILLIAMS 2,502,360

ELECTRONIC COMPUTER

Filed March 14, 1947 41 Sheets-Sheet 19

INVENTOR
S. B. WILLIAMS
BY John A. Hall
ATTORNEY

March 28, 1950 S. B. WILLIAMS 2,502,360

ELECTRONIC COMPUTER

Filed March 14, 1947 41 Sheets-Sheet 20

INVENTOR
S. B. WILLIAMS
BY [signature]
ATTORNEY

INVENTOR
S. B. WILLIAMS
BY John A. Hall
ATTORNEY

March 28, 1950 — S. B. WILLIAMS — 2,502,360

ELECTRONIC COMPUTER

Filed March 14, 1947 — 41 Sheets-Sheet 22

INVENTOR
S. B. WILLIAMS
BY John A. Hall
ATTORNEY

March 28, 1950 S. B. WILLIAMS 2,502,360

ELECTRONIC COMPUTER

Filed March 14, 1947 41 Sheets-Sheet 23

INVENTOR
S. B. WILLIAMS
BY John A. Hall
ATTORNEY

INVENTOR
S. B. WILLIAMS
BY John A. Hall
ATTORNEY

SYNTHETIC SUBTRAHEND COUNTERS
1ST & 2ND DENOMINATIONAL ORDERS

INVENTOR
S.B. WILLIAMS
BY John A. Hall
ATTORNEY

INVENTOR
S. B. WILLIAMS
BY John A. Hall
ATTORNEY

INVENTORS
S. B. WILLIAMS
BY John A. Hall
ATTORNEY

March 28, 1950

S. B. WILLIAMS

ELECTRONIC COMPUTER 2,502,360

Filed March 14, 1947

41 Sheets-Sheet 28

INVENTOR
S. B. WILLIAMS
BY John A. Hall
ATTORNEY

INVENTOR
S.B. WILLIAMS
BY John A. Hall
ATTORNEY

INVENTOR
S. B. WILLIAMS
BY John A. Hall
ATTORNEY

INVENTOR
S. B. WILLIAMS
BY John A. Hall
ATTORNEY

INVENTOR
S. B. WILLIAMS
BY John A. Hall
ATTORNEY

INVENTOR
S. B. WILLIAMS
BY [signature]
ATTORNEY

March 28, 1950 S. B. WILLIAMS 2,502,360

ELECTRONIC COMPUTER

Filed March 14, 1947 41 Sheets-Sheet 34

INVENTOR
S. B. WILLIAMS
BY John A. Hall
ATTORNEY

March 28, 1950 S. B. WILLIAMS 2,502,360

ELECTRONIC COMPUTER

Filed March 14, 1947 41 Sheets-Sheet 35

INVENTOR
S. B. WILLIAMS
BY John A. Hall
ATTORNEY

March 28, 1950 S. B. WILLIAMS 2,502,360

ELECTRONIC COMPUTER

Filed March 14, 1947 41 Sheets-Sheet 36

INVENTOR
S. B. WILLIAMS
BY John A. Hall
ATTORNEY

INVENTOR
S. B. WILLIAMS
BY John A. Hall
ATTORNEY

INVENTOR
S. B. WILLIAMS
BY John A. Hall
ATTORNEY

March 28, 1950 S. B. WILLIAMS 2,502,360

ELECTRONIC COMPUTER

Filed March 14, 1947 41 Sheets-Sheet 39

INVENTOR
S. B. WILLIAMS
BY John A. Hall
ATTORNEY

March 28, 1950 S. B. WILLIAMS 2,502,360

ELECTRONIC COMPUTER

Filed March 14, 1947 41 Sheets-Sheet 40

INVENTOR
S. B. WILLIAMS
BY John A. Hall
ATTORNEY

March 28, 1950 S. B. WILLIAMS 2,502,360

ELECTRONIC COMPUTER

Filed March 14, 1947 41 Sheets-Sheet 41

INVENTOR
S. B. WILLIAMS
BY John A. Hall
ATTORNEY

Patented Mar. 28, 1950 2,502,360

UNITED STATES PATENT OFFICE 2,502,360

ELECTRONIC COMPUTER

Samuel B. Williams, Brooklyn, N. Y., assignor to Bell Telephone Laboratories, Incorporated, New York, N. Y., a corporation of New York Application March 14, 1947, Serial No. 734,661

10 Claims. (Cl. 235—61)

This is a continuation in part of application Serial No. 454,467, filed August 11, 1942, now abandoned, by Samuel B. Williams.

This invention relates to computers employing electronic devices in electrical networks to perform algebraic operations including addition, subtraction, multiplication, division and root extraction at speeds heretofore unattainable with conventional mechanical, electromechanical and electrical devices.

The object of the invention is to attain high speed in calculation by providing means operating faster than an operator may manipulate the controls thereof.

Another object of the invention is to provide an electronic calculator, one in which all mechanical movement even as small as the movement of a relay armature, with the exception of the mechanism necessary for operator manipulation, is eliminated, and in which dependence for all electrical switching necessary to the performance of the algebraic operations, both for preparation, the calculations and the display of results is placed in electronic means.

In accordance with these objects a switching system of automatically operating dependent circuits controlled by electronic tubes is employed under control of a bank of conventional operator manipulated keys. It is understood that such keying means is by way of example, the invention residing in the use of electronic means for controlling the circuit changes automatically and sequentially performed in carrying out calculations and that any other conventional type of problem entry means may be employed.

Further in accordance with these objects the system provided consists of an assembly of vacuum tubes in an extensive circuit arrangement whereby the operation of the tubes in a sequence of circuit changes is interdependent, that is the operation of one tube leading to and controlling the operation or quenching of others.

More specifically the device employs vacuum tubes of the type known as trigger tubes, that is, tubes which may be triggered on or triggered off and which having been triggered on will remain in operation indefinitely until definitely triggered off.

More specifically a device is provided employing a high vacuum electronic device known as a secondary emission trigger tube. This device in an appropriate electrical network will produce counting and control pulses at speeds far in excess of those attained by conventional gaseous discharge devices or the like.

The device is based on the use of these trigger tubes in various combinations of open chain and closed ring counting arrangements responsive to trains of serially related pulses for performing essential operations of the device such as the generation of pulses, representation of numbers, registration, transfer and storage of numbers, counting and various other functions heretofore performed by other means.

A feature of the invention is the production of positive and negative electrical control potentials and pulses, derived from secondary emission trigger tube circuits, for controlling the various operations of priming, firing and extinguishing other such tubes for the switching operations necessary in the operation of the device. The operation of the device is essentially a series of dependent switching operations wherein the successful completion of a first operation is signaled by an action which starts a second operation. Generally, such a signal consists of an individual, discrete, positive electrical pulse of steep wave front and short duration which may be transmitted to one or more tubes for any one of several purposes. In counting operations the tubes are arranged in open chains or in closed rings in circuits wherein the firing of one tube automatically primes or prepares for operation the next succeeding tube and extinguishes the last preceding tube.

Another feature of the invention is the provision of a pulse generator comprising a group of ten tubes associated with selective keying means for selecting a particular tube of the group corresponding to its digital order and firing it to constitute a digital representation.

Another feature of the device is a pulse generator which after being started will automatically operate throughout a complete cycle during which it will sequentially transmit a pulse over each of ten digital paths representing the digits 0 to 9, inclusive.

Another feature of the invention is a pulse generator which simultaneously transmits a series of digital pulses and a series of complemental digital pulses by means of which a registered number may be read out in its true form or inverted and read out as the complement thereof. In accordance with this feature there is provided what may be termed a positive generator and a negative generator both working into the same pulse transmission circuit but subject to separate and selective energization. The operation of the generator consists of the selection of the positive or the negative portion thereof followed by the transmission of a start signal.

Another feature of the invention is a non-interference circuit whereby, after the receipt of a start signal another start signal, erroneous or otherwise, may be rendered ineffective to interfere with the action of the generator and whereby the generator will continue in operation and complete its full cycle. There is also provided a stop signal path whereby the generator may be stopped at any point in its operation and returned to the starting condition.

Another feature of the invention is a pulse generator which will rapidly and successively transmit a pulse over each of ten circuits to represent the ten digits. By synchronizing the operation of the tubes of a register with the output of this generator a selective setting of the register may be accomplished.

Another feature of the invention is the splitting of the output of such a pulse generator into two circuits, one for priming a tube, and the other for firing a primed tube. Having thus two circuits for the selective firing of a tube, a sign circuit may be used which will give the proper result when the signs of the two factors in a computation are used. This will be readily understood when it is noted that in multiplication, the sign of the product is plus when the signs of the multiplicand and multiplier are alike and minus when they are different.

Another feature of the invention is the use of two generators, one known as a plus generator, and the other known as the minus generator. Both generators will transmit firing pulses in the order 0 to 9 and the positive generator will transmit priming pulses in the same order but the negative generator will transmit priming pulses in the reverse order. By placing inverting tubes in the paths of the firing pulses so that the inverse (the nine's complement) value pulse is rendered effective the four combinations of signs where two factors are used may be represented and employed.

Another feature of the invention is a sign circuit responsive to the signs of entered factors for controlling the display of the result and the method of calculation. In accordance with this feature, where the combination of the signs of the entered factors determines a positive result then the principal factor is entered in the calculator as a positive number and where such combination determines a negative result then the principal factor is entered in the calculator as a negative number or as the complement thereof. The principal factor means the operand such as the multiplicand in multiplication, or the dividend in division. In accordance with this feature, multiplication leading to a positive product and performed by the iterative addition of the multiplicand in accordance with the value of the multiplier but regardless of the individual signs of the multiplicand and the multiplier will be spoken of as multiplication, where multiplication leading to a negative product and performed by the iterative addition of the complement of the multiplicand in accordance with the value of the multiplier but regardless of the individual signs of the multiplicand and the multiplier will be spoken of as inverted multiplication.

A feature of the invention is therefore a calculating device controlled in its method of operation by the combinations of the signs of entered factors in which the factors are treated in calculation as numbers without signs. A feature of the invention may be stated as a device in which all factors regardless of sign are entered as positive numbers and in which the results of computation are invariably displayed or recorded as positive numbers accompanied or characterized by signs independently determined or calculated.

Another feature of the invention is an inverting arrangement whereby the tube representing the nine's complement of a digit may be fired in response to the registration of the digit.

Another feature of the invention is an electronic register comprising an open chain of trigger tubes adapted to register and store representations of digits.

Another feature of the invention is an electronic accumulator comprising a closed ring of trigger tubes associated with an open chain of similar tubes acting as a register. The passage of a definite number of positive electrical pulses corresponding to a digit registered in the open chain to the closed ring comprises an act of accumulation. Here a pulse is passed from the chain to advance the ring. The advance of the ring results in a pulse now transmitted to the chain and this series of dependent operations continues until the open chain has been exhausted whereby a number expressed on the register is transferred to the accumulator and expressed thereon as the number or the sum of that number and any other number previously represented thereon.

Another feature of the invention is an accumulator consisting of an open chain and a closed ring in a mutual control circuit. Each has a common firing circuit and each has a common output circuit into which the tubes of each as they are fired transmit a pulse. With the output of each connected to the input or common firing circuit of the other it will be seen that as soon as a tube of the open chain is fired (by selective operation) there will be a series of exchanges, the chain advancing the ring and the ring in turn advancing the chain until the capacity of the chain has been exhausted whereupon the automatic action stops leaving the ring advanced a number of steps equal to the number of steps taken by the chain in running out. If the chain is arranged to run out backwards and the ring is run forward, then the chain will count out from a selected value to zero and a value equal to the selected value will be accumulated by the ring.

In the present disclosure four such accumulators are shown, one for each decimal denominational order of a four-digit number. Appropriate carry means between such denominational values are provided.

Another feature of the invention is the provision, in an electronic accumulator consisting of several decimal denominational orders, of means for making carries from one accumulator order to a next higher order when said one accumulator order passes through a point where the number to be represented becomes a two-digit number.

Another feature of the invention is a means for temporarily storing a carry until an accumulator to which such carry is to be transmitted is ready to accept it.

Another feature of the invention is a counting means consisting of an open chain of trigger tubes for controlling the number of times a multiplicand is added in accordance with the value of a multiplier digit.

Another feature of the invention is the use of a trigger tube as a circuit closer whereby switching operations may be carried out in a manner equivalent to conventional systems. In accordance with this feature, the tube may be fired at any convenient time to effectively close a circuit which may thereafter be used for the transmission of pulses for any given purposes. A circuit thus closed is termed an electronic circuit.

Another feature of the invention is a means for selectively operating any one of the tubes of a series arranged in an open chain which consists of sequentially applying the pulses of a train of pulses to all the said tubes in common and then applying a particular one of said pulses to a selected one of said tubes as a priming pulse whereby the said selected tube is simultaneously primed and affected by a said particular one of said pulses, and caused to respond thereto.

By the use of such an arrangement the inversion of a digital value into its nine's complement so that a number registered at one point in its natural form may be inverted in transfer to another point is determined by the use of the negative generator. By using another series of tubes as the means for transmitting a firing pulse to the tubes of a chain in common and priming the tubes of the chain from the negative generator a digit registered in said other series of tubes will cause the tube in said chain representing the complement thereof to be simultaneously primed and affected and therefore fired. A feature of the invention is therefore a means for registering the nine's complement of a digit by simultaneously applying to its complemental register a digital pulse and a complemental pulse.

Another feature of the invention is an arrangement of memory tubes whereby the sign of an intermediate result may be registered and finally reported unless changed during the calculation of further intermediate results. By the use of these memory tubes the sign of the final result is known and its registration may be used to control a final result sign display.

Another feature of the invention is a means for invariably displaying a final result in its true form regardless of the manner in which it has been calculated or the character of its sign. In accordance with this feature the memory tubes are employed as a controlling means. If the memory tubes report the final result to be positive this is an indication that such result stands on the accumulators in its true form and it is therefore transferred without change to the display means. If, on the other hand, the memory tubes report the final result to be negative this is an indication that such result stands on the accumulators in the form of a complement and it is therefore inverted in transfer to the display means so that it may be displayed in its true form accompanied by a minus sign.

A feature of the invention is a means for synthesizing a series of subtrahends for use in the step-by-step diminishing of the number whose square root is being extracted. The method of square root extraction practiced in the calculator of the present invention depends on the use of a series of odd numbers. During the calculation of the first root digit, the series 1, 3, 5, 7, 9 and so forth is used. When the first or the first two digits of the square are exhausted the number of subtractions is a count of the first root digit. Thereafter another series of subtrahends is synthesized, consisting of the last used subtrahend of the previous series increased by one to which as a lower decimal order this series 1, 3, 5, 7, 9 and so forth is appended. Thus in extracting the square root of 489, by way of example, there will be a first series of subtrahends 1 and 3, a second series of subtrahends 41 and 43, a third series of subtrahends 441, a fourth series of subtrahends 4421, a fifth series of subtrahends 44221, 44223, 44225, a sixth series of subtrahends 442261, 442263 and so on. In accordance with this feature a counter is used for each decimal denominational order of the synthetic subtrahend (with an extra higher order to register the tens digit of the numbers of the first series when that series extends into the numbers 11, 13, 15, 17 and so on). The usual carry arrangements are provided and a special means to add one to the last valid subtrahend employed in a series is used. In actual practice since another number of the series is actually used to produce an overdraft this last means takes the form of subtracting one from the subtrahend which caused the overdraft. The desired root is always the count of the number of valid subtrahends used (22.113 etc. in the example cited).

Another feature of the invention is a special form of closed ring device. This special form consists of a digital array of tubes arranged in a circuit whereby each odd numbered tube in operation primes the next higher odd numbered tube and the next lower even numbered tube and whereby each even numbered tube primes the next higher odd numbered tube. The odd numbered tubes have a common firing circuit and the even numbered tubes have a separate common firing circuit. By applying a train of pulses to the common firing circuit of the odd numbered tubes the series 1, 3, 5, 7, etc. values may be registered. If then a single pulse is applied to the common firing circuit for the even numbered tubes then the next lower even numbered tube may be fired. Thus if the last odd numbered tube fired is 5, the application of a pulse to the common firing circuit of the even numbered tubes will fire the number 4 tube. When, later, during the operation of the next subtrahend counter a two-digit number is produced, a carry pulse will be applied to the common firing circuit of the odd numbered tubes whereupon the number 5 tube will be fired.

Another feature of the invention is what is popularly known as a "flip-flop" arrangement. This consists of a combination of four tubes to perform the functions of a double-pole double-throw switch. In the arrangement herein disclosed several of these combinations are employed. The first is in the sign circuit where of the four tubes two are operated to indicate a positive divisor (by way of example) and the other two are operated to indicate a negative divisor.

By connecting the plus dividend wire to one tube of each said pair and the minus dividend wire to the other tube of each said wire an electronic circuit may be set up to a plus quotient wire or a minus quotient wire in strict accordance with the mathematical combination of the signs of the two factors.

Another of these flip-flop arrangements is provided to control the shifting from one digit counter to another in the calculation of quotients and roots. In division (and in square root) the dividend is iteratively diminished by using the divisor as a subtrahend (the complement of the divisor is actually used as an addend). As long as the subtraction of the divisor does not exhaust the dividend a positive remainder is produced. In carrying out this operation by pencil and paper the operator will at once recognize the condition where an additional subtraction of this kind would not be possible but where the operation is carried out by a device without intelligence the trials are continued until an overdraft is produced and this overdraft is signaled by the production of a negative remainder whereupon this is restored by now using the divisor once as a true addend and thus producing a positive remainder. Thus the signal to shift to the calculation of another quotient digit consists of the production of a minus sign followed by a plus sign all after a series of plus signs.

In inverted division the order is changed. There is a series of minus signs followed by a single plus sign and in turn another single minus sign. The "flip-flop" is used to translate either of these series into a first series of pulses over what might be termed a primary electronic circuit followed by a single pulse over a secondary electronic circuit and lastly a single pulse over the primary circuit. A tube is provided to extend the primary electronic circuit but cannot do this until the tube is fired, hence the first series of pulses are not employed. When the change in sign occurs then this tube is fired and upon the occurrence of the last pulse the signal to shift will be given over the said extended electronic circuit.

Another of these "flip-flop" arrangements is used in a similar manner to control the shift to another root subtrahend synthesizer.

A feature of the invention may then be described as a means responsive to a change in sign to discriminate between the signals in a series of signals and to thereby signal a change in routine operations. So long as the nature of the signals in this first series remains unchanged the routine of operations remains unchanged but as soon as the sign changes then an automatic change in routine takes place.

Another feature of the invention is a combination of shift tubes for establishing electronic circuits between the entry registers and the accumulator registers. As the numbers are shifted or as the correspondence between the decimal denominational orders of the entry registers and the decimal denominational orders of the accumulator registers is changed a different set of shift tubes is made operative. There is thus one set of shift tubes for each arrangement by which the number registered in the entry tubes is transferred to the accumulator registers. One tube of each set is used as a control tube for controlling the others of each set and these control tubes are arranged in an open chain and subjected to the signals transmitted at the completion of each algebraic operation, by way of example, the completion of each series of iterative additions in multiplication. An additional tube in this chain fired after the complete use of the last multiplier digit will signal the completion of the problem and will constitute a signal to print or display.

Other features will appear hereinafter.

The drawings consist of forty-one sheets, having fory-nine figures, as follows.

Figure 12:
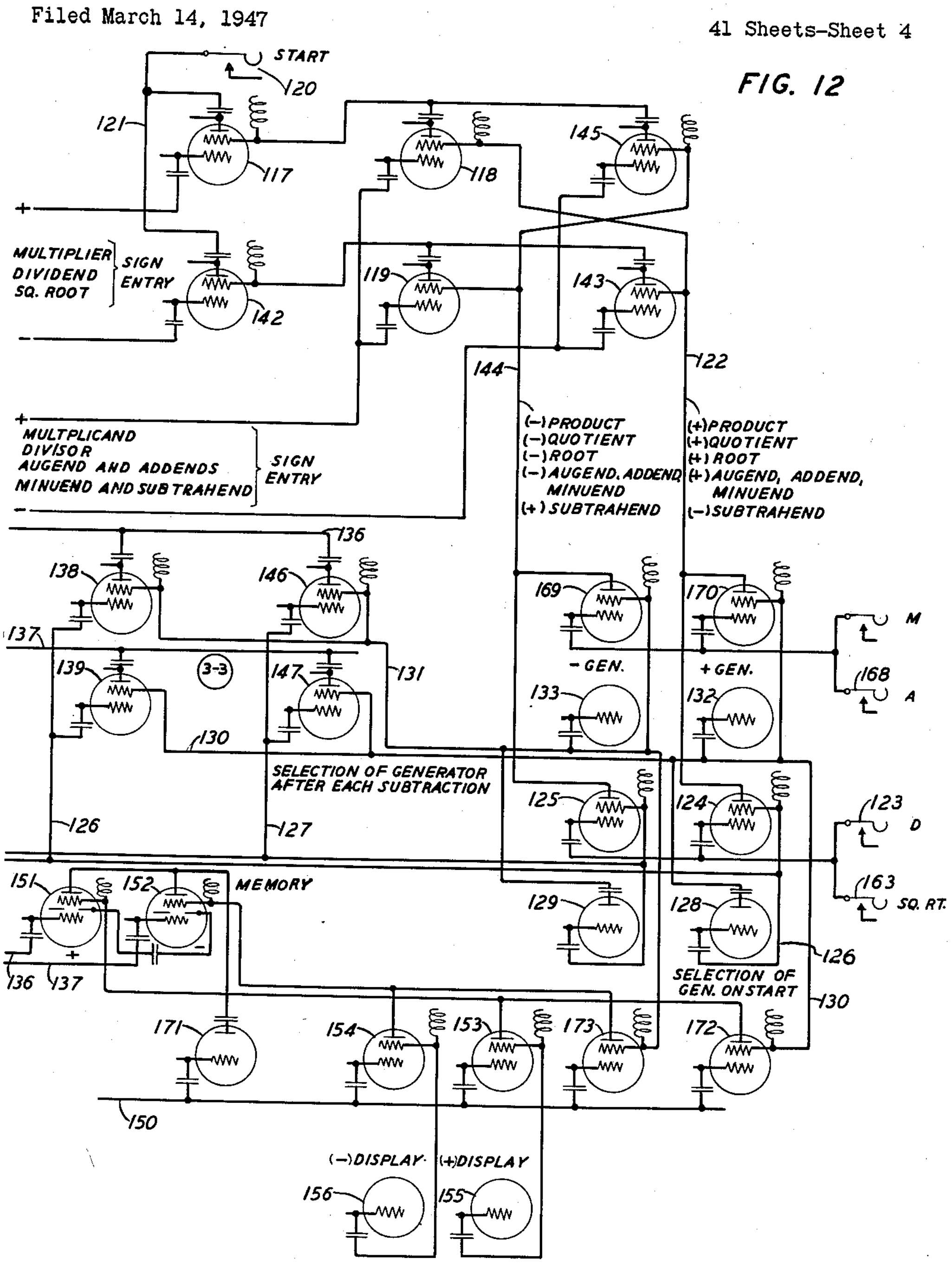
Figure 13:
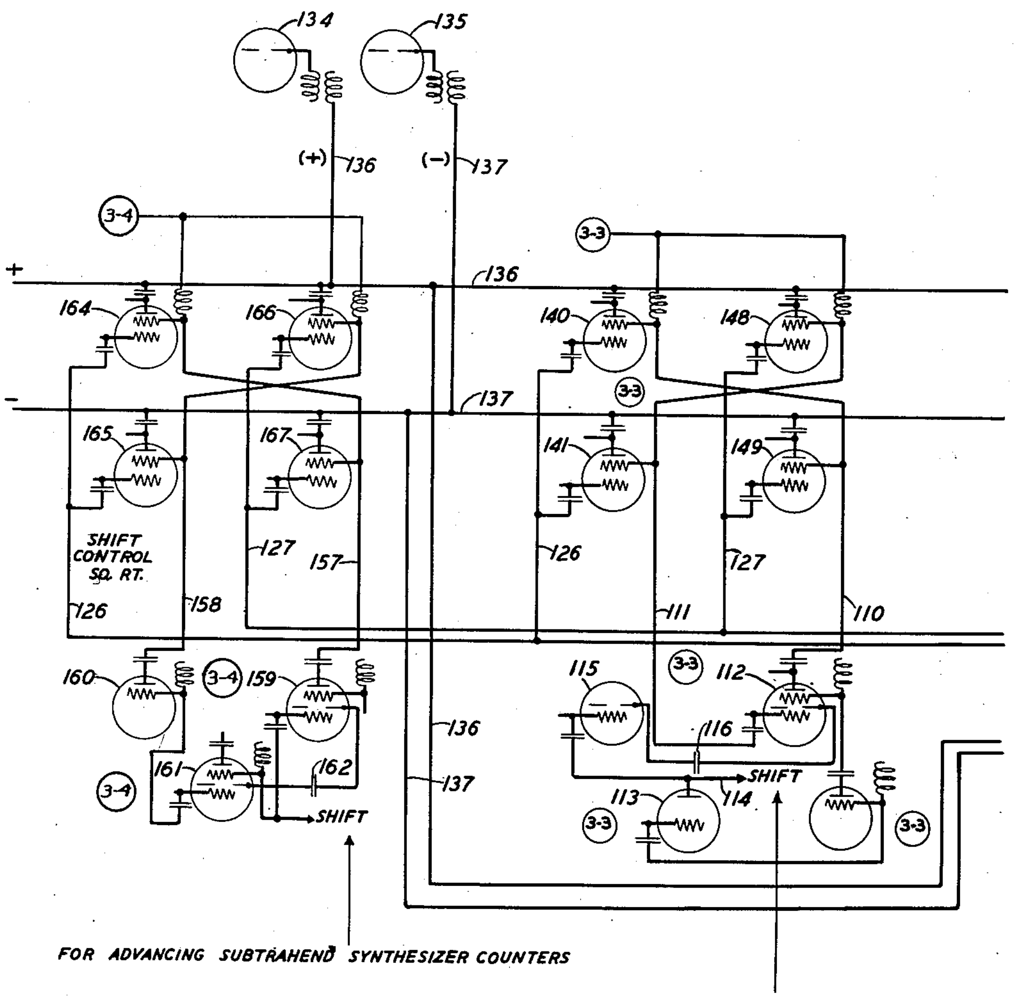
Figure 14:
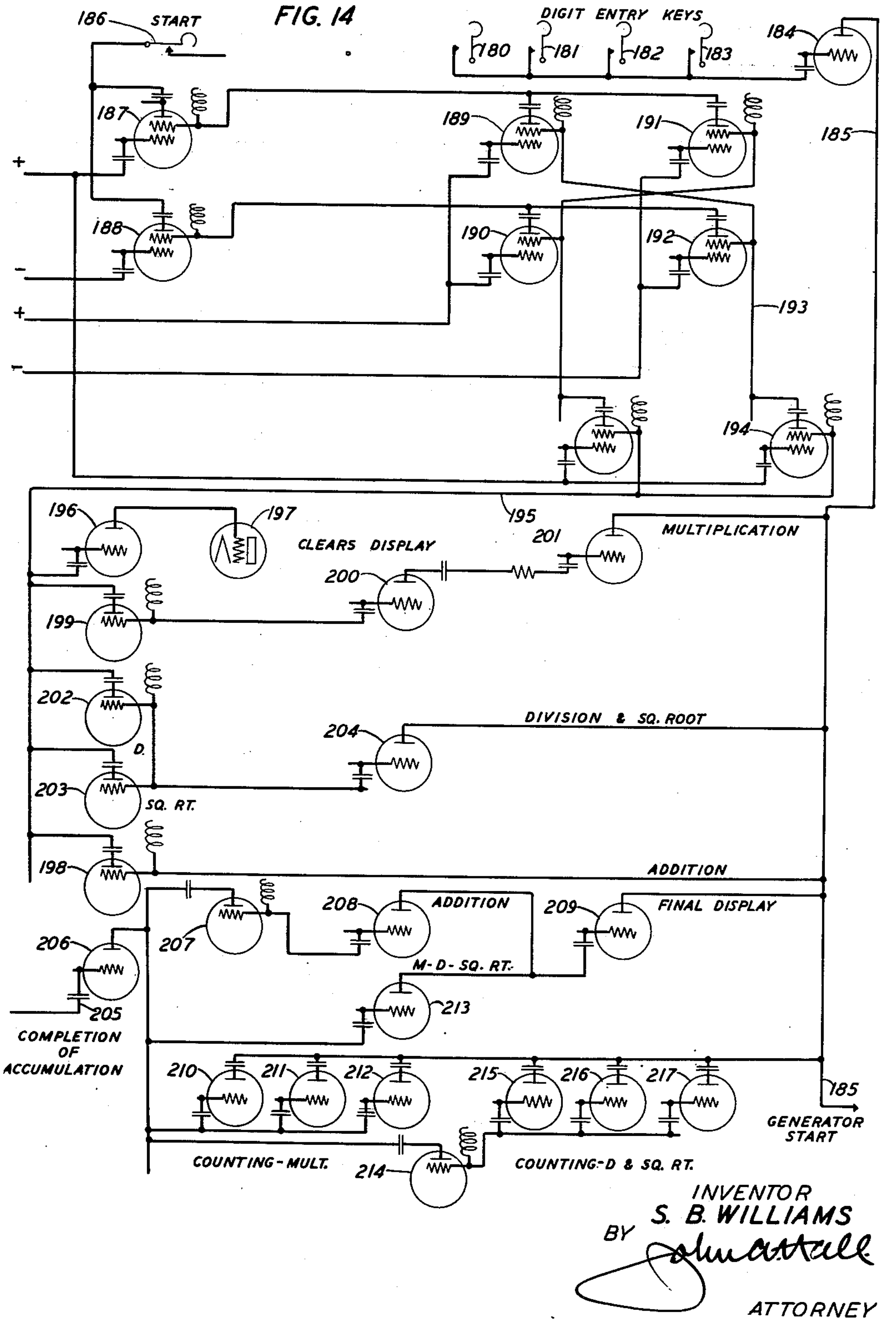
Figure 15:
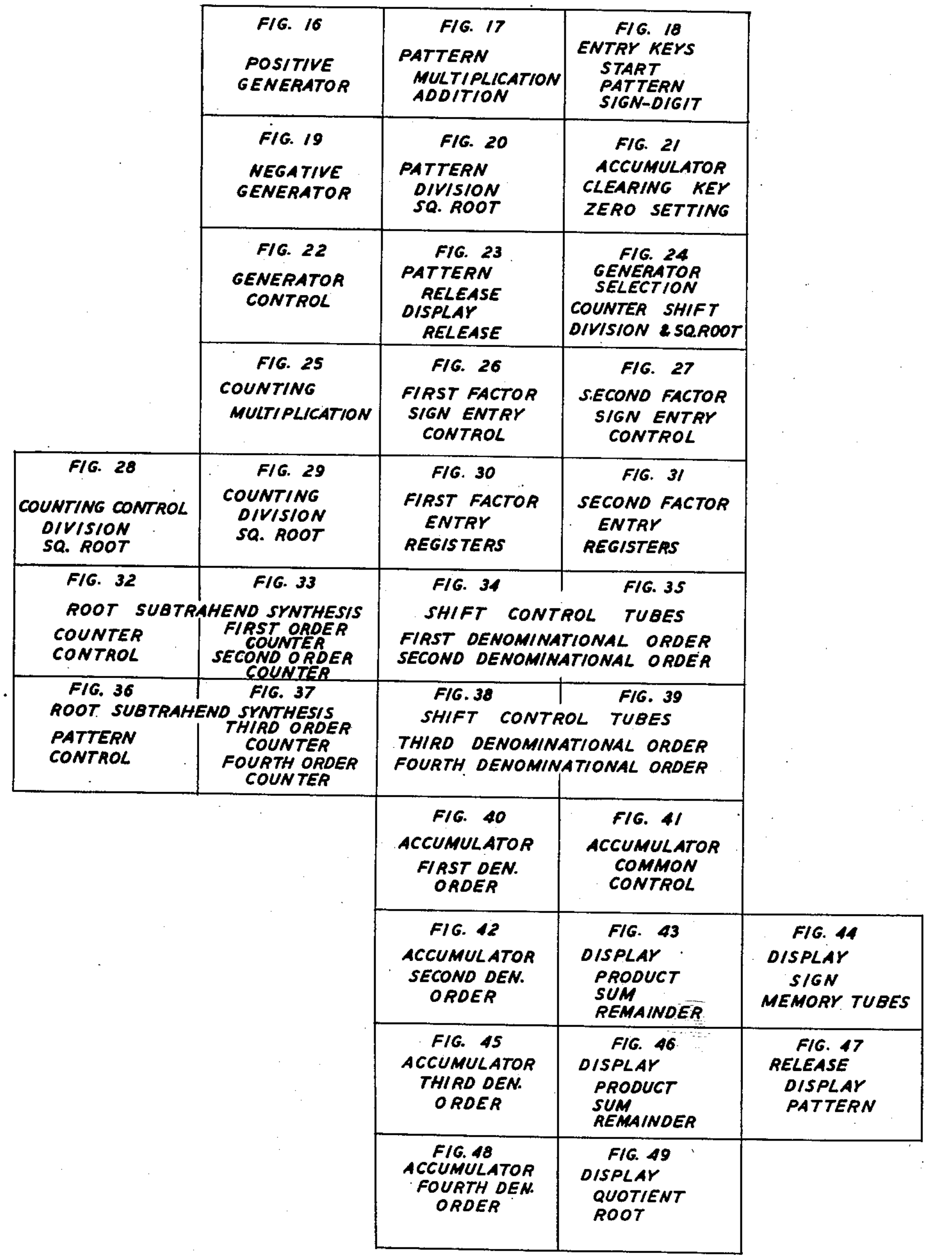
Figure 16:
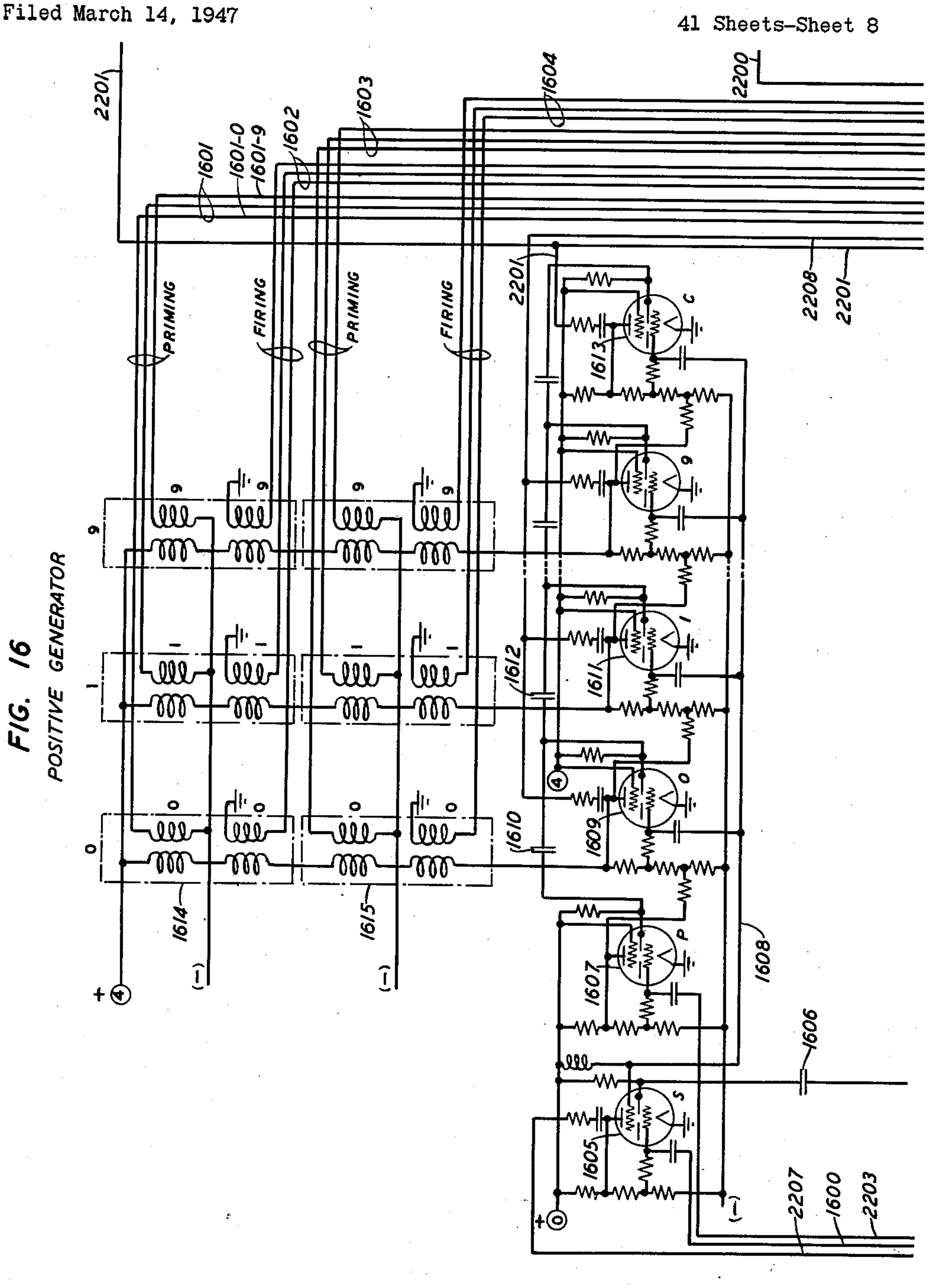
Figure 17:
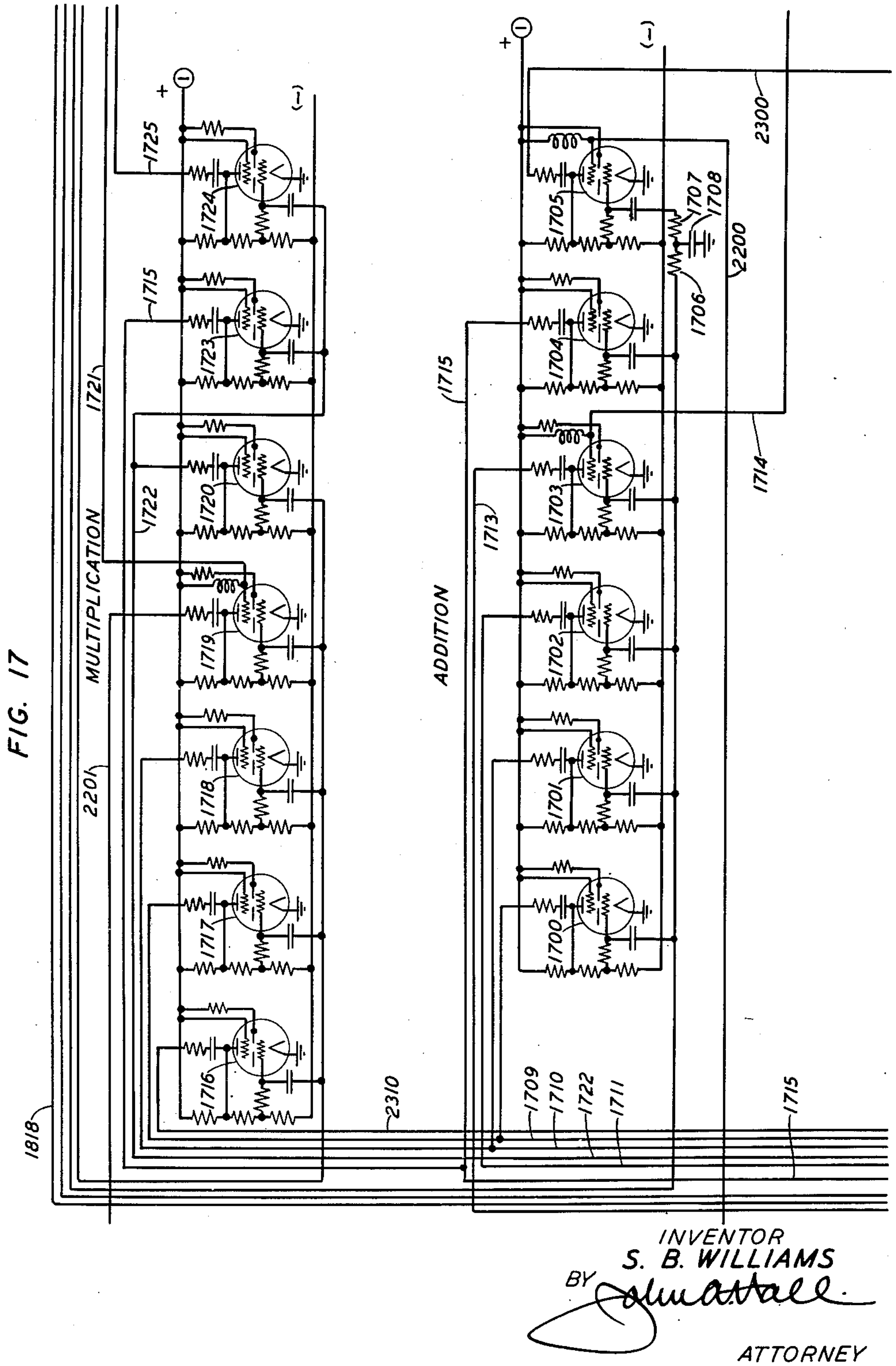
Figure 18:
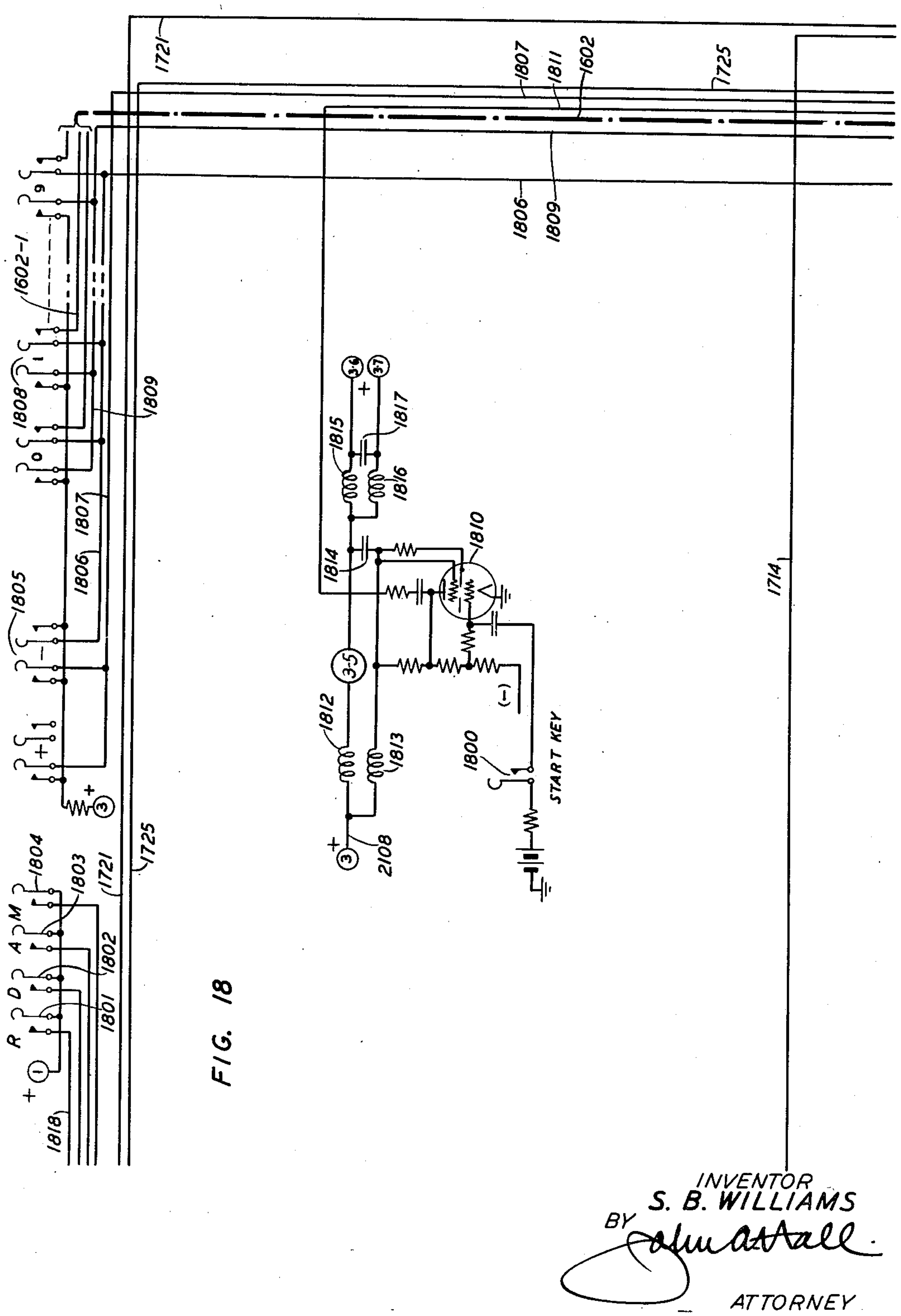
Figure 19:
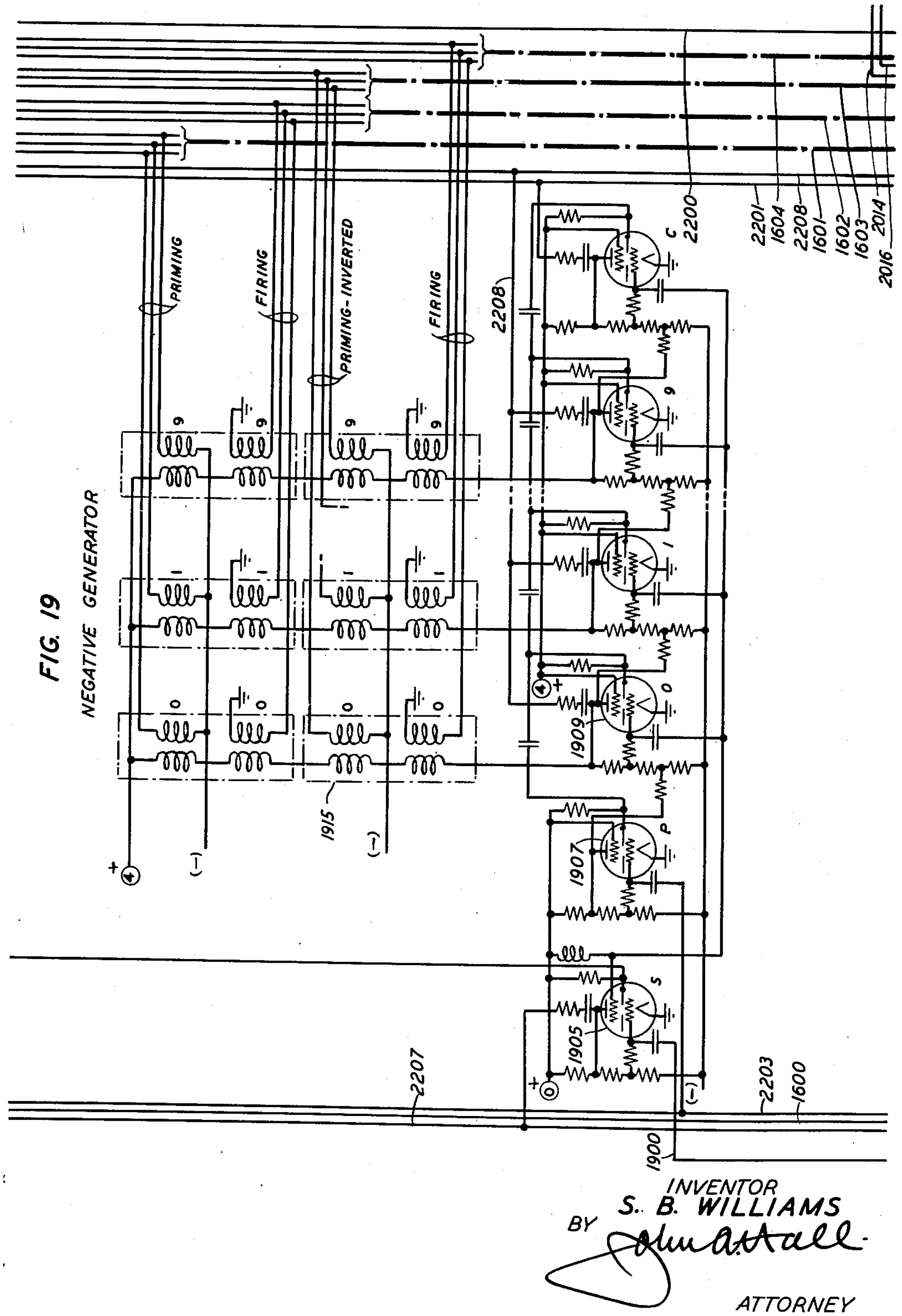
Figure 20:
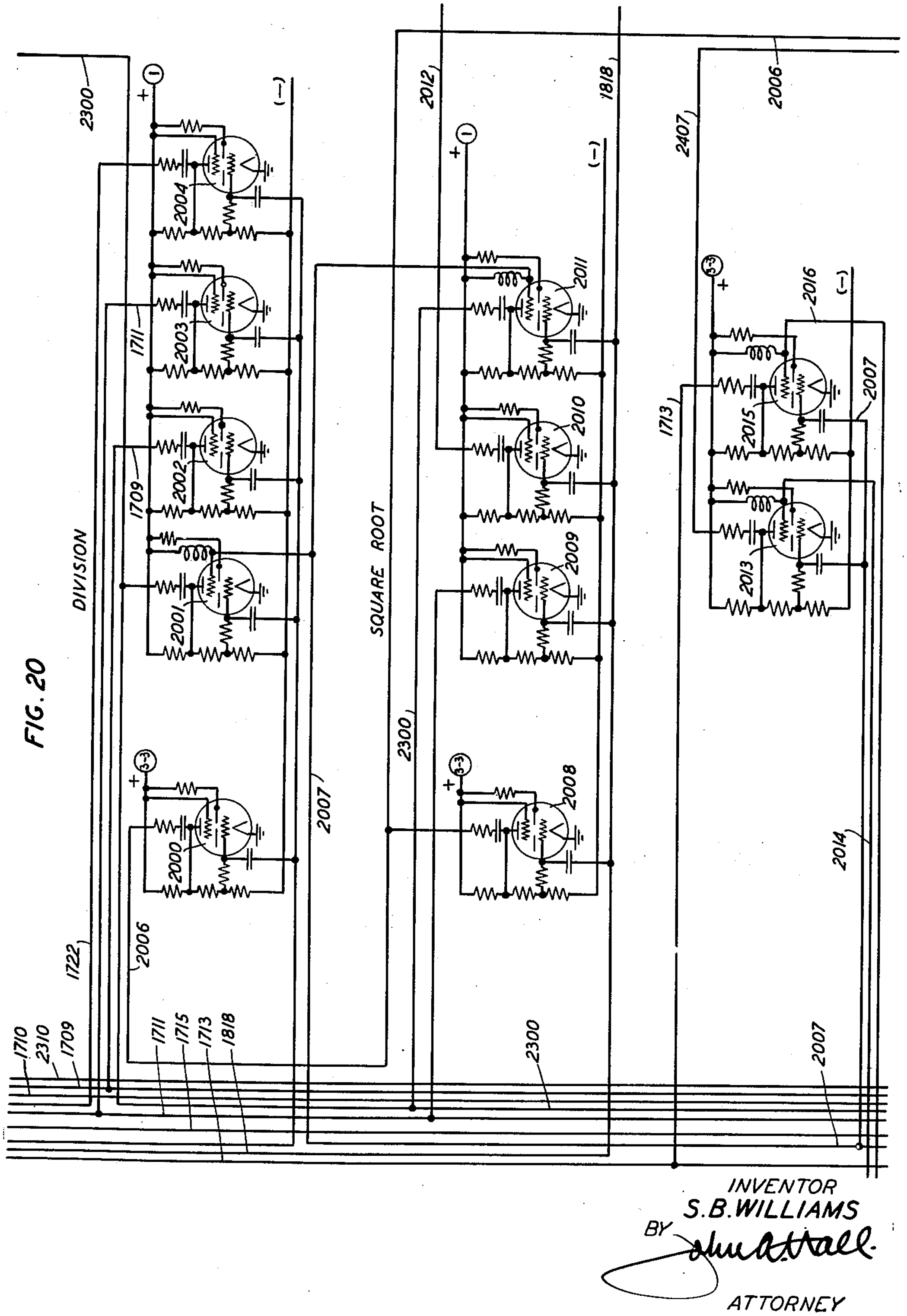
Figure 21:
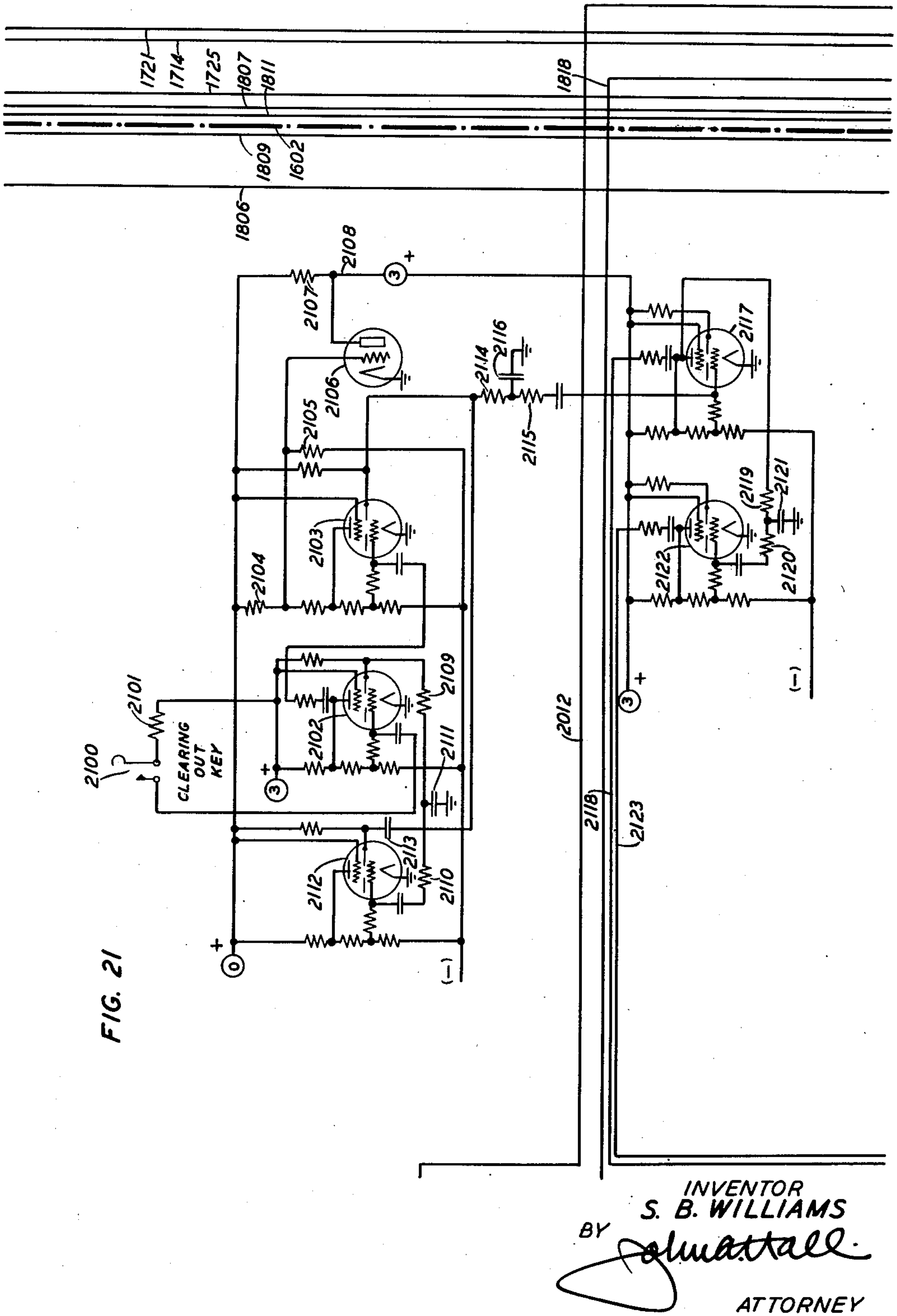
Figure 22:
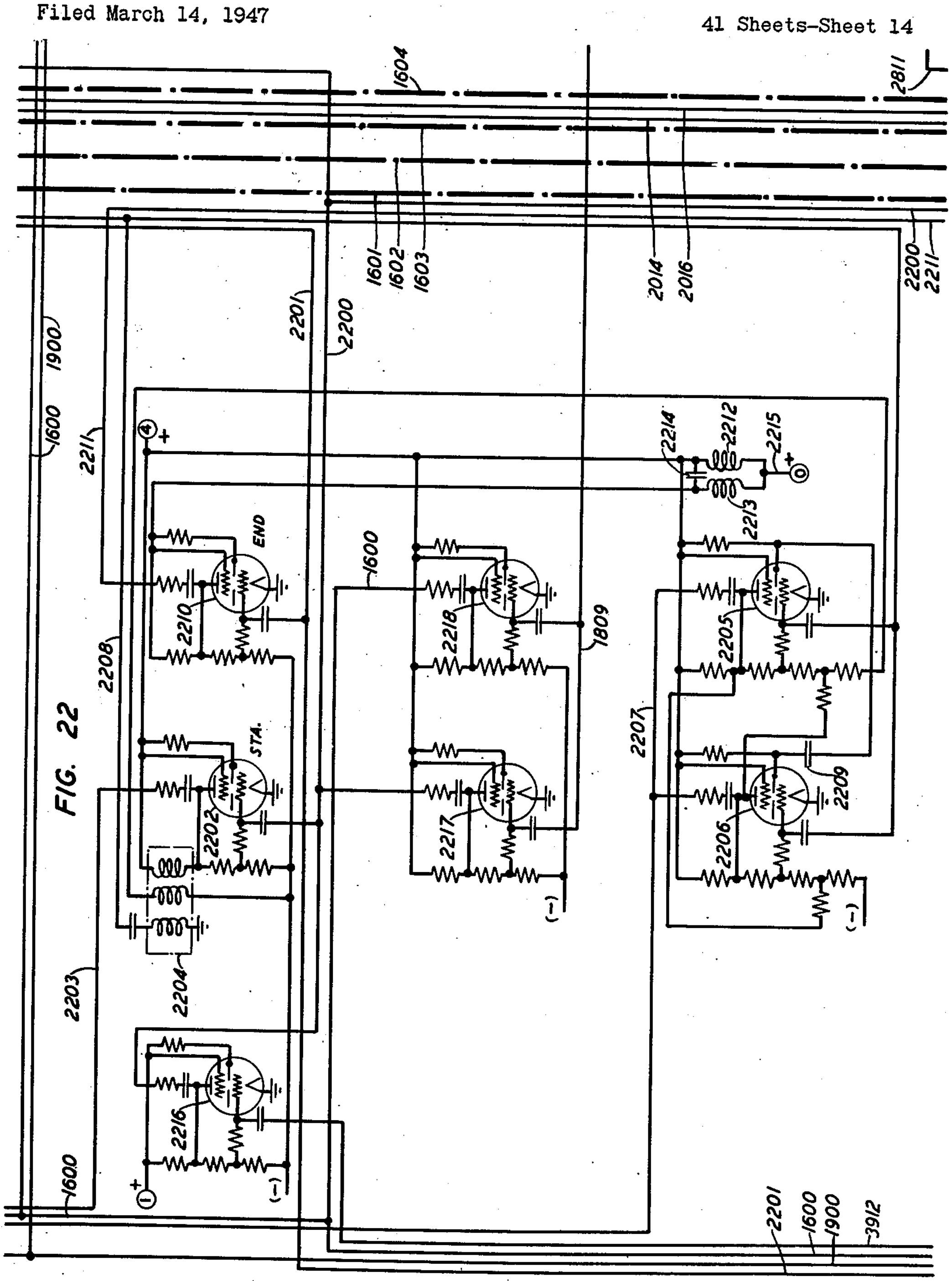
Figure 23:
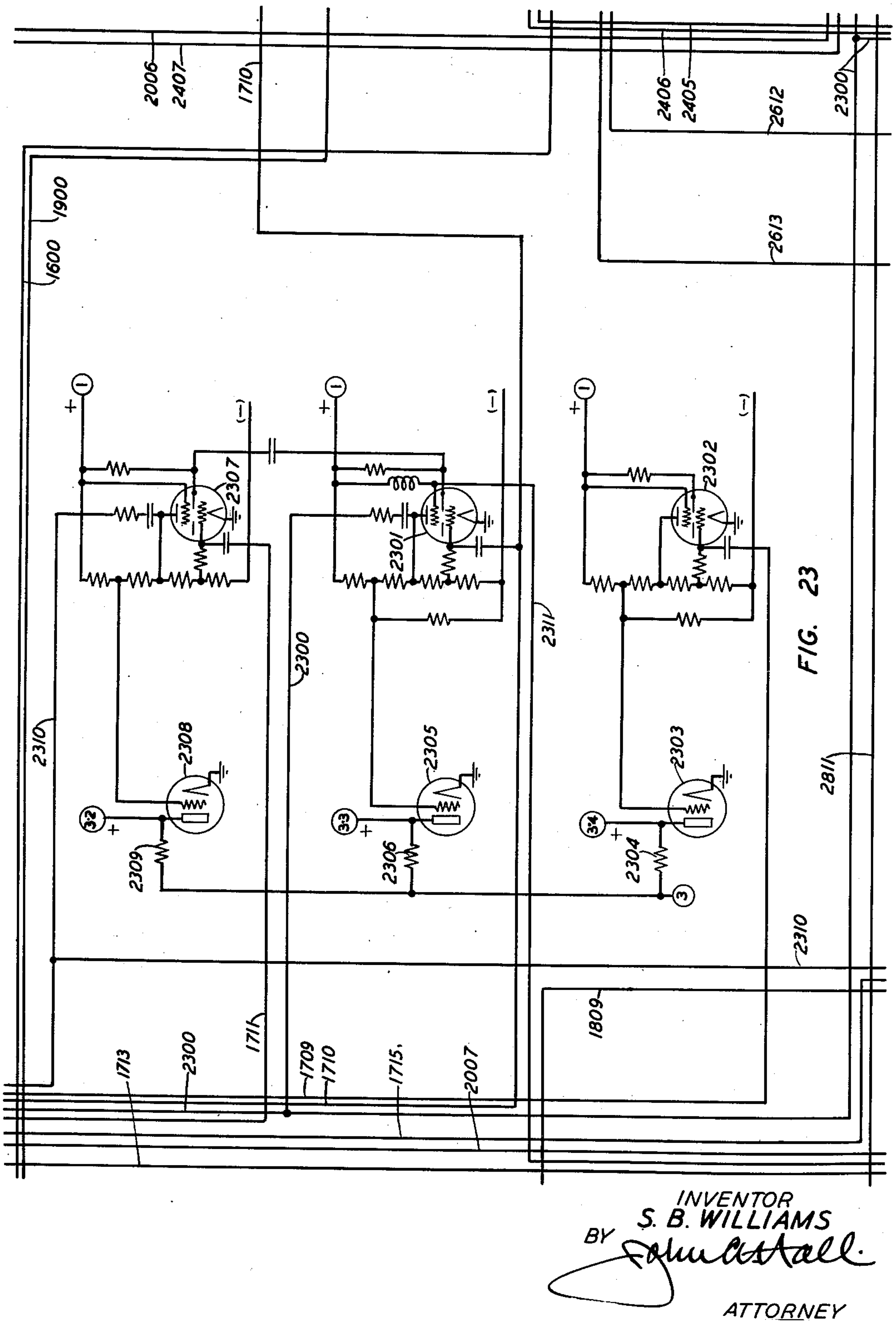
Figure 24:
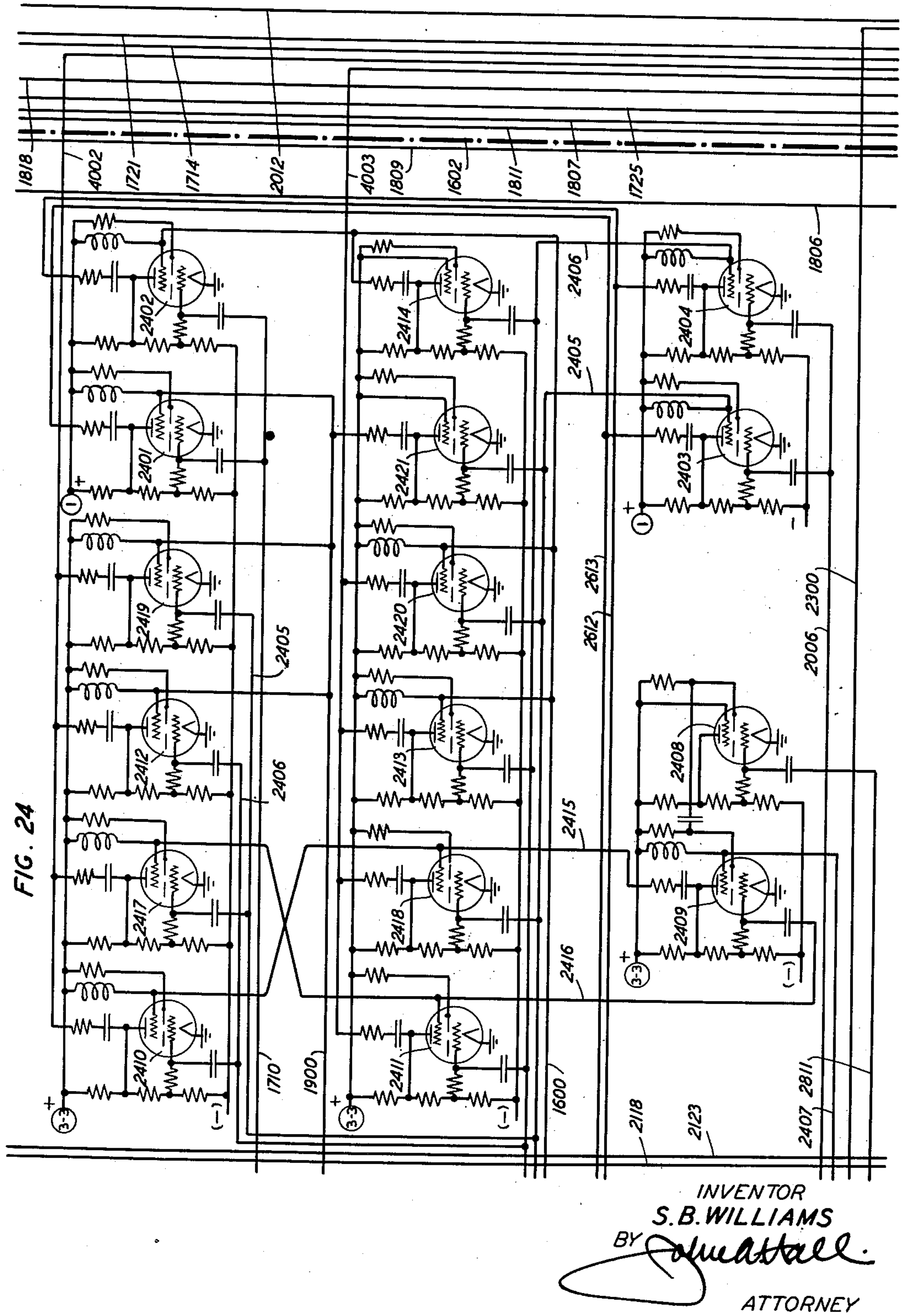
Figure 25:
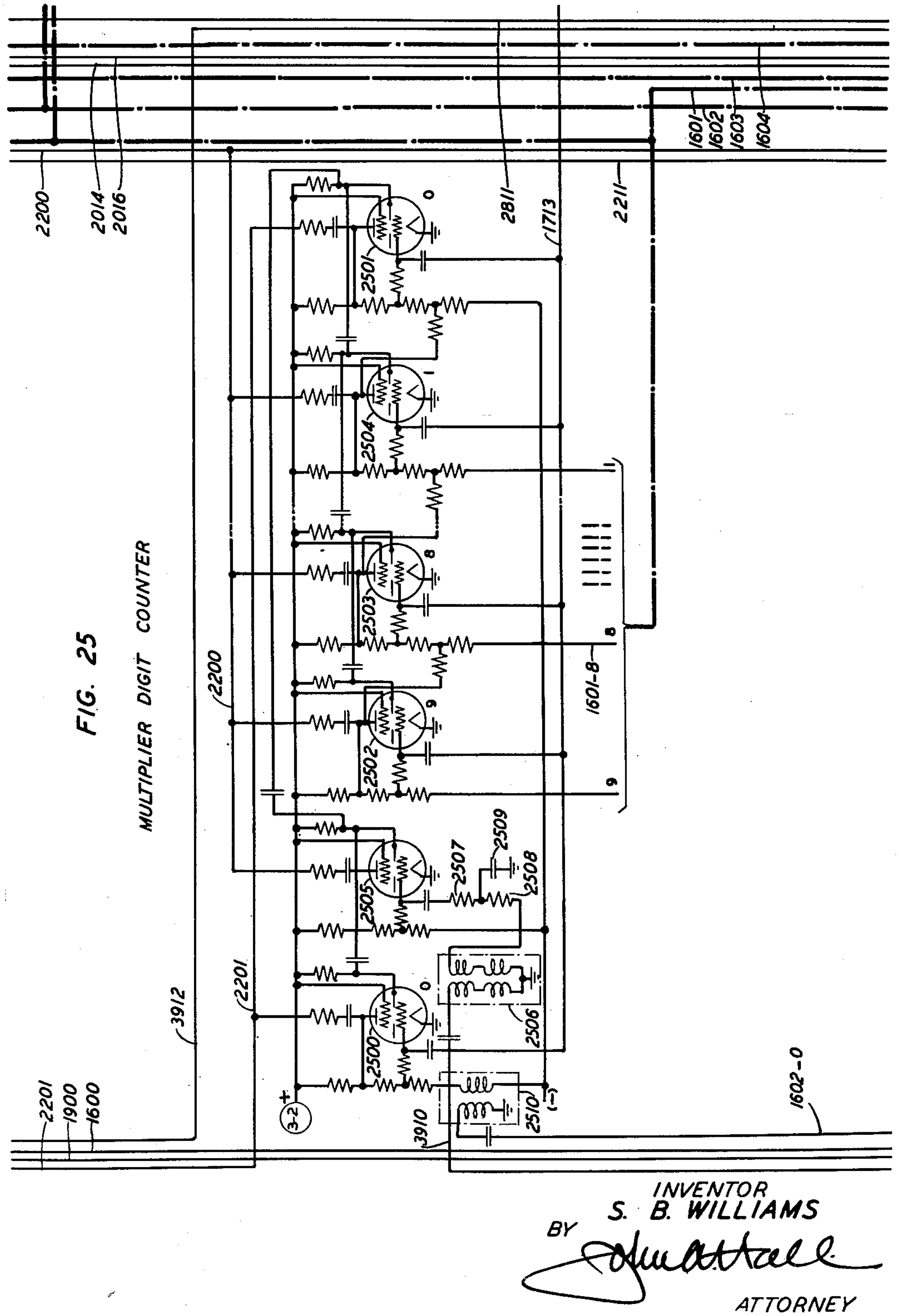
Figure 26:
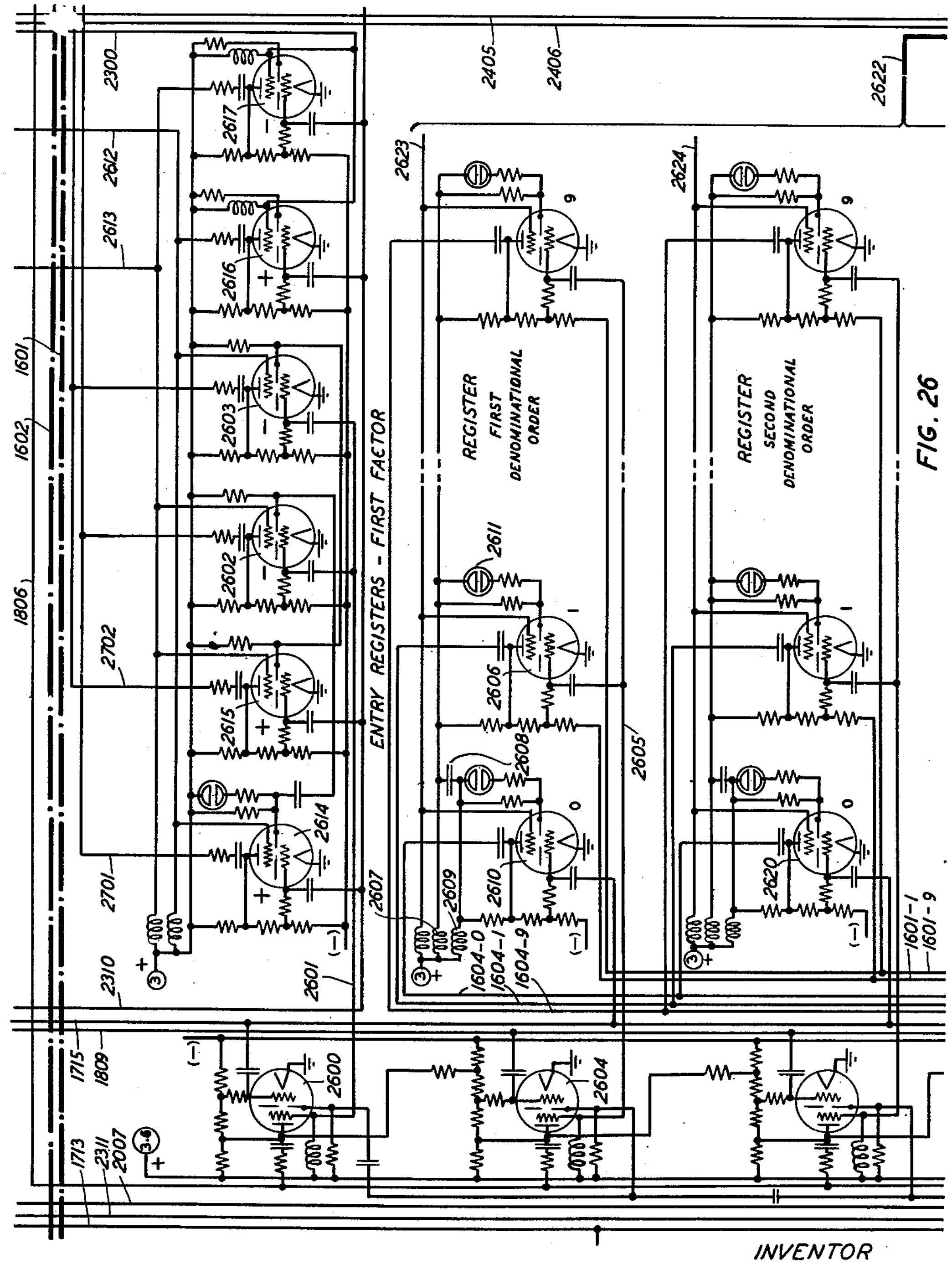
Figure 27:
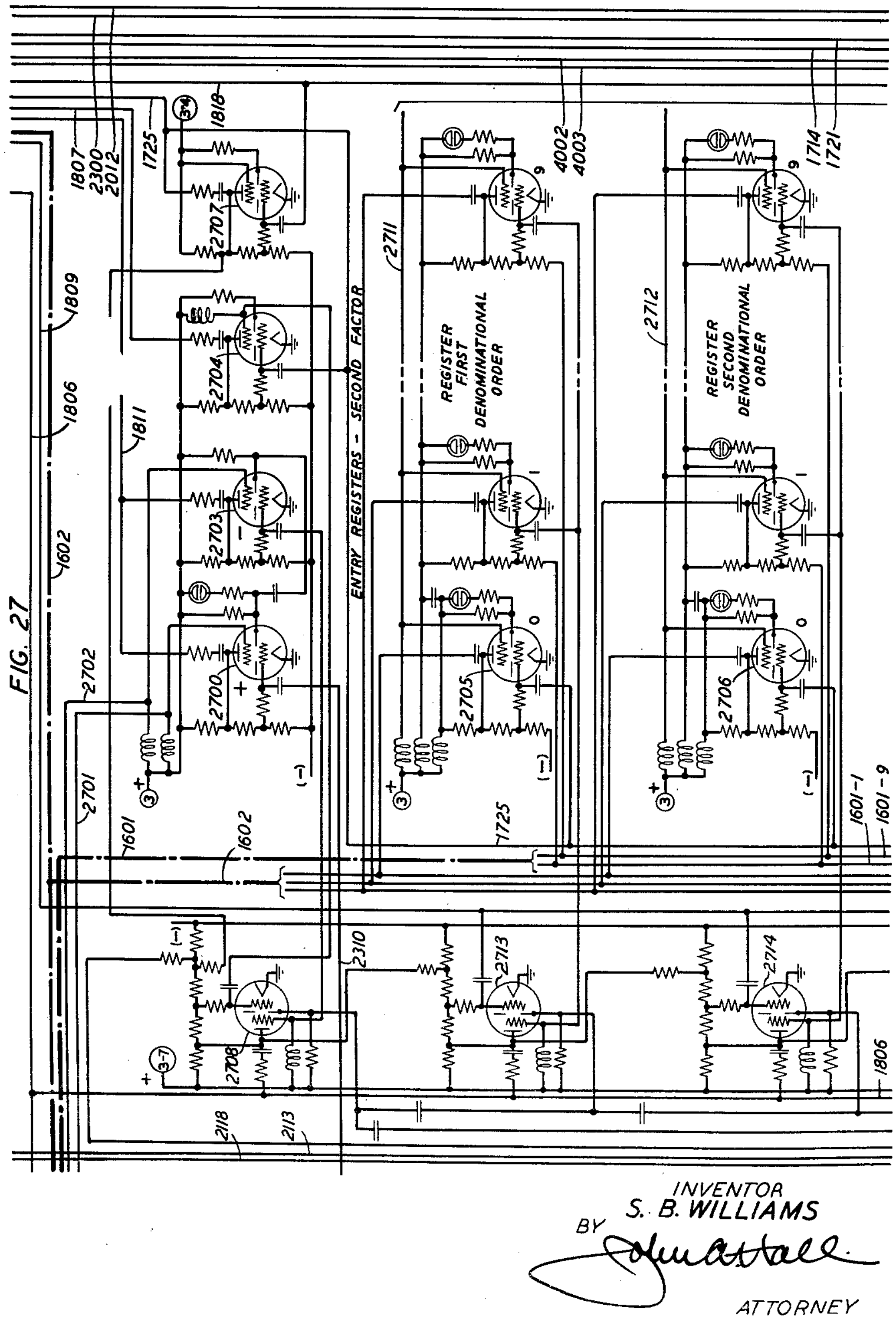
Figure 28:
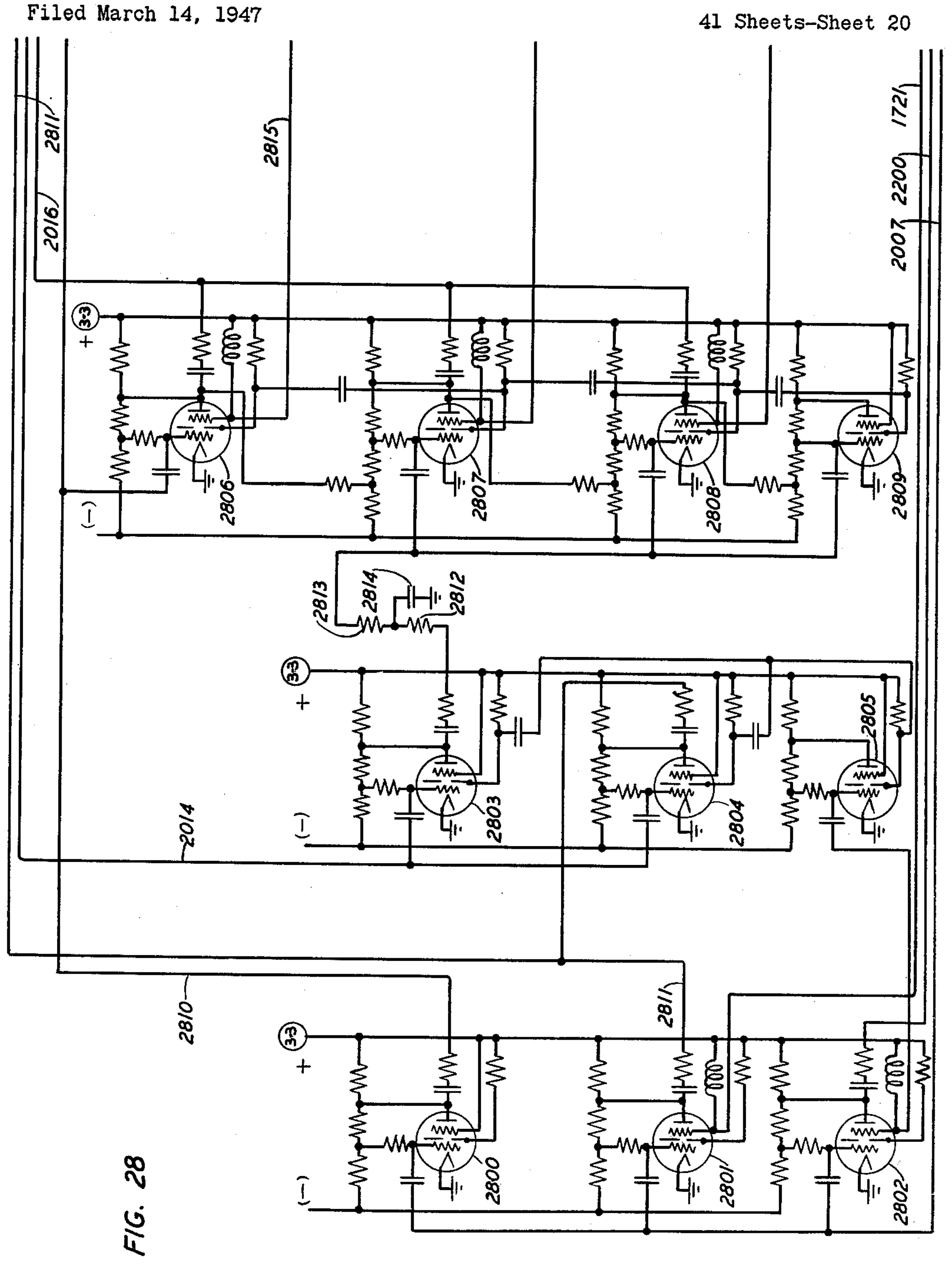
Figure 29:
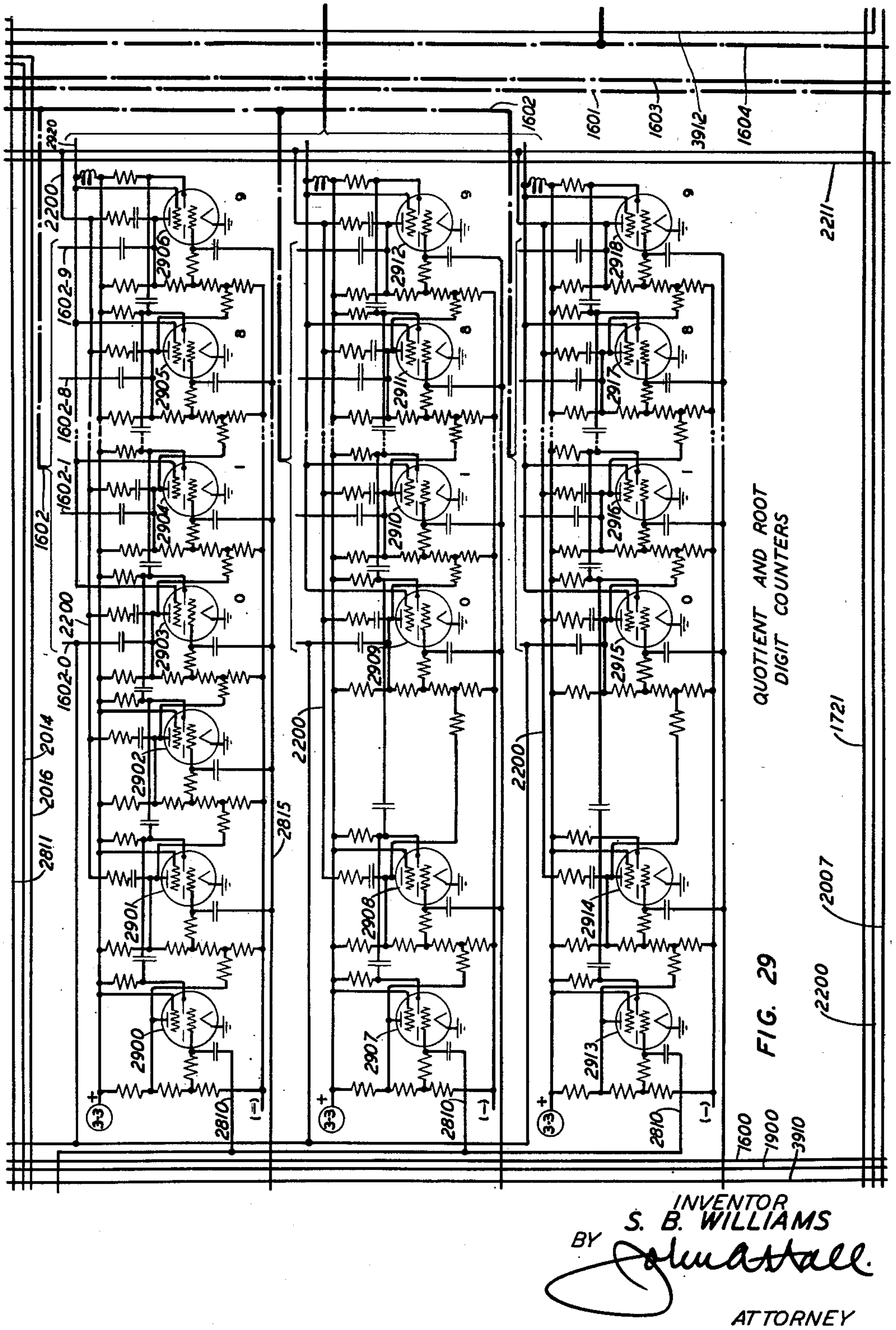
Figure 30:
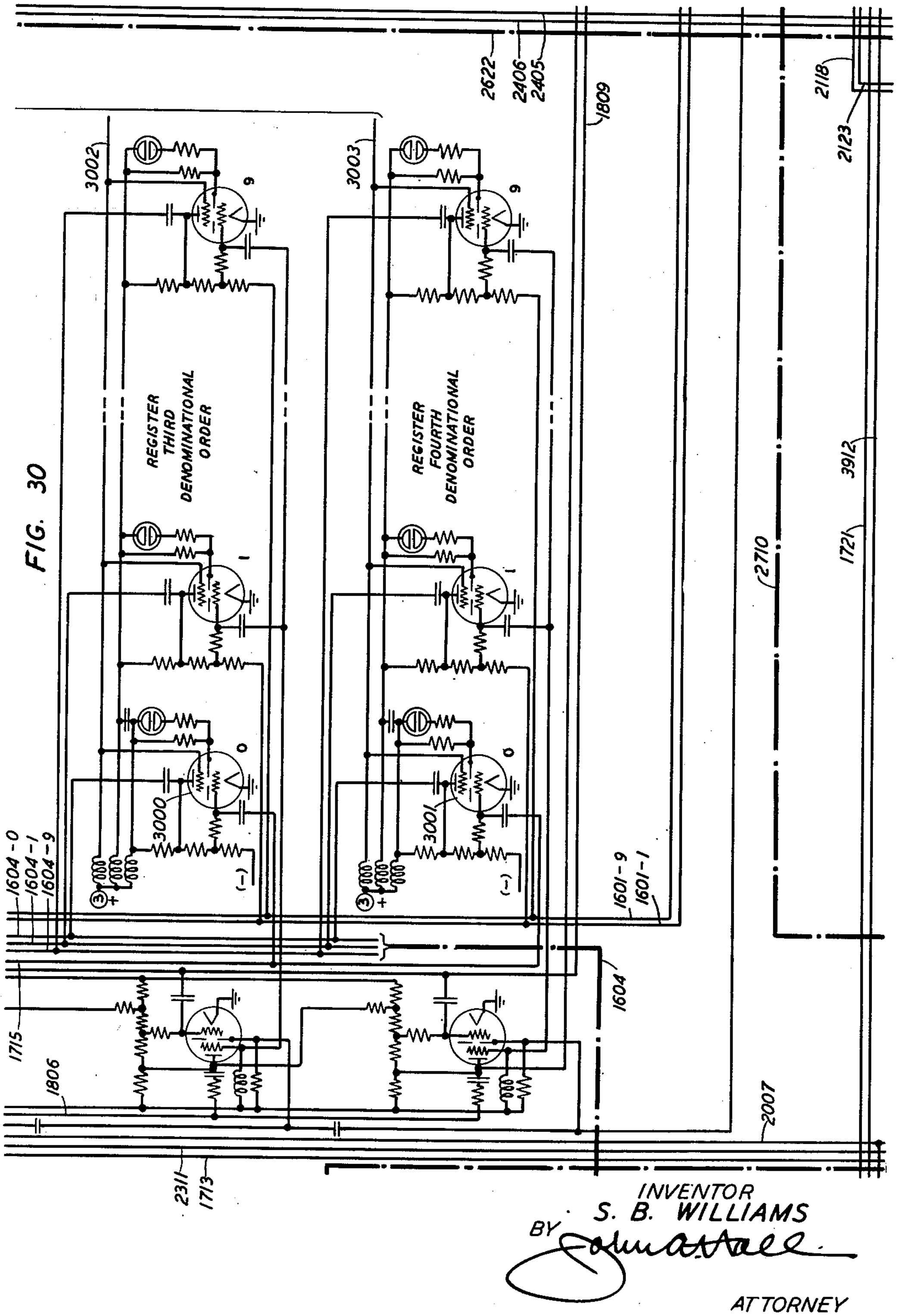
Figure 31:
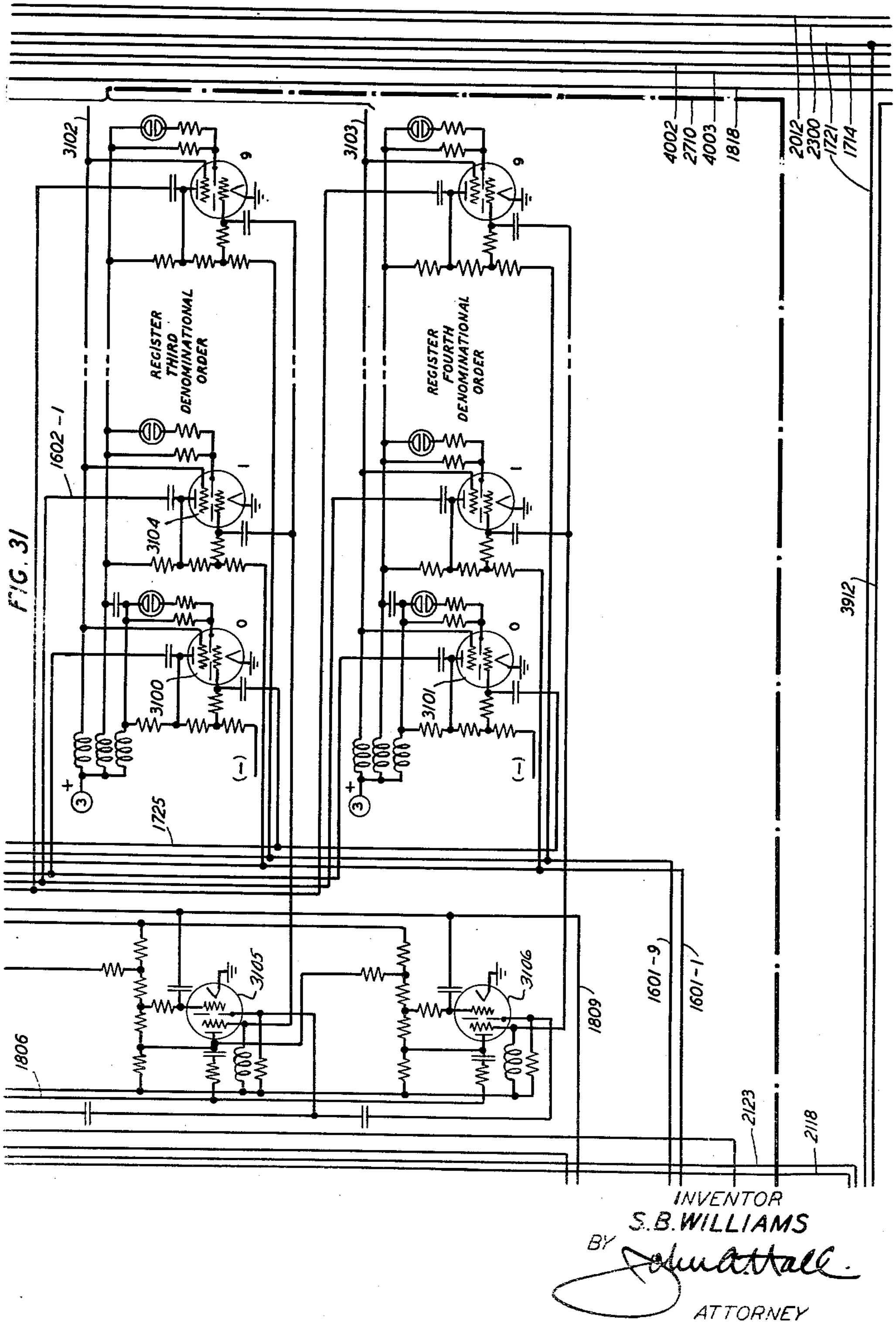
Figure 32:
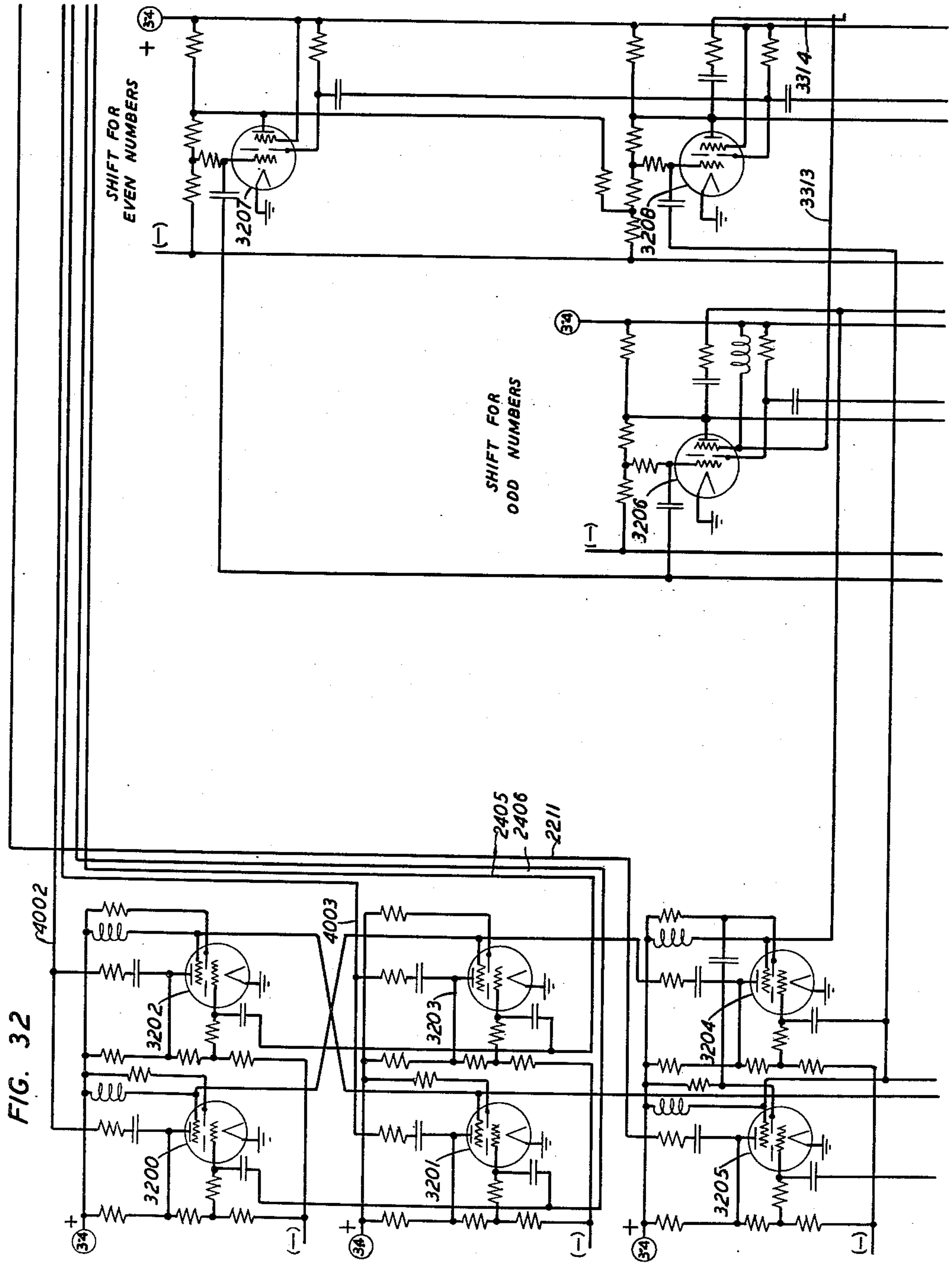
Figure 33:
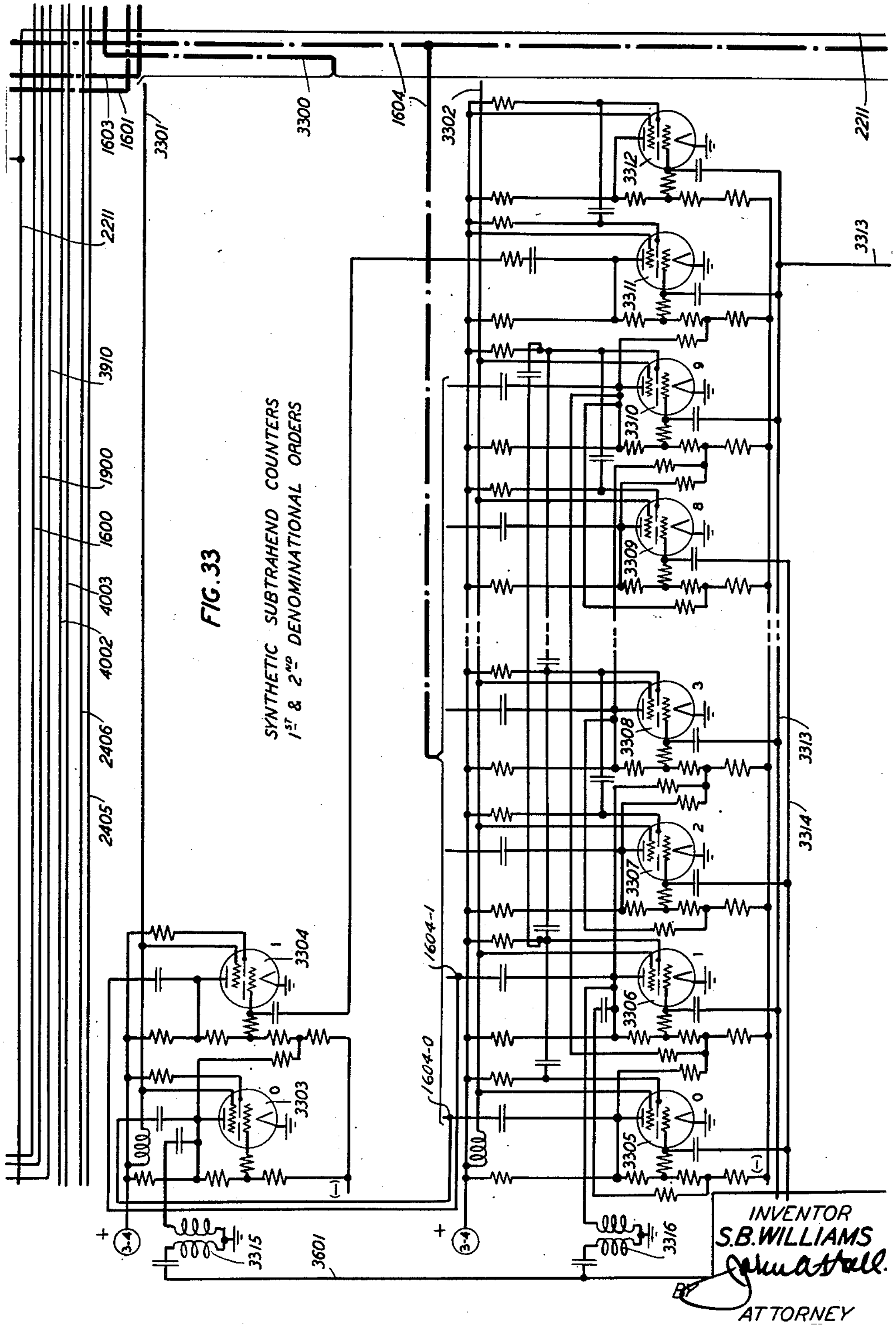
Figure 34:
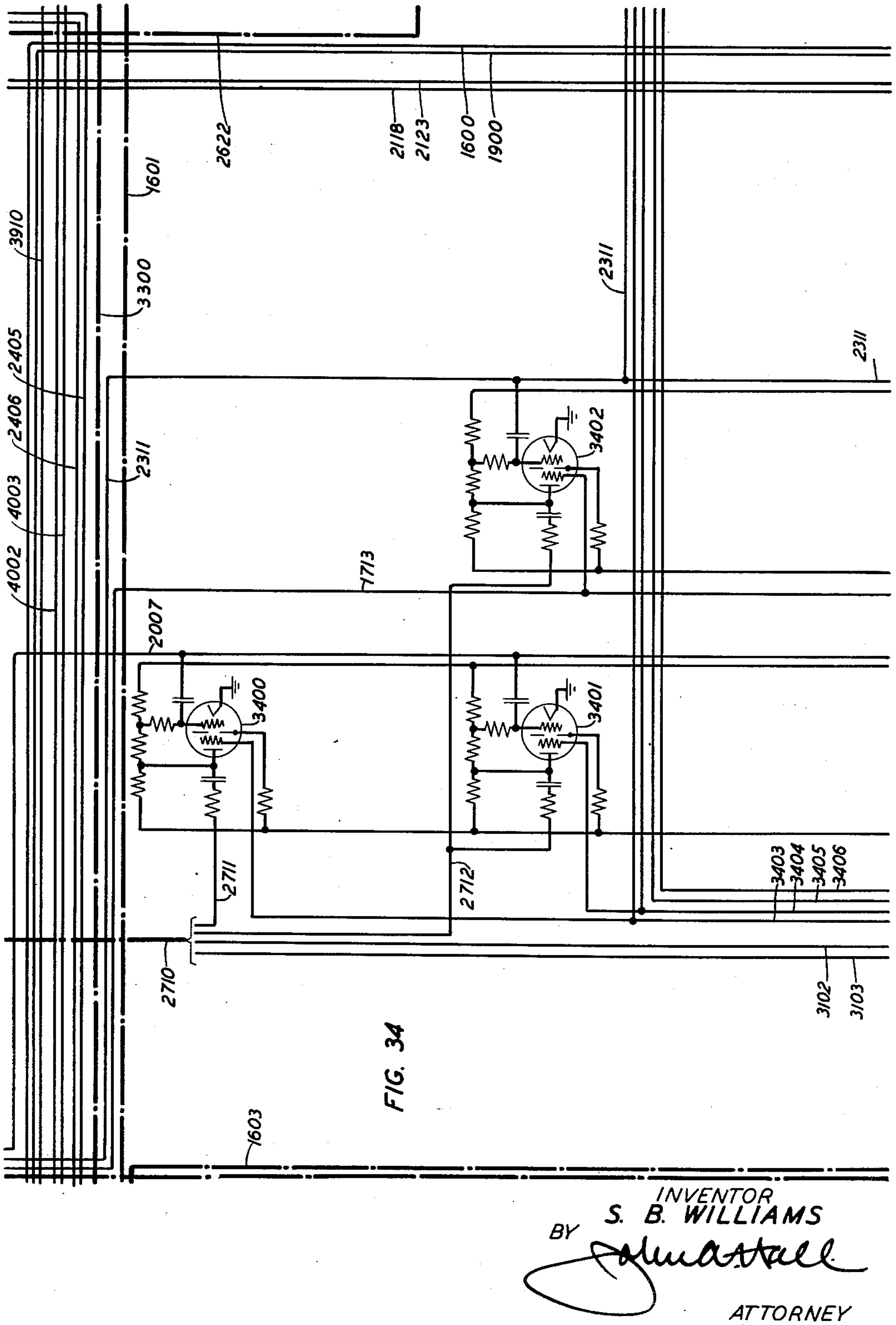
Figure 35:
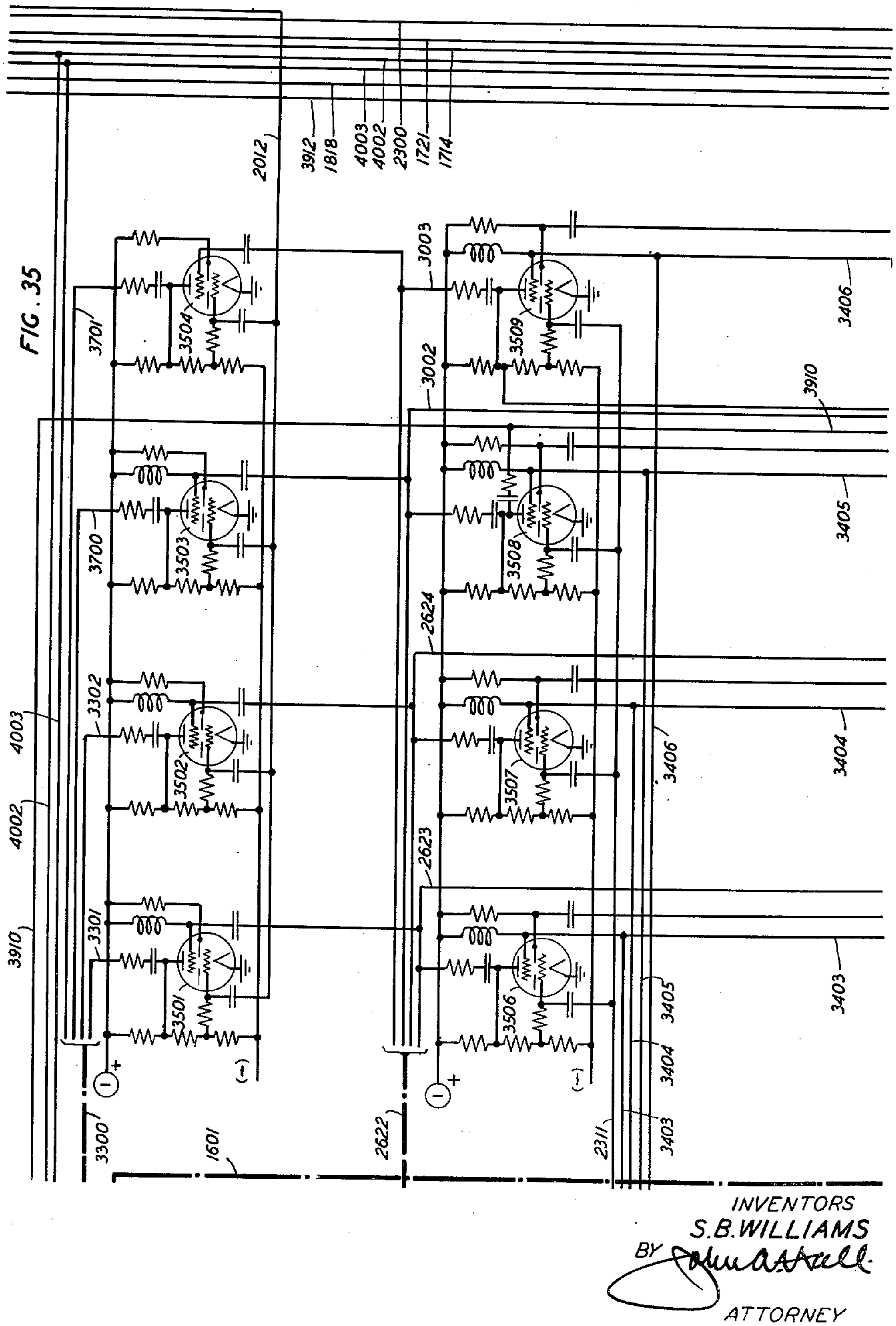
Figure 36:
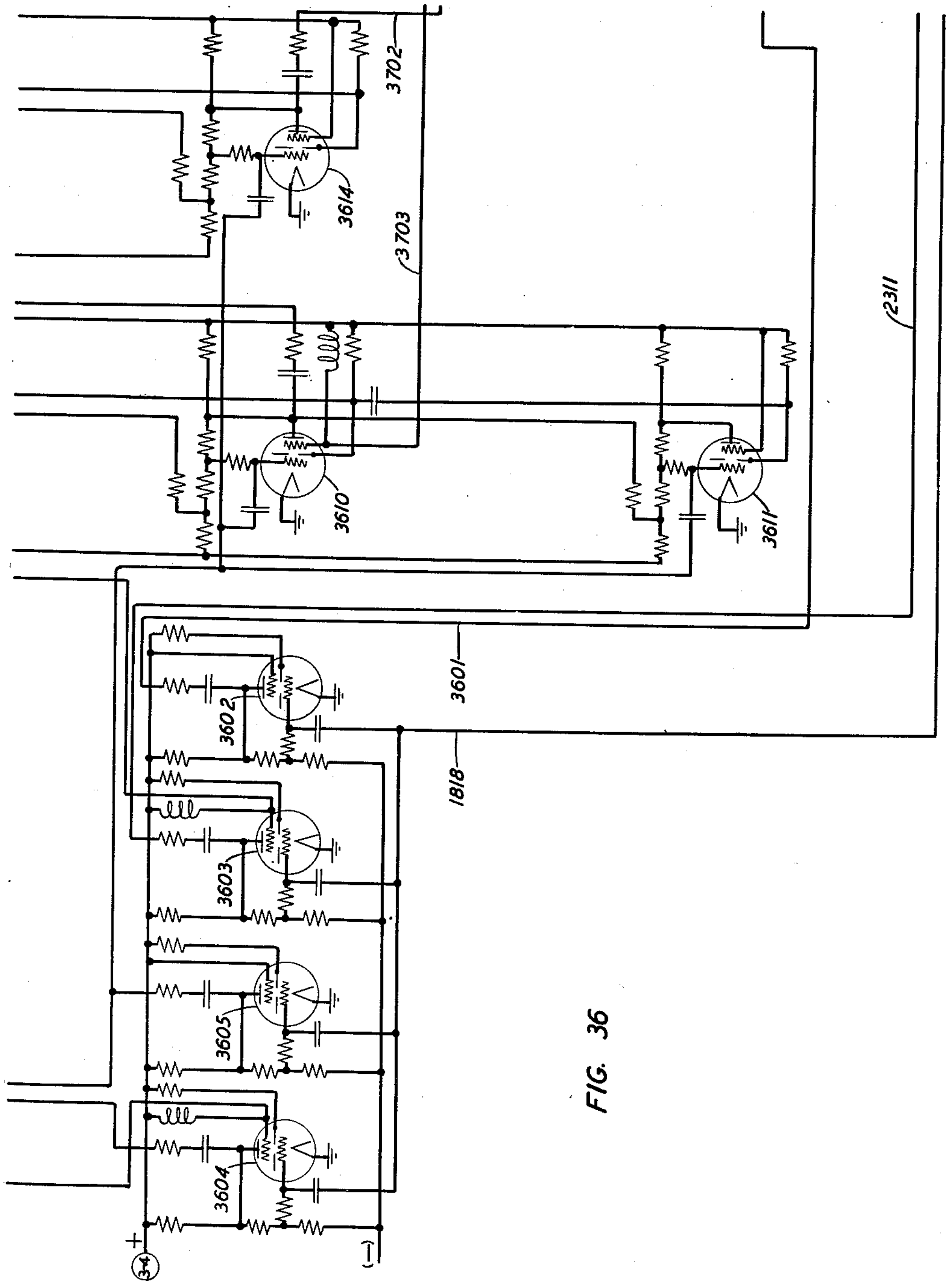
Figure 37:
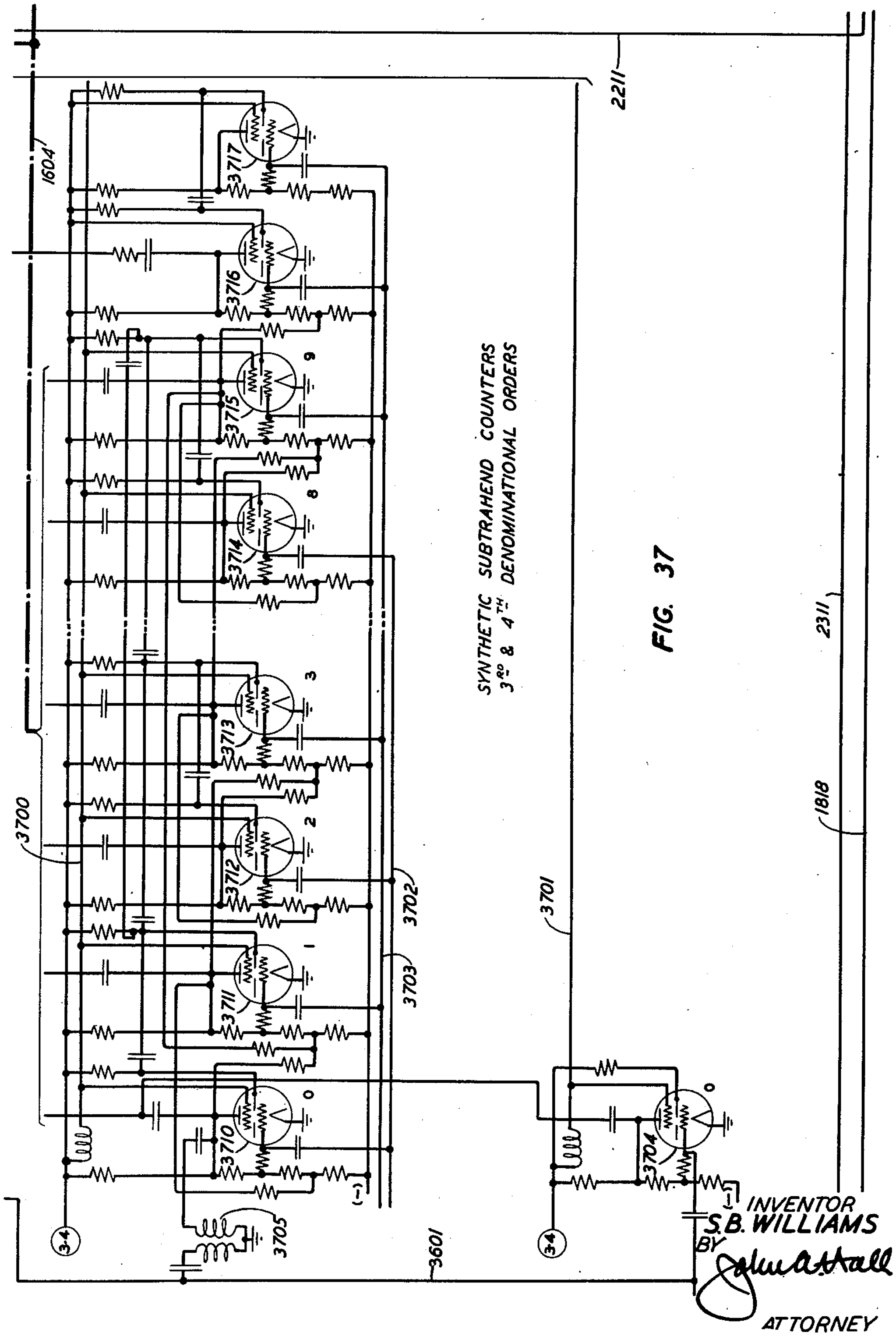
Figure 38:
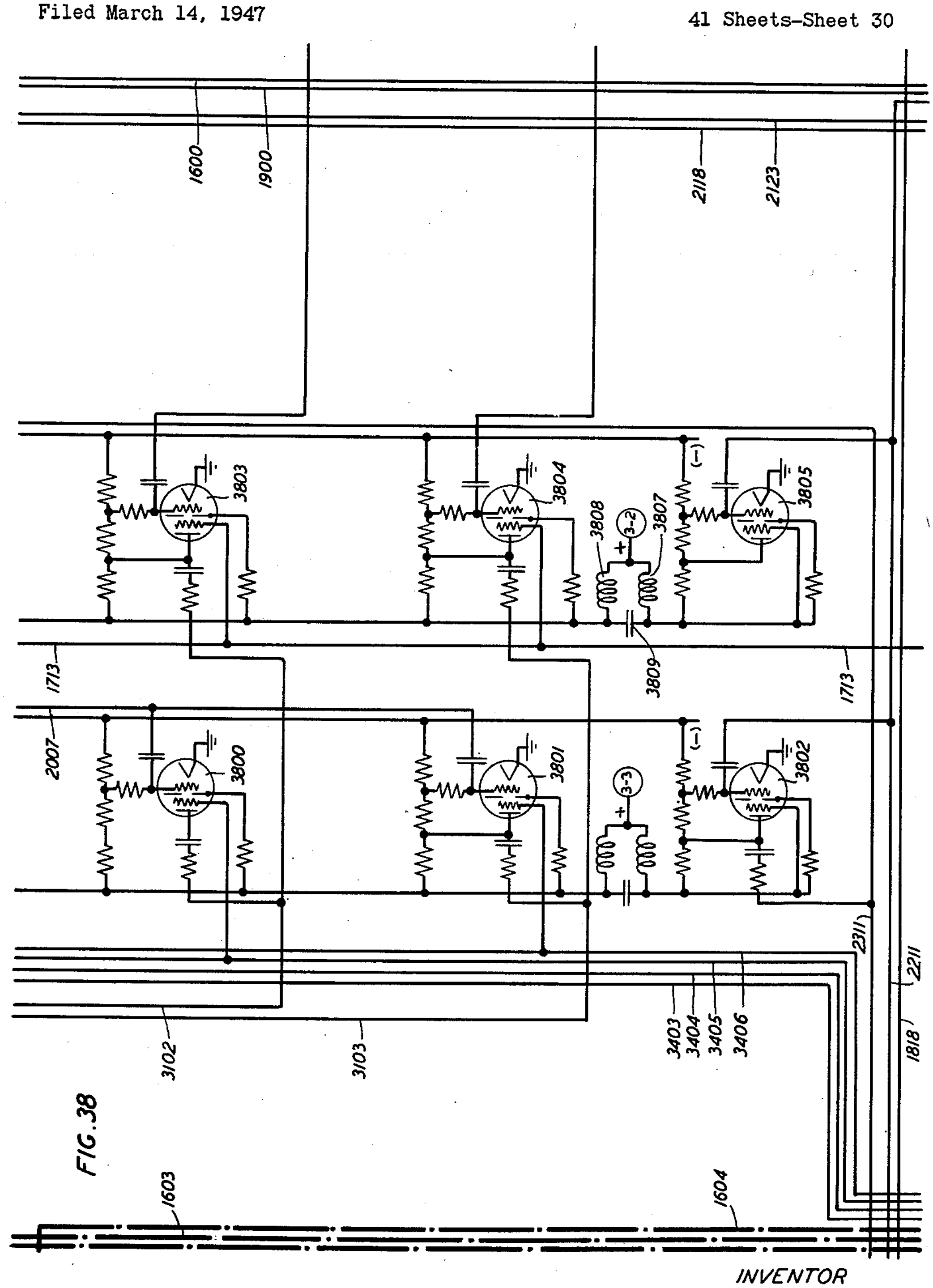
Figure 39:
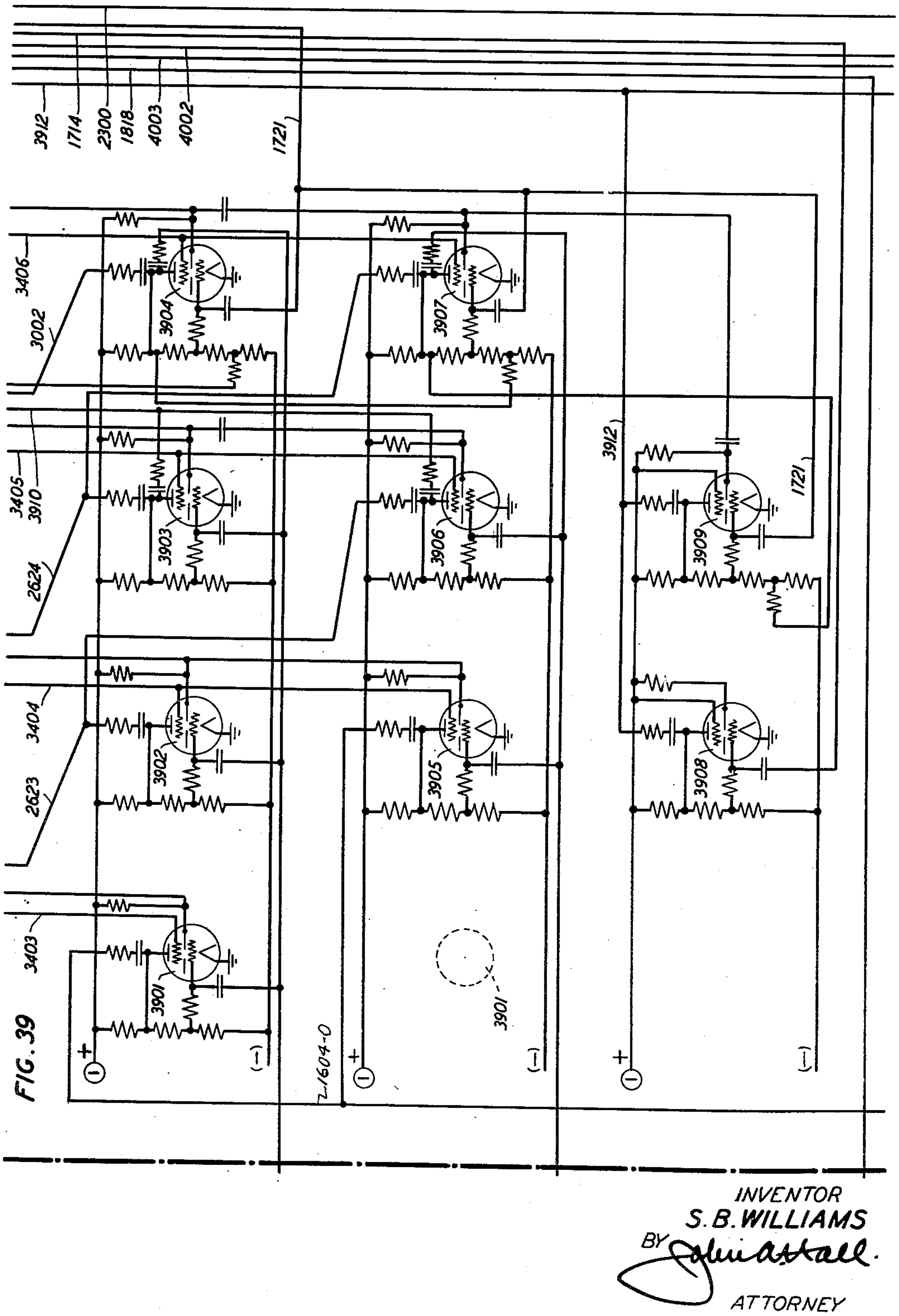
Figure 40:
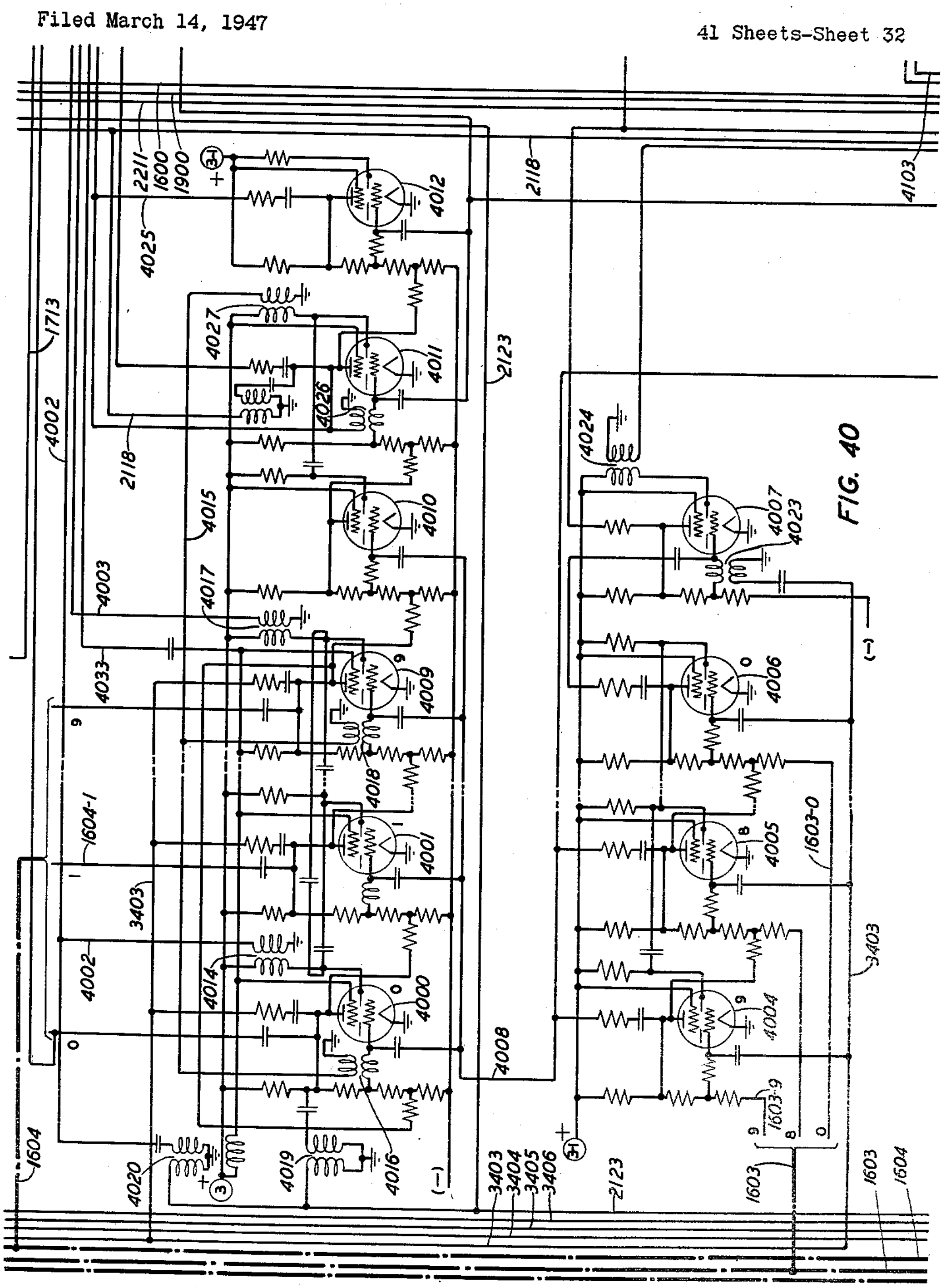
Figure 41:
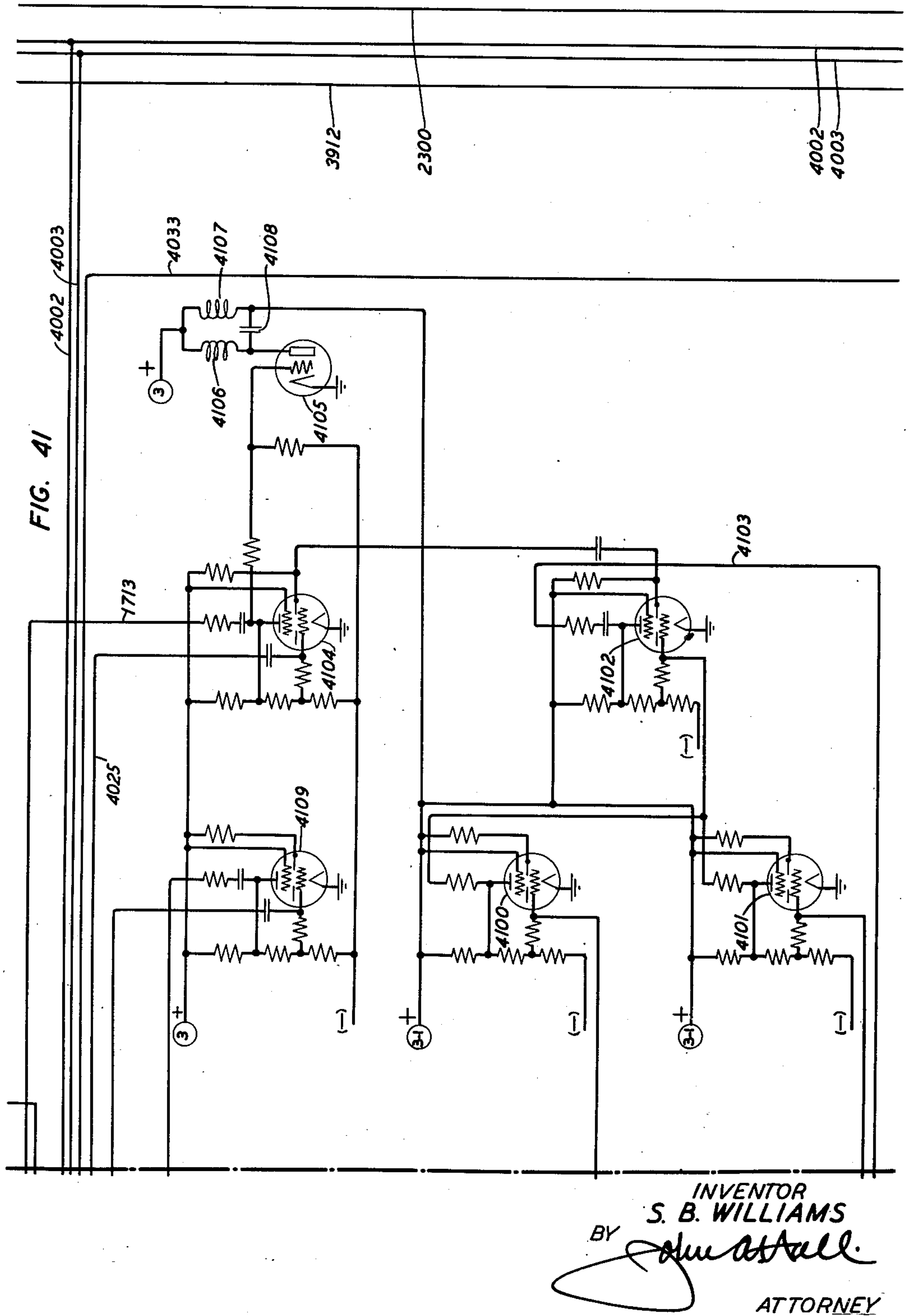
Figure 42:
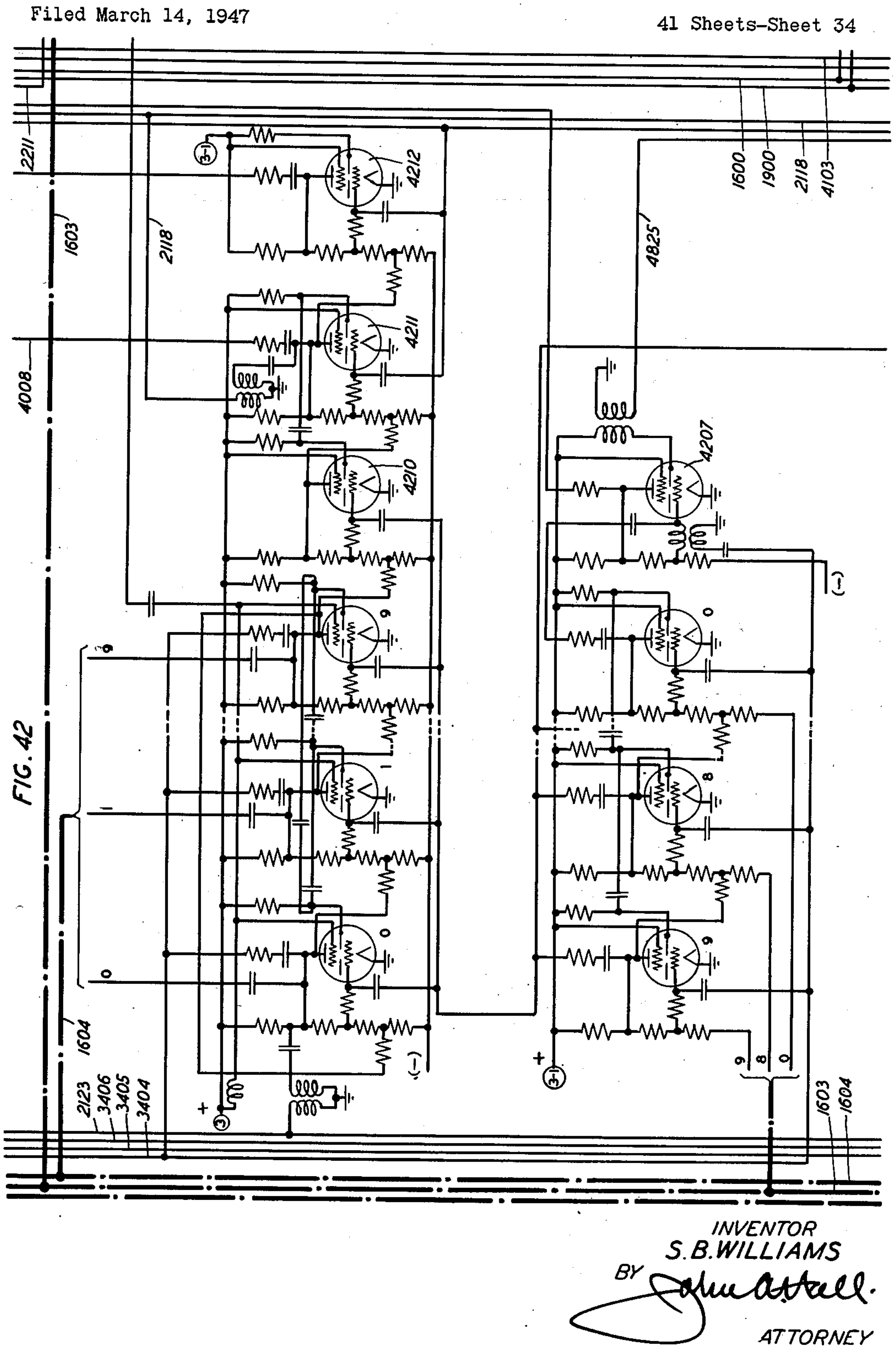
Figure 43:
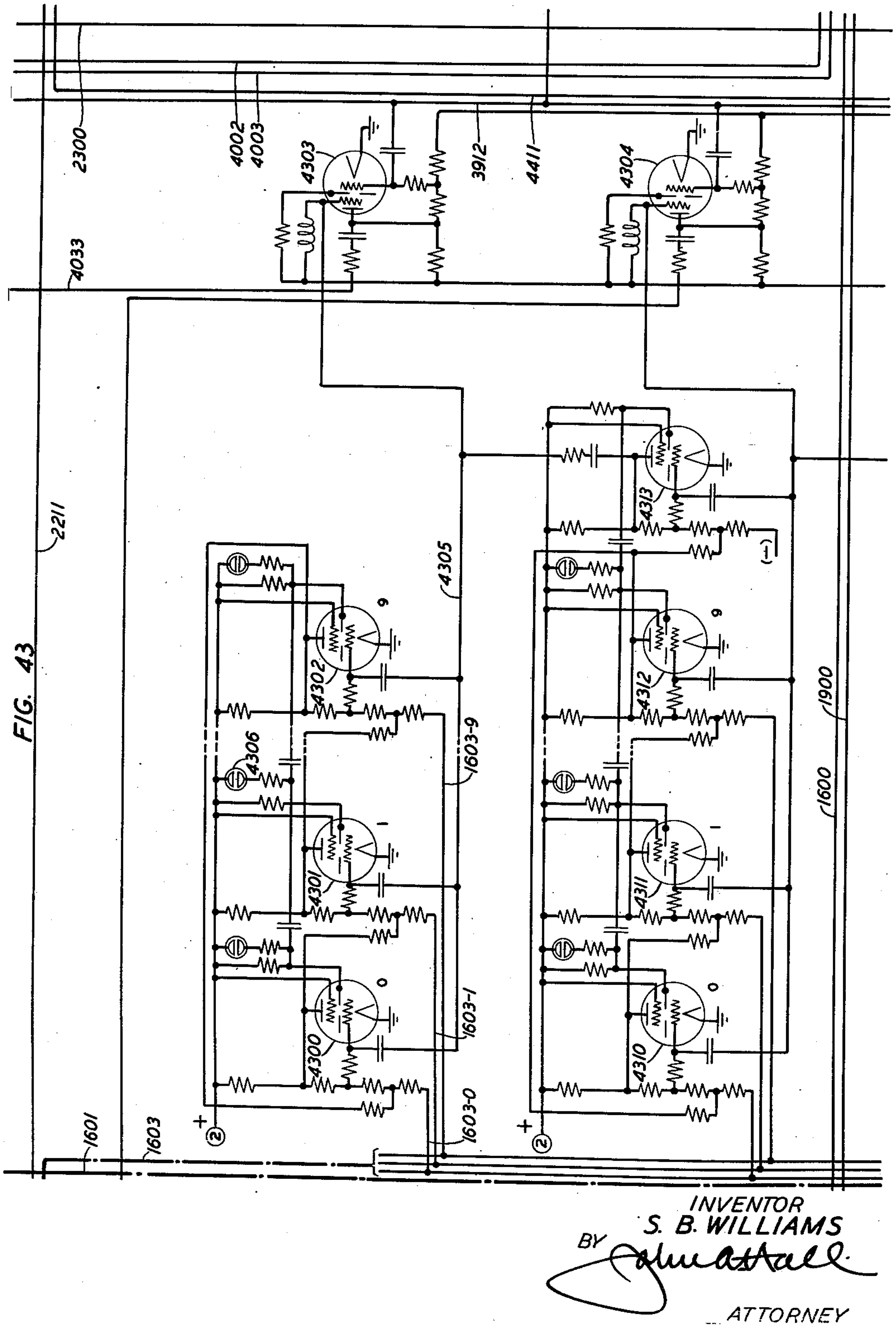
Figure 44:
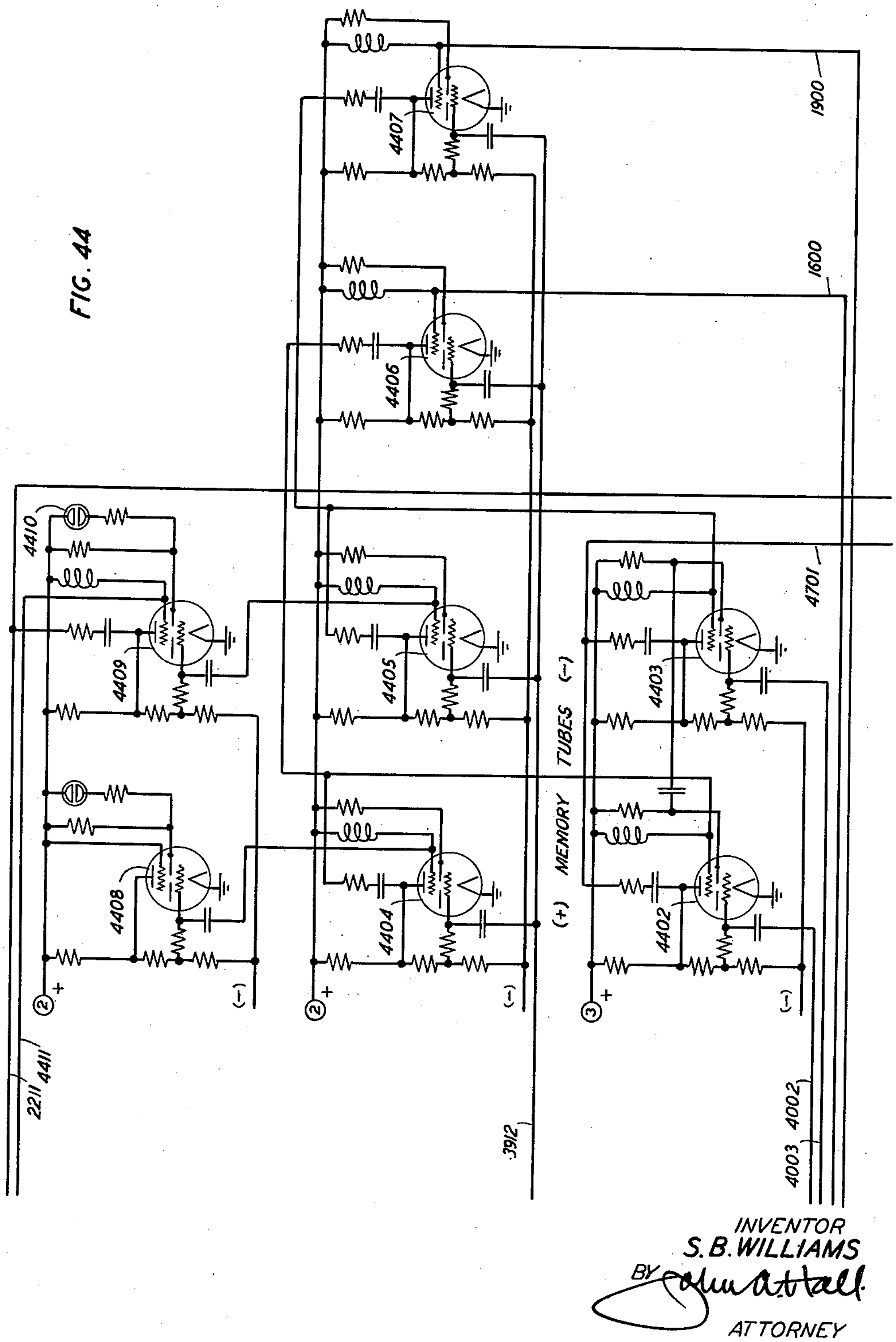
Figure 45:
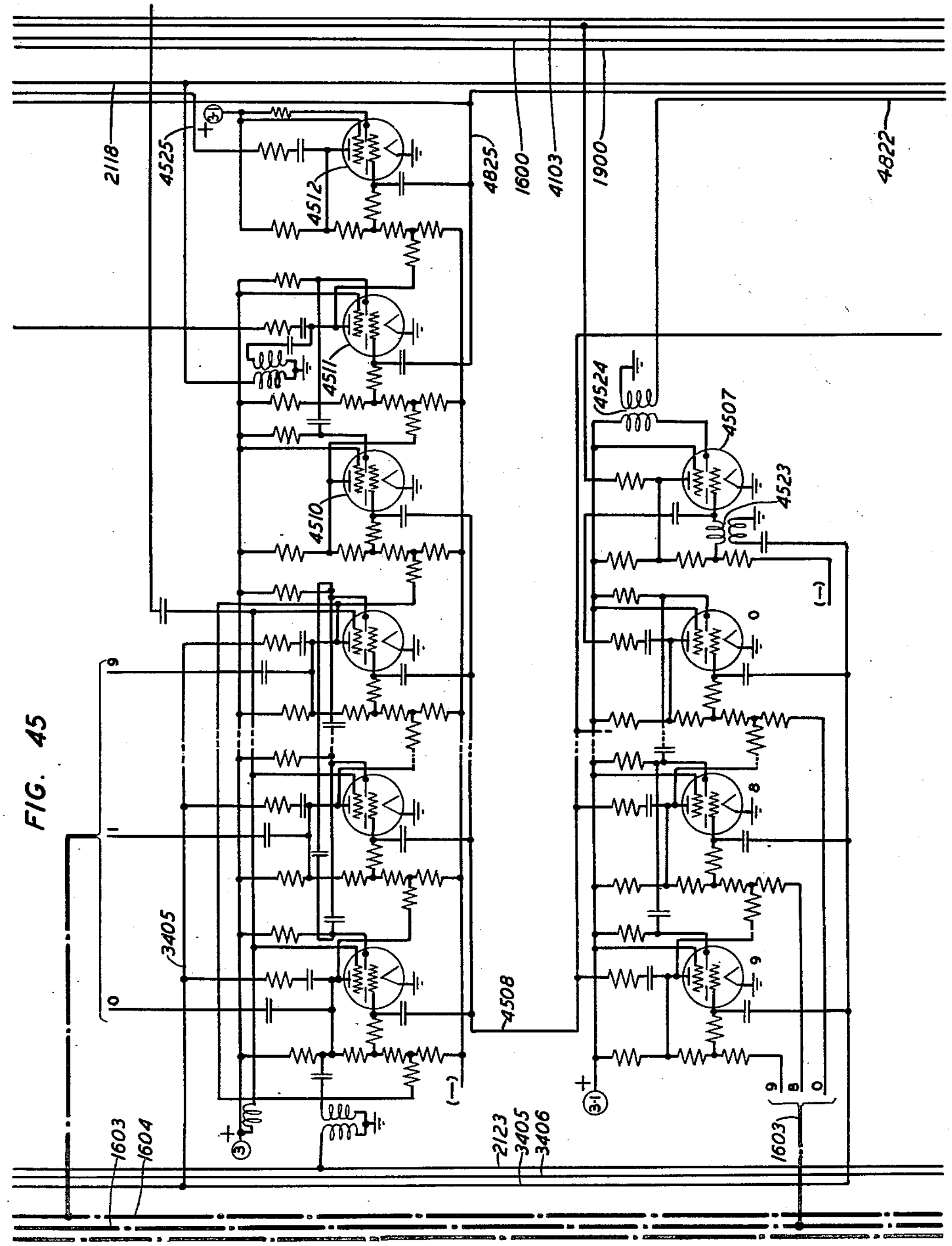
Figure 46:
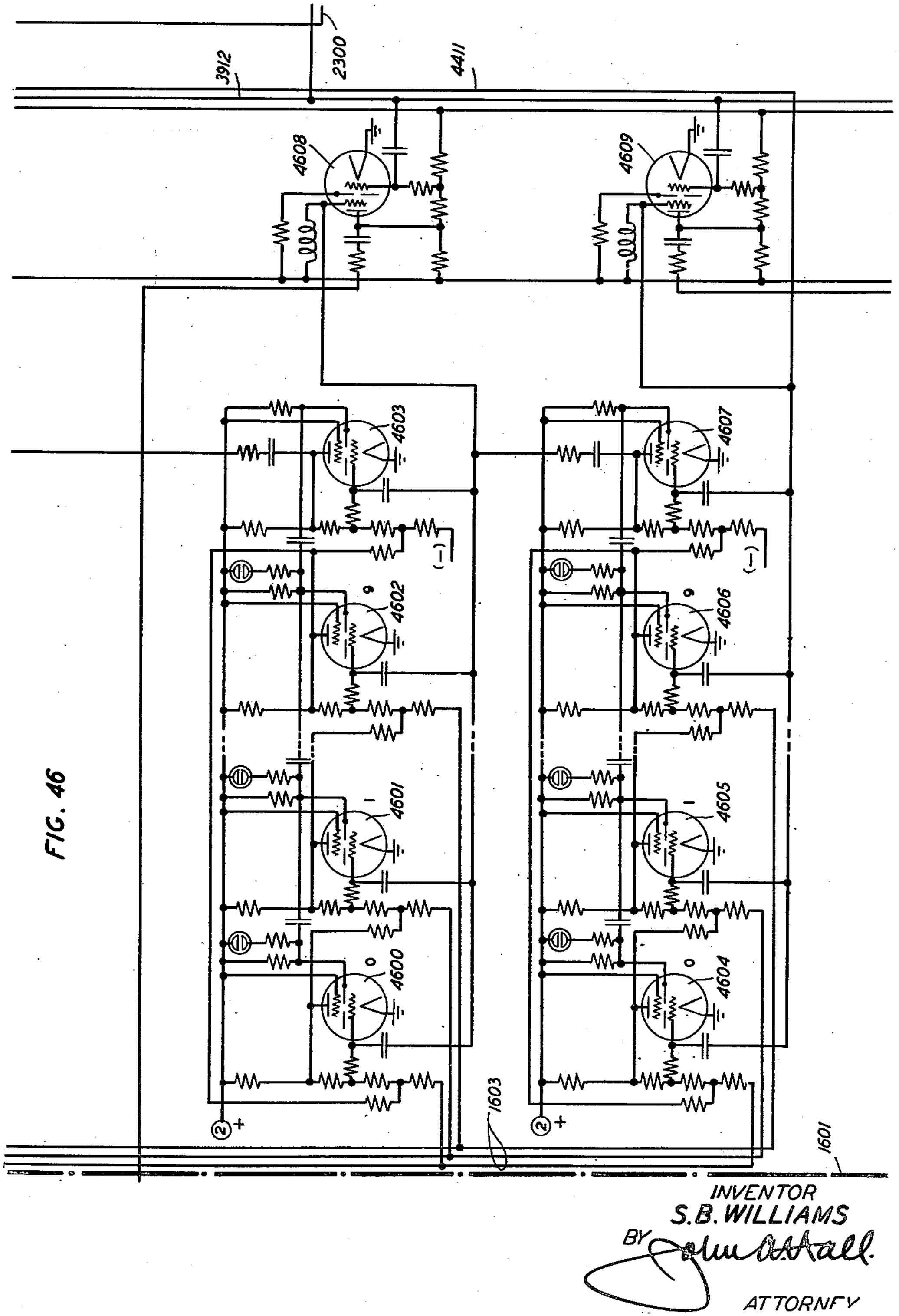
Figure 47:
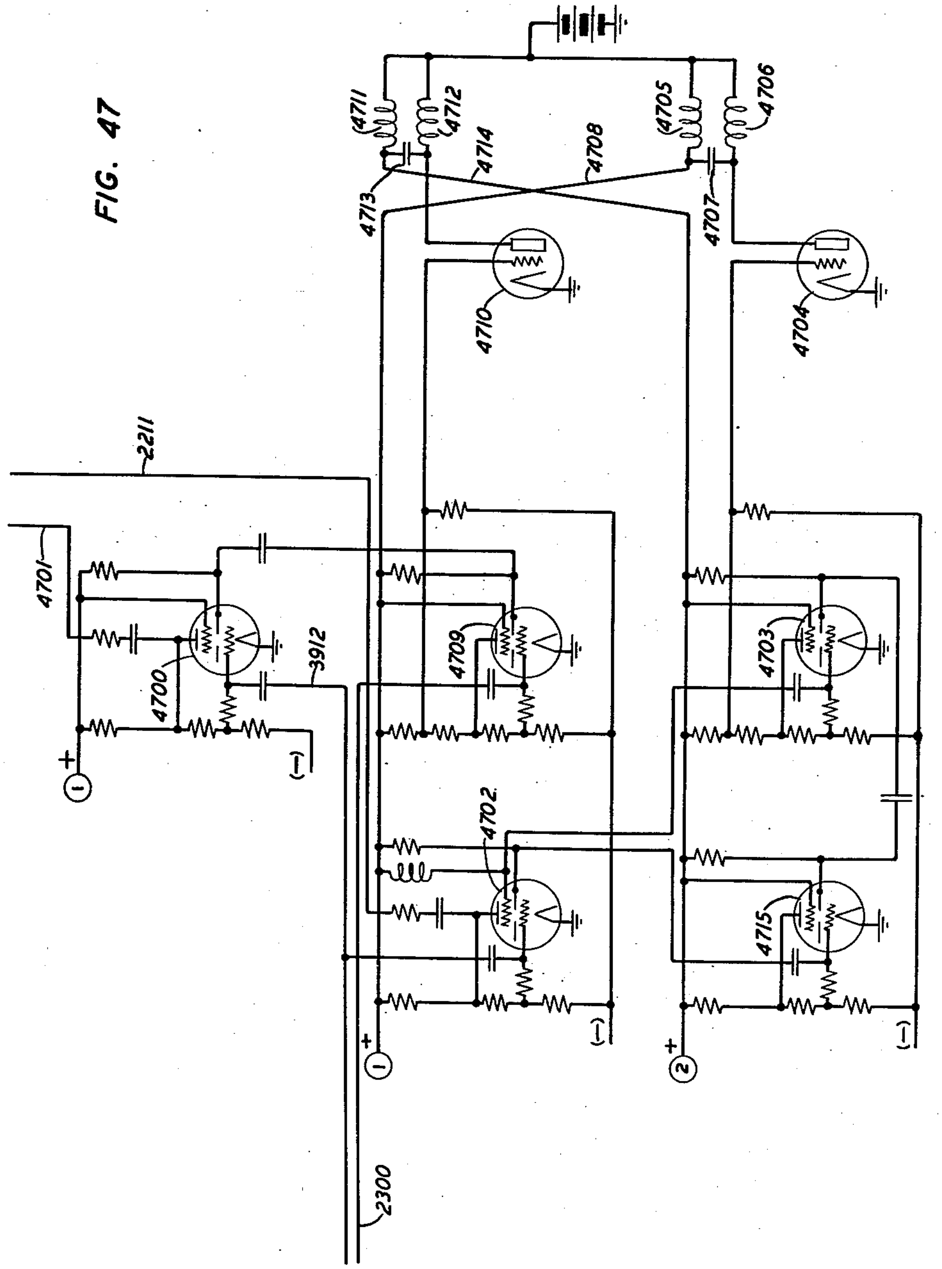
Figure 48:
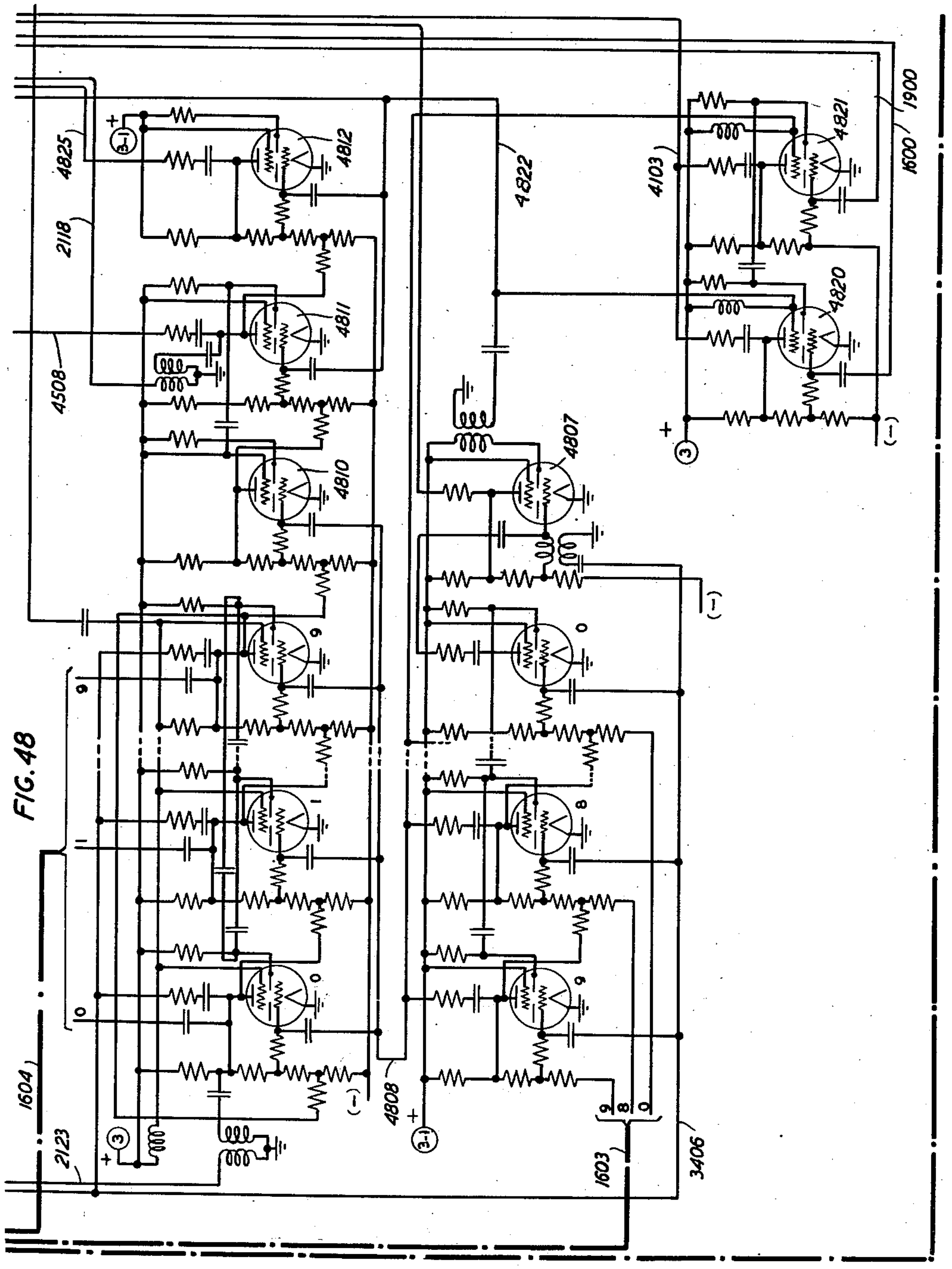
Figure 49:
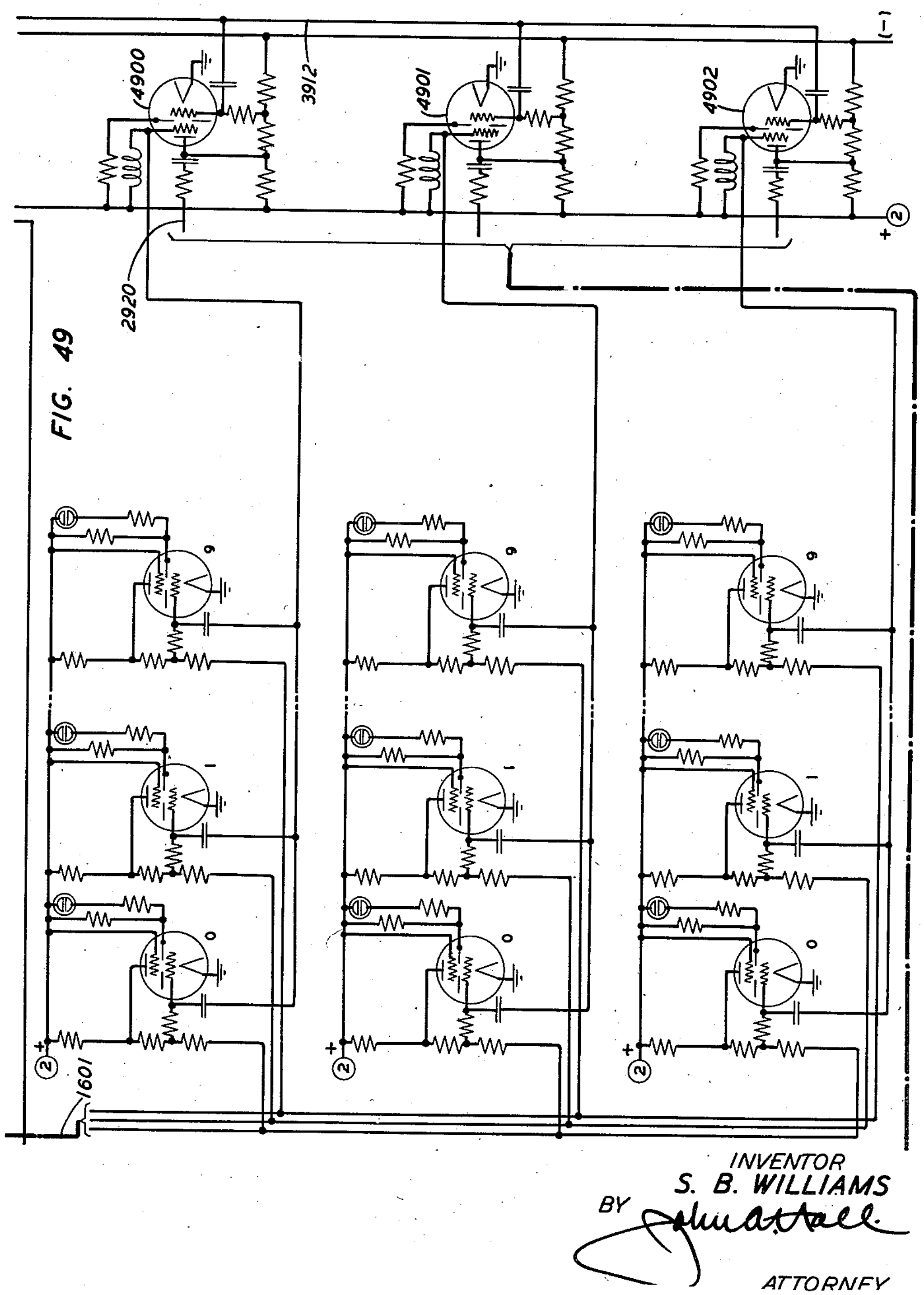

Figs. 12 and 13 taken together form a schematic circuit diagram of the sign circuit for controlling the pattern of operations and for controlling the proper selection of the positive and negative generators;

Fig. 14 is a schematic circuit diagram showing the various means used under different conditions for starting the selected generator;

Fig. 15 is a block diagram showing how the remaining figures may be placed to form a complete detailed circuit diagram, and in which Fig. 16 shows the positive generator tubes and output transformers;

Fig. 17 shows the pattern tubes for multiplication and for addition;

Fig. 18 shows the entry keys including the pattern keys, the sign keys, the digit keys and the start key;

Fig. 19 shows the negative generator tubes and output transformers;

Fig. 20 shows the pattern tubes for division and square root;

Fig. 21 shows the clearing out key and the tubes operated thereby including the tubes for automatically setting the accumulators to zero;

Fig. 22 shows the common control tubes for the generators;

Fig. 23 shows the power control means whereby the various pattern tubes and shift tubes may be extinguished when the display signal is transmitted and whereby the display means may be cleared when the start signal is transmitted;

Fig. 24 shows the means for controlling the progressive use of the digit counters used in division and square root and the means for controlling the selection of the generator for the next operation in these calculations as a result of the last result achieved;

Fig. 25 shows the counting tubes used for multiplication;

Fig. 26 shows the progress circuit, the sign entry means and the first and second digit registers for entering the first factor of a problem, such as the multiplicand, the divisor, the augend or the addend;

Fig. 27 shows the progress circuit, the sign entry means and the first and second digit registers for entering the second factor of a problem, such as the multiplier, the dividend or the square;

Fig. 28 shows the tubes common to the digit counters for division and square root;

Fig. 29 shows the counters for registering as they are calculated the quotient or square root digits;

Fig. 30 shows the third and fourth entry registers for entering the first factor of a problem;

Fig. 31 shows the third and fourth entry registers for entering the second factor of a problem;

Fig. 32 shows the shift control for the counters for synthesizing the subtrahends for square root and the progress circuit for the first and second orders thereof;

Fig. 33 shows the first and second order counters used for synthesizing subtrahends;

Figs. 34 and 35 show the shift control tubes for the first and second denominational orders used in the transfer of numbers from the entry registers to the accumulator registers;

Fig. 36 shows the pattern tubes for square root and the progress circuits for the third and fourth denominational order counters for root subtrahend synthesis;

Fig. 37 shows the third and fourth order counters used for synthesizing subtrahends;

Figs. 38 and 39 show the shift control tubes for the third and fourth denominational orders used in the transfer of numbers from the entry registers to the accumulator registers;

Fig. 40 shows the accumulator used for the first denominational order, employed mainly as a sign control means;

Fig. 41 shows the common control means for the four accumulators used herein;

Fig. 42 shows the accumulator used for the second denominational order of the accumulated results;

Fig. 43 shows the display means and particularly the first and second denominational orders thereof for displaying products, sums and remainders produced in division and square root;

Fig. 44 shows the means for displaying the sign of the final result and the memory tubes for the control thereof;

Fig. 45 shows the accumulator used for the third denominational order of the accumulated results;

Fig. 46 shows the third and fourth denominational order display means, part of the circuits shown in Fig. 43;

Fig. 47 shows certain power control means, specifically the arrangement for releasing the display means at the start of a new calculation and the arrangement for releasing the pattern control tubes when a calculation has been completed and the result is to be displayed;

Fig. 48 shows the accumulator used for the fourth denominational order of the accumulated results; and Fig. 49 shows the first, second and third denominational order display means for displaying quotients and roots.

Figure 1:
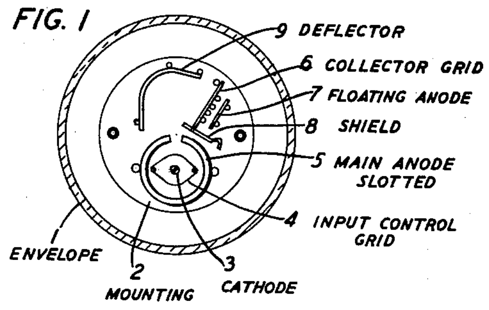
Fig. 1 shows a cross-section of one of the high vacuum secondary emission trigger tubes to indicate the physical relationship of the elements thereof.

The particular tube employed as an element in the present invention is fully disclosed and its operating characteristics are fully described in Patent 2,293,177, granted August 18, 1942, to A. M. Skellett. For the purposes of the present disclosure the physical locations of the elements of such a tube are shown in Fig. 1.

Within a conventional glass or metal envelope 1 the various operating elements are secured in the proper spatial relationship to each other by a conventional mounting plate 2.

The cathode 3 is surrounded by the input control grid 4 and this in turn is surrounded by the main anode 5 which differs from conventional elements in that it is slotted to allow a directed stream of electrons to escape and travel in a guided path to a collector grid 6. A floating anode 7, at a somewhat lower positive potential than the collector grid 6 (when the tube is in operation) becomes a source of secondary emission and creates a flow of electrons from the floating anode 7 to the collector grid 6. A shield 8 and a deflector 9 provide means to direct and control the flow of electrons from the cathode 3 through the slot of the main anode 5 to the collector grid 6 and the floating anode 7.

Figure 2:
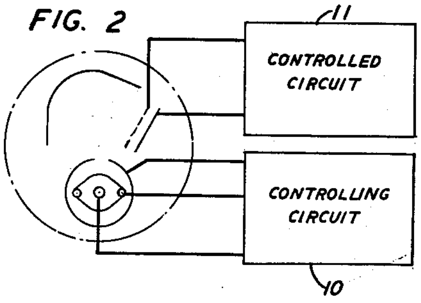
Fig. 2 is a schematic diagram showing how the tube used in this system may be considered the equivalent of a circuit closer.

Fig. 2 shows diagrammatically how such a tube may be considered the equivalent of a relay or other circuit closer. The controlling circuit 10 operates the cathode, grid and anode as in a conventional triode so that when the tube has been started into operation it will effectively complete or close a path to a controlled circuit 11. The trigger action of this tube as explained in the Skellett patent is such that once the tube has been put into operation through the rise of potential on its grid it will remain in operation until some specific change has been made to extinguish it, and during this time the controlled circuit 11 may be operated over a path including as an element thereof the circuit from the floating anode to the collector grid of the tube.

Figure 3:
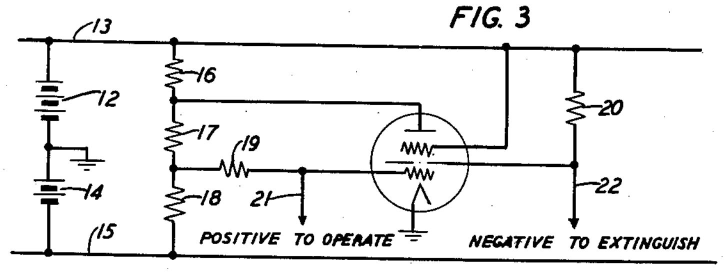
Fig. 3 is a schematic circuit diagram showing the essential elements of the circuit network used for the proper operation of the tube.

Fig. 3 is a fundamental circuit diagram to explain the working of the tube and to indicate the connections partially shown in schematic circuit diagrams hereinafter. A source 12 supplies positive potential to a bus 13 and a source 14 supplies negative potential to the bus 15. The other poles of these sources are connected together and grounded in the conventional manner. A voltage divider, individual to a tube, consisting of the resistors 16, 17 and 18 is bridged from the positive bus 13 to the negative bus 15 and provides means for holding the floating anode and the control grid at appropriate intermediate potentials. The control grid is connected to the voltage divider through another resistor 19 so that any control potential supplied to this grid will not upset the values of the voltage divider points. The main or slotted anode is connected to the positive bus 13 through a resistor 20 which provides an IR drop when the tube is in operation to adjust the potential of this anode in accordance with the control exercised by the grid. The tube may be fired by raising the potential of the circuit 21 connected to the grid to a given value whereupon current will flow from the anode to the cathode. When the tube is not in operation the potential of the slotted anode is the same as the positive bus 13 but after the tube has come into operation the potential of the anode is lowered by the IR drop of the resistor 20. This tube is a trigger tube and after being set in operation by a positive potential (even of short duration, as by way of a pulse) applied to the branch circuit 21 will remain in operation until extinguished by the application of a negative potential to the anode as by way of the branch circuit 22.

The starting into operation of this type of tube is spoken of as firing. To fire the tube is to trigger it on and to extinguish the tube is to trigger it off. The tube is said to have been fired when it has been triggered on.

There are several ways in which the tube may be fired. The way most often employed in the system disclosed hereinafter is to apply, through a condenser, a positive pulse to the branch circuit 21 of sufficient strength to trigger the tube on. Where selective firing is desired and a plurality of tubes have their branches 21 each connected through an individual condenser to a common wire, then only that tube which has its grid prepared or primed by a positive potential applied to the common connection between the resistors 17, 18 and 19 or at some intermediate point on the resistor 18 will respond. The common boost in potential given to the other tubes through their circuits 21 is insufficient to fire them. It is also possible to fire one of these tubes by boosting the potential of the floating anode and due to the resistance 16 this boost at times may go beyond the potential of the positive bus 13 so that the tube is forcibly fired.

The tubes may also be extinguished, quenched or triggered off in a number of ways. The common way of extinguishing a single tube is to apply a negative potential or pulse to its slotted anode or branch circuit 22. When a plurality of tubes is to be simultaneously extinguished then the potential of the positive bus 13 is lowered, momentarily or otherwise. Also a negative pulse applied to the grid or to the floating anode will effectively extinguish the tube.

Figure 4:
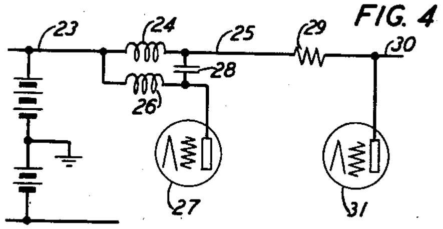
Fig. 4 is a schematic circuit diagram showing means employed for extinguishing a plurality of tubes through the transient lowering of the positive potential used for their operation and a means employed for holding a given number of tubes out of operation when desired.

Fig. 4 is a schematic circuit diagram designed to show one manner in which tubes may be extinguished and one manner in which tubes may be rendered inoperative. Positive potential is supplied to the bus 23 and then extended through an impedance coil 24 (of negligible resistance) to a bus 25 which forms the source of supply for a plurality of tubes as in Fig. 3. A similar impedance coil 26 is connected between the bus 23 and the anode of a triode 27, a condenser 28 being connected between the bus 25 and the plate of the triode 27. When the triode is placed in operation its plate will be transiently lowered in potential and this will be communicated by the condenser 28 to the bus 25 so that the potential thereon is momentarily dropped below the sustaining value for all the tubes connected thereto. This condition is transient.

Where it is wished to disable a plurality of tubes the positive supply is through a resistor 29 to a bus 30 which is then connected to the plate of a triode 31. When the triode is placed in operation the potential of the bus 30 is lowered by the IR drop in the resistor 29 and may be maintained in this condition as long as desired. The lowered potential of bus 30 is such that none of the trigger tubes connected thereto will operate.

Figure 5:
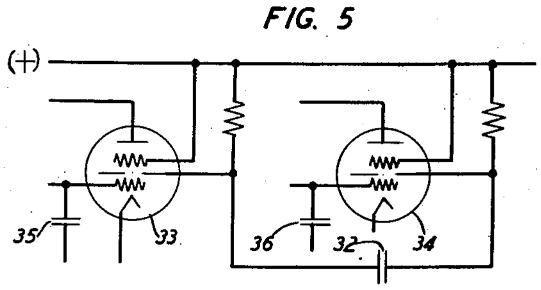
Fig. 5 is a schematic circuit diagram showing a mutually controlled extinguishing circuit used by two tubes whereby either one being fired will cause the other to be extinguished.

Fig. 5 shows in a highly schematic form the manner in which two tubes are interconnected to become mutually controlling. The essential element in this combination is a condenser 32 interconnecting the slotted anodes of the two tubes 33 and 34. Let us assume that the tube 33 has been fired by the transmission of a positive pulse through its grid condenser 35. Now if while this tube 33 is in a conducting state a positive pulse is passed through the condenser 36 to the grid of tube 34 the resulting rapid fall in potential of its slotted anode will be communicated through the condenser 32 as a negative pulse to the slotted anode of the tube 33 with the result that as the tube 34 is triggered on or fired the tube 33 is triggered off or extinguished. Through the same connection, when at some later time the tube 33 is fired, the tube 34 will be extinguished.

Figure 6:
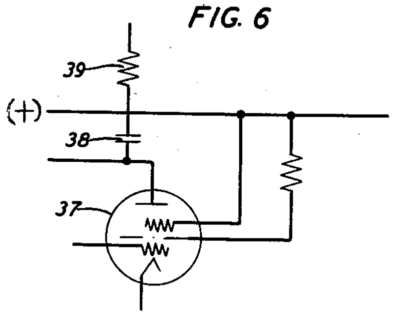
Fig. 6 is a schematic circuit diagram showing how the tube may be used to generate and transmit a pulse when fired.

There are two main ways in which this tube is employed in the system herein disclosed. As shown in Fig. 6 a connection is taken from the floating anode of the tube 37 (which is otherwise connected as shown in Fig. 3) through a condenser 38 and generally also through a resistance 39 to a conductor which may be connected to a circuit to be affected. If the connection between the positive bus and the collector grid is solid, then when the tube is fired a usefully great pulse will be transmitted through 38 and 39, so that the firing of tube 37 produces a pulse.

Figure 7:
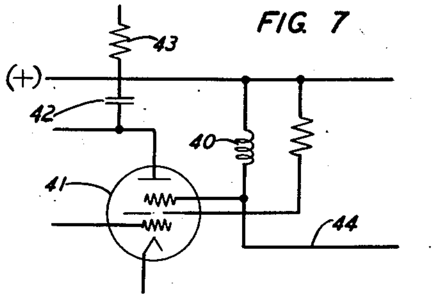
Fig. 7 is a schematic circuit diagram showing how the tube may be employed as indicated in Fig. 2, to act as a means any time after it has been fired to relay or further transmit a pulse.

In Fig. 7, however, an impedance 40 is placed in circuit between the positive bus and the collector grid of tube 41. In this case the pulse which is produced and transmitted over condenser 42 and resistance 43 is not generally employed since the primary purpose of this type of connection is to produce the effect of Fig. 2. Due to the impedance 40, a positive pulse may be freely passed through the resistance 43, the condenser 42, the floating anode and the collector grid of the tube and then transmitted out over the conductor 44 so that in this instance the tube acts as a gate or relay. A circuit thus passing through a tube is called an electronic circuit. There will be noted a few instances in the following description where a tube connected as in Fig. 7 is used in both ways. Generally the pulse created on the firing of the tube is spoken of as a back-fire and this back-fire pulse is usefully employed.

Figure 8:
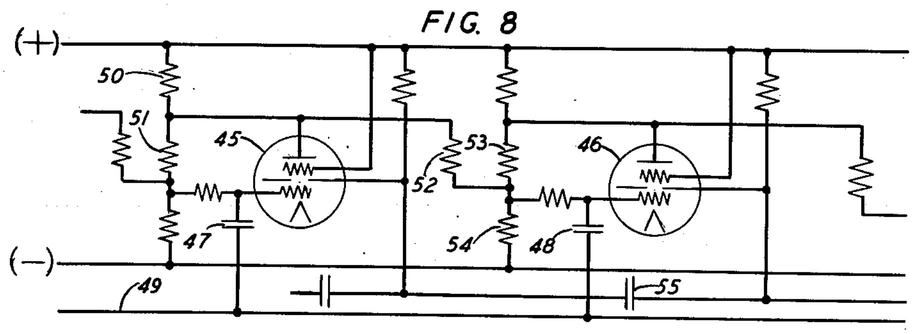
Fig. 8 is a schematic circuit diagram showing the fundamental connections of the network used when these tubes are arranged in either an open chain or a closed ring to thus be responsive successively to the pulses of a train of pulses.

Fig. 8. is a schematic circuit diagram to explain how one tube primes another and is the basic means used for chain and ring operation. Here the two tubes 45 and 46 are each connected by their individual grid condensers 47 and 48 respectively to a common firing circuit 49. Let us assume that the tube 45 has been fired. The potential of the point between the resistors 50 and 51 or the floating anode of this tube has become higher or more positive. This increased positive potential is now communicated over the resistor 52 to the point on the voltage divider for the next tube 46 between the resistors 53 and 54 or at some intermediate point on the resistor 54 so that the grid of the tube 46 has been made somewhat more positive. This is sufficient so that this tube will respond to an impulse over its grid condenser 48 and fire. The same impulse transmitted in parallel to other tubes will not fire any one of such other tubes since none of them has been primed. As tube 46 is fired the negative pulse communicated from the slotted anode of tube 46 through the condenser 55 to the slotted anode of tube 45 will extinguish tube 45. Tube 46 in operation will prime a next in order tube.

Various conventional means are used and will be described hereinafter for firing the first tube of such an arrangement.

Where, for instance, tube 45 represents the first tube of an open chain, the values of its circuit elements are arranged so that when no other tube of the chain is fired then this first tube of the chain will respond to the pulse over the common firing circuit. At any other time the firing of any other tube of the chain will transmit a negative pulse to the slotted anode of this first tube so that it cannot respond to the common firing pulse.

In some cases it is convenient to specially fire a first tube of a chain and to only connect the common firing path to the others.

Where a plurality of such tubes is used in what is termed a closed ring, such as the accumulators hereinafter described, a perfectly regular pattern of connections is used and the last tube is used to prime the first, after which the firing of the tubes will proceed around the ring indefinitely. To start the ring into operation, the tube known as the zero tube (when ten are used in a ring as an accumulator) is primed from an outside source at the time the pulse is transmitted over the common firing circuit.

Figure 9:
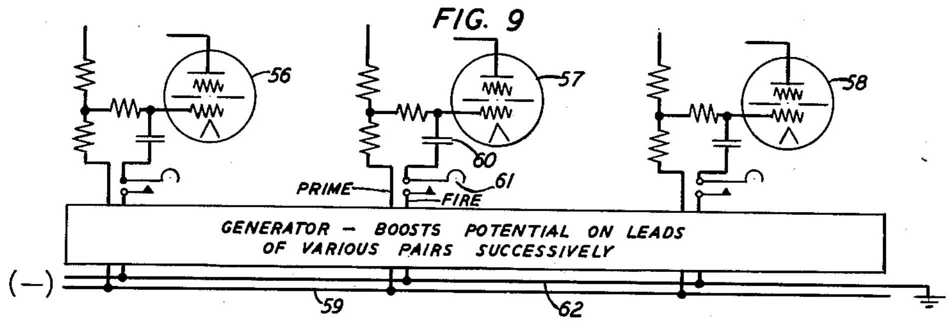
Fig. 9 is a schematic circuit diagram showing how the tubes may be selectively fired through the use of a generator which will simultaneously transmit a priming and a firing pulse.

Fig. 9 is a schematic circuit diagram showing how one of a plurality of tubes may be selectively fired. This involves the use of a generator which will be described more in detail hereinafter but which as indicated in this figure is a means for simultaneously boosting the potential on two leads, each through various paths leading to the same tube. Here three tubes 56, 57 and 58 are indicated. The tube 57, by way of example, will have the lower end of its voltage divider, usually solidly connected to the negative bus, leading through the generator and thence to the negative bus 59. Its grid condenser 60 will be connected through a normally opened key 61 and thence through the generator to a ground bus 62. The normally opened key represents any type of circuit closer and may be of the type shown in Fig. 7, that is a tube. When the preparations are complete and the key 61 is closed (or the equivalent tube has been fired) then the generator is started and will successively boost the potential on the leads of each pair. When the generator boosts the potential on each lead of the pair to the tube 57 the tube is primed over one and fired over the other. This operation in various forms will be found in the detailed description and the drawings hereinafter.

Figure 10:
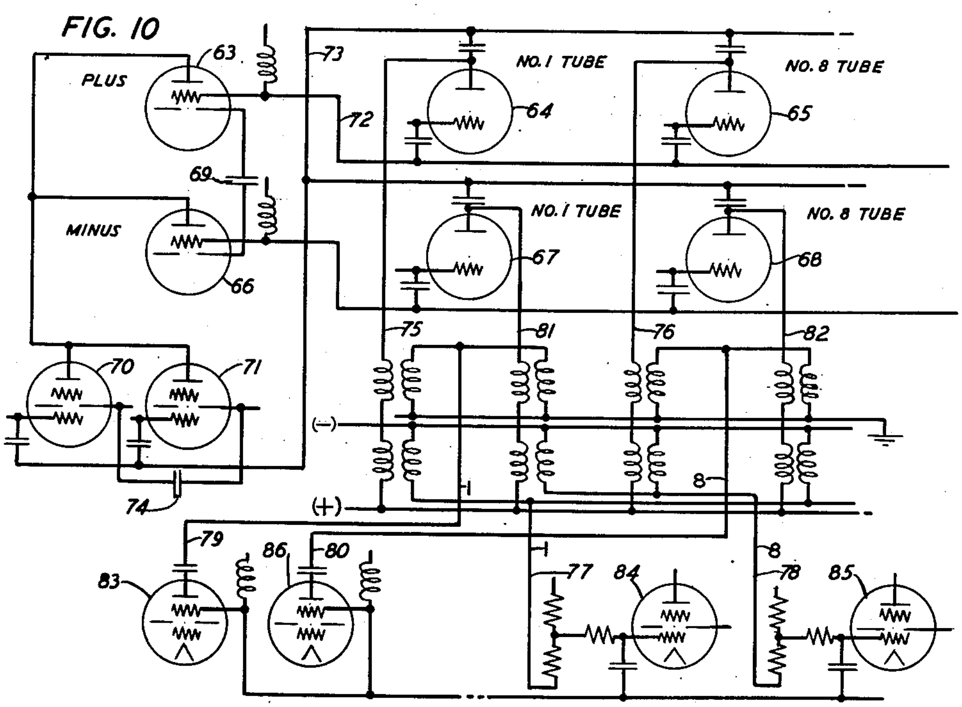
Fig. 10 is a schematic circuit diagram showing more details of the generator and the manner in which it is employed in a sign circuit so that either a number or its nine's complement may be registered as occasion demands.

Fig. 10 is a schematic circuit diagram to show the essential elements of the generator. Actually there are two generators, a positive generator comprising the plus tube 63 and an open chain of digit tubes of which the No. 1 tube 64 and the No. 8 tube 65 are shown and a negative generator comprising the minus tube 66 and an open chain of digit tubes of which the No. 1 tube 67 and the No. 8 tube 68 are shown. Through the mutual control exercised by the condenser 69 but a single generator may operate at a time. When one of the generators is started by means which will be explained in detail hereinafter there is an automatic operation carried on by a pair of driver tubes 70 and 71 and the digit tubes of the generator. One of the driver tubes will transmit a firing pulse to the common firing conductor 72 of the digit tubes of (let us say) the positive generator. The tubes of this open chain which fire will thereupon transmit a pulse into the common firing conductor 73 of the driver tubes (which are connected in a mutual control circuit by condenser 74), and the other one of these tubes is fired. These dependent operations continue until each of the digit tubes has been fired so that pulses are successively transmitted over conductors such as 75 and 76. Through the transformers which are supplied by pulses over these conductors, priming pulses are transmitted into conductors 77 and 78 respectively and firing pulses are transmitted into conductors 79 and 80, respectively.

An inspection of the drawing will show that if the negative generator had been operated that the order of the priming pulses would have been reversed, that is, that in the successive operation of the digit tubes of this generator, pulses would be successively transmitted over conductors 81 and 82 as a result of which priming pulses would be successively transmitted over conductors 78 and 77, respectively, and firing pulses would be successively transmitted over conductors 79 and 80, respectively.

With the use of entry tubes for closing through the paths to a series of register tubes various selective operations may be made. For instance, if the No. 1 entry tube 83 has been fired and the plus generator is operated then the No. 1 tube 84 of a register may be operated. If the No. 1 entry tube 83 had been fired and the negative generator had instead been operated then the No. 8 tube 85 of the same register would have been operated to register the digit 8, the nine's complement of the digit 1. If the No. 8 entry tube 86 had been fired and the plus generator had been operated the No. 8 tube 85 of the register would be operated to register the digit 8. And lastly, if the No. 8 entry tube 86 had been fired and the negative generator operated then the No. 1 tube 84 of the register would have been operated as the nine's complement of the digit 8. This arrangement is a means by which the sign circuit may be properly controlled during the switching operations for various mathematical computations as will appear more fully hereinafter.

Figure 11:
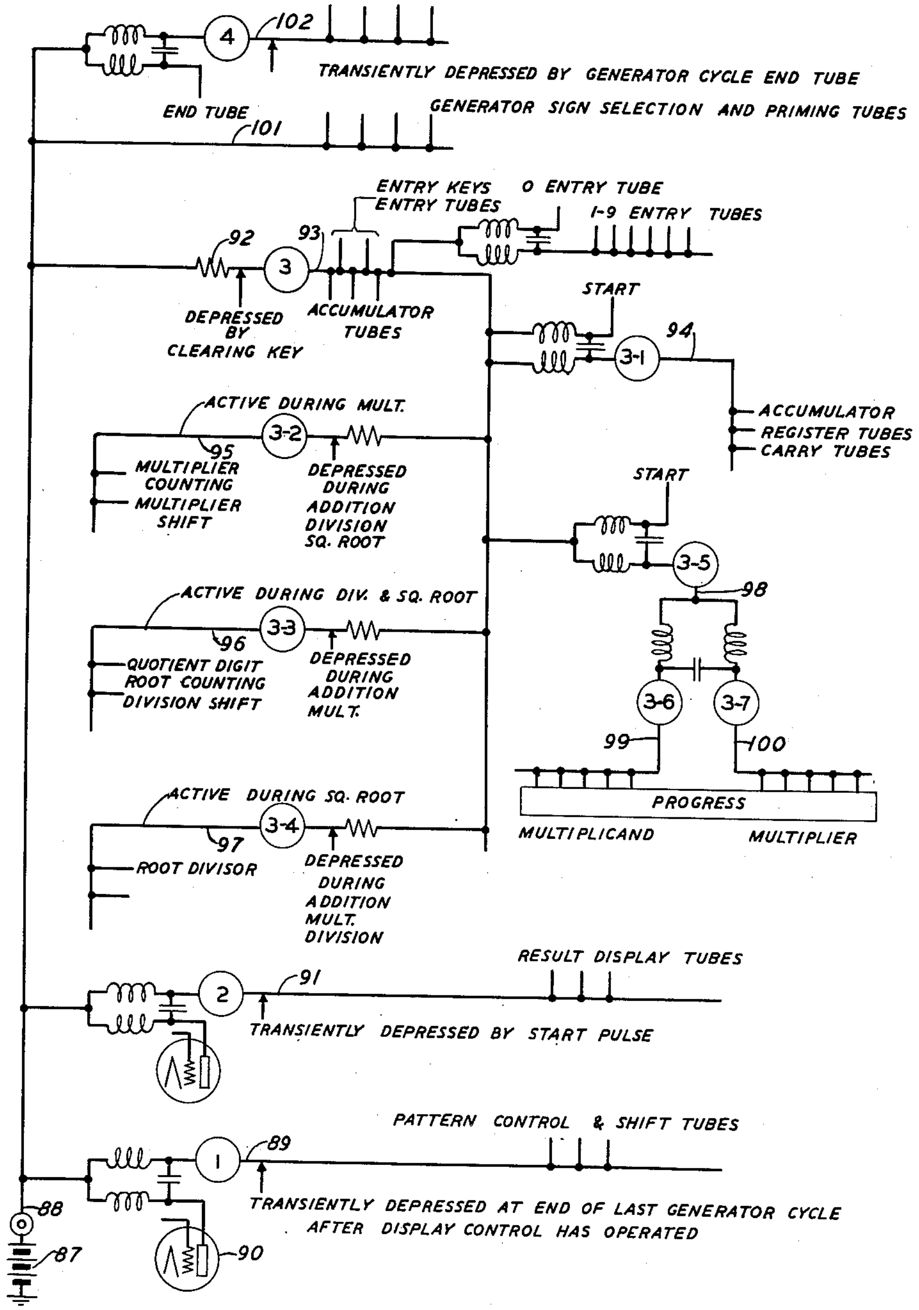
Fig. 11 is a schematic circuit diagram of what may be termed the power circuit and showing the various branches of a source of high positive potential used for the operation of the numerous tubes together with the various means for lowering the potential for given periods of time during certain operations or on a transient basis for the purposes of release.

Fig. 11 is a skeletonized circuit diagram of the power supply for the device. It is understood, of course, that a main switch will be provided between the positive battery and the positive bus and between the negative battery and the negative bus so that when the device is not in use all battery supply may be cut off. Such a switch may take the form of a switch in the power supply circuit, for the batteries may be in the form of conventional power packs by which the direct current potentials are derived from an alternating current source.

Therefore, the source of positive potential is herein represented by the battery 87 feeding into the bus 88. This bus has a number of branches, the first leading through a double coil and condenser arrangement whose operation was described in connection with Fig. 4. Through this arrangement positive potential is supplied to a bus 89 which feeds the pattern control and the shift tubes. Bus 89 has herein been shown with a circle enclosing the numeral 1 so that hereinafter, in order to make the reading of the drawings easier this convention will be used, that is, the bus will be shown as one having this circled numeral drawn in it instead of being threaded through numerous sheets of drawings. The bus 89 is labelled as one which is transiently depressed at the end of the last generator cycle after the display control has operated. This means that when at the end of a computation the control tube for operating the display tubes is fired that then a circuit for the operation of the triode 90 is prepared and this will respond to the end signal always transmitted at the end of the generator cycle. Therefore, at the end of this last generator cycle the power supply to the pattern control and the shift tubes will be transiently depressed to extinguish all these tubes, leaving the result on display.

Another branch of the main bus 88 leads to the No. 2 bus 91 feeding the result display tubes. The potential of this bus may be transiently depressed by a start pulse so that after a computation has been completed and the result displayed has been noted the next start operation will erase this display.

The next branch of the bus 88 leads through a resistor 92 to the No. 3 bus 93 which may be depressed through the operation of the clearing key. This bus has a plurality of branches such as the No. 3—1 branch 94, the 3—2 branch 95, the 3—3 branch 96 and the 3—4 branch 97. First the entry keys, the entry tubes and the accumulator tubes feed directly from the No. 3 bus 93. Each digital string of entry tubes feeds through an individual double coil and condenser arrangements whereby when the zero tubes of the entry registers are at first all fired they will automatically extinguish any other higher numbered tube which may at that time be in operation. Later upon the operation of an entry key if a higher numbered tube is fired this will automatically extinguish the previously fired zero tube.

The No. 3—1 bus 94 feeds the accumulator register and the carry tubes and may be transiently depressed when the start key is operated or in certain other cases where a pattern tube transmits a pulse over the same path affected by the start key.

The pattern tubes will control means whereby the No. 3—2 bus 95, the No. 3—3 bus 96 and the No. 3—4 bus 97 are rendered effective or otherwise so that during a given computation the proper tubes may be operated. By way of example, the No. 3—2 bus 95, as indicated on this drawing is active only during multiplication operations, to render the multiplier digit counting tubes and the multiplier digit shift tubes operative. Since none of these tubes is needed during the other patterns of operation this bus is held down in potential. The other two buses are clearly marked.

The No. 3—5 bus 98 is, like the No. 3—1 bus 94, controlled by the starting pulse. This bus feeds into the No. 3—3 bus 99 and the No. 3—7 bus 100 which mutually control each other. Both feed the progress tubes for the entry registers so that each time a progress tube of one set fires it acts to extinguish any progress tube of the other set which might be in operation.

A branch 101 of the main bus 88 feeds the generator sign selection tubes and the two generator priming tubes. The generator sign selection tubes are mutually controlling so that whenever a new selection is made, if there is a change the tube previously in operation will be extinguished. The priming tubes, of course, are each extinguished as soon as the corresponding open chain of generator impulse tubes start to progressively fire.

Lastly the No. 4 bus 102 feeds the generator tubes and may be transiently depressed by the generator cycle end tube.

In the drawings then the positive potential buses will be shown by these circled numerals as hereinbefore noted. The negative bus will be shown by a minus sign in brackets as in Figs. 8, 9 and 10.

THE SIGN CIRCUIT

*Addition*

The sign circuit is shown in schematic form in Figs. 12 and 13.

Addition and subtraction are each performed in two or more stages. The augend or the minuend is first entered, accumulated and displayed, and may be entered with the accumulators set at zero or with the result of some previous accumulation set thereon. The addition or the subtraction may be algebraic, that is the augend or the minuend may be either positive or negative. After this first stage operation then the addend or the subtrahend is entered, accumulated and the sum or the remainder is displayed in the same way, care being taken to invert the sign of the subtrahend upon entry. As many addends or subtrahends as desired may be entered.

In the sign circuit the plus sign tube 117 is invariably operated. Hence if the augend or the minuend is positive the tube 118 will be fired and the start pulse will reach the positive augend or minuend conductor 122 and through tube 170 will be transmitted over conductor 130 to select the positive generator tube 132. If the following addend is positive then the positive addend conductor 122 will again be used but if the subtrahend is positive it will be entered as a negative quantity, tube 145 will be fired and the start pulse will reach the positive subtrahend conductor 144.

In like manner the negative augend or minuend wire 144 will be reached when the augend or the minuend is negative. When the following addend is negative the negative addend wire 144 will be reached but when the subtrahend is negative the negative subtrahend wire 122 will be reached because such negative subtrahend will be entered as a positive number.

In the operation of the device, when addition or subtraction is to be performed the key 168 is operated to fire the tubes 169 and 170 and these respectively place the negative generator selector tube 133 in communication with the negative wire 144 and the positive generator selector tube 132 in communication with the positive wire 122. With tubes 169 and 170 both fired a pulse on conductor 144 will pass through tube 169 and be transmitted over conductor 131 to the tube 133 and in like manner a pulse on conductor 122 will find a path through tube 170 and conductor 130 to tube 132.

*Multiplication*

Multiplication may be performed in two ways (1) by the iterative addition of the multiplicand a number of times controlled by the multiplier and (2) by the iterative addition of the complement of the multiplicand a number of times controlled by the multiplier. Let us call the first multiplication and the second inverted multiplication. In the first case the product will appear in its natural form and be displayed in that form while in the second case the product will appear in the form of a complement but will be displayed in its natural form although characterized by the display of the negative sign.

Both the multiplier and the multiplicand are entered before the start of the operation is signalled. Therefore either tube 117 (for plus multiplier) or 142 (for minus multiplier) and 118 and 119 (for plus multiplicand) or 145 and 143 (for minus multiplicand) are fired so that the start pulse will reach the positive product conductor 122 when the signs of the multiplier and the multiplicand are alike and will reach the negative product conductor 144 when the signs of the multiplier and the multiplicand are different. When the positive conductor 122 is effective then the positive generator selector tube 132 is fired through the tube 170 and the operation of multiplication is performed. When the negative conductor 144 is effective then the negative generator selector tube 133 is fired through the tube 169 and the operation of inverted multiplication is performed.

During the course of the accumulations there will have been, in multiplication at least one instance in which the zero tube of the highest order accumulator was effective so that the positive memory tube 151 is fired and likewise in inverted multiplication there has been at least one instance in which the number nine tube of that accumulator was effective so that the negative memory tube 152 is fired. Thus, the final accumulation in multiplication or inverted multiplication is reached with one or the other of the memory tubes fired. If the combination of the entry sign tubes indicates a positive product then the plus memory tube will be effective even though there may have been a carry into this highest order accumulator so that the zero tube 134 will not be effective on such final accumulation. If the combination of the entry sign tubes indicates a negative product then the negative memory tube 152 will be effective even though the nine tube of this highest order accumulator is not effective on such final accumulation. Therefore, the display pulse from tube 171 will pass through the plus memory tube 151 to select the positive generator and to operate the positive display tube 155 or will pass through the negative memory tube 152 to select the negative generator to display the complement of the value accumulated and to operate the negative display tube 156. Hence the product is always properly displayed in its natural form even though it may have been calculated by inverted multiplication.

*Division*

Division may be performed in two ways, (1) by the iterative addition of the complement of the divisor to exhaust the dividend and (2) by the iterative addition of the divisor to exhaust the complement of the dividend. Let us call the first division and the second inverted division. The result in both cases is the same for the quotient digits consist of the counts of the number of summing operation. The sign of the quotient is independently derived by the combinations of the signs of the dividend and the divisor, but the display of the sign is controlled by the computations.

In any case the procedure is to iteratively subtract the divisor until an overdraft is made whereupon the divisor is restored and then a shift is made to start the computation of the next quotient digit. If the first quotient digit proves to be five (by way of example) these operations will produce a succession of five positive remainders and upon the sixth trial a negative remainder whereupon the addition of the divisor to restore the overdraft which caused the negative remainder will produce a positive sum. Thus, a sign indicating means will report a succession of five plus signs, a single negative sign and finally a plus sign. It is evident that this last plus sign must constitute a signal to shift preparatory to the calculation of the next quotient digit. In a similar manner if this had been inverted division then the sign indicating means would report a succession of five minus signs, a single plus sign and finally a minus sign and this last minus sign must constitute a signal to shift. In the first case the circuits must be non-responsive to the first succession of five plus signs and in the second case they must be non-responsive to the first succession of five minus signs. In the first case the single negative sign must be used to prepare the circuits to be responsive to the following plus sign and likewise in the second case the single plus sign must be used to prepare the circuits to be responsive to the following minus sign. The first succession of like signs in either case cannot be used in a preparatory way since this succession may vary from 0 to 9 and hence there may or may not be such a signal. Hence in the first case the single negative sign is the first to be usefully employed and likewise in the second case the single plus sign is the first to be usefully employed.

In Fig. 13 the first succession of plus signs in division or of minus signs in inverted division is transmitted as a succession of pulses over conductor 110 but since the tube 112 is not active at this time these pulses are not usefully employed. The following single negative sign in division or the single plus sign in inverted division is transmitted as a pulse over conductor 111 and is usefully employed to fire the tube 112. Therefore, the last positive sign in division or negative sign in inverted division when transmitted as a pulse over conductor 110 is further transmitted through the fired tube 112 to fire the tube 113 which creates a pulse to transmit out over conductor 114 to cause a shift from one quotient digit counter to the next. This at the same time fires tube 115 which through the condenser 116 extinguishes the tube 112 preparatory to the following operations for the calculation of the next quotient digit.

Now let us consider the organization of the sign circuits to bring this result about. There are four possible sign combinations, considering that the dividend may be either positive or negative and the divisor may be either positive or negative.

Let us assume the dividend to be positive and the divisor to be positive. In that case tube 117 is fired to represent the positive dividend and tubes 118 and 119 are fired to represent the positive divisor. Therefore, when the start key 120 is operated a pulse will be transmitted over the start conductor 121 and will find a path through tubes 117 and 118 to the conductor 122 which may be termed the positive quotient conductor. Since the division key 123 has previously fired the two tubes 124 and 125, this start pulse over the positive quotient conductor 122 will now pass through the tube 124 to conductor 126 where it will fire the tube 128 to select the positive generator on the start. The firing of tube 128 transmits a pulse over conductor 130 to fire the positive generator selector tube 132 with the result that the dividend is transferred from the entry tubes to the accumulator register as a positive number. Thereafter when this dividend has been again transferred to the accumulator the positive sign indicator tube 134 will be fired.

Now the pulse over conductor 126 has fired the four tubes 138, 139, 140 and 141 so that when the positive sign indicator tube 134 passes a pulse to the conductor 136 it is passed through the tube 138 to conductor 131 to fire the tube 133 to select the negative generator. Therefore, the complement of the divisor will be entered in the accumulator register. The pulse over conductor 136 will also be passed through tube 140 to conductor 110 without result at present.

Since the dividend has been entered into the accumulator as a positive number and the divisor has been transferred to the accumulator register as a negative number the operation will be classed as one in division.

Now let us consider the operations when both the dividend and the divisor are negative. In this case the start pulse on conductor 121 will be passed through tubes 142 and 143 and again over the positive quotient conductor 122 with exactly the same results as above described. It should therefore be especially noted that although the dividend is actually negative it will (because the divisor is also negative) be treated as a positive number and will be entered in the accumulator register as a positive number and thereafter be transferred to the accumulator as a positive number. The operation will be classed as one in division and not as one in inverted division.

Now let us take the third case, where the dividend is negative and the divisor is positive, and the fourth case where the dividend is positive and the divisor is negative. In both of these cases it is quite evident that the quotient will be negative. Now, when the start pulse is transmitted over the start conductor 121, in the third case it will pass through the tubes 142 and 119 to the negative quotient conductor 144 and in the fourth case it will pass through the tubes 117 and 145 to the negative quotient conductor 144. Therefore, in each case the pulse will pass through the tube 125 to the conductor 127 to fire tubes 146, 147, 148 and 149. The pulse will also fire tube 129 which in firing will send a pulse over conductor 131 to select for operation the negative generator by its tube 133 whereby the complement of the dividend is transferred to the accumulator register. When this quantity is finally put into the accumulator the negative sign indicator tube 135 will be operated and in time this will cause a pulse to be transmitted over conductor 137 and thence in one direction through tube 147 to start the positive generator and in the other direction through tube 149 to the conductor 110. When the overdraft occurs then a pulse will be sent over conductor 136 in one direction through tube 146 to start the negative generator and in the other direction through tube 148 to conductor 111 to fire tube 112. When the overdraft is restored the final pulse will be one transmitted over conductor 137 to start the positive generator and to pass a pulse through tube 112 to fire the tube 113 to cause the shift.

Thus where the quotient is going to be negative the operation is one in inverted division and regardless of the actual sign of the dividend as entered it will be transferred from the entry tubes to the accumulator register tubes as a negative number (the complement of the number registered in the entry register).

When the quotient which has been calculated is to be displayed a pulse is transmitted over conductor 150. There is a pair of memory tubes 151 and 152 which mutually control each other and which are fired over the conductors 136 and 137, respectively. Now when the quotient is positive (conductor 122) the final remainder on the restoration of the last overdraft will be positive and therefore the memory tube 151 will have been fired over the conductor 136. Hence the display pulse over conductor 150 will fire both tubes 153 and 154 as well as tube 171. The firing of tube 171 creates a pulse which is now transmitted through the memory tube 151, and the tube 153 to fire the positive sign display tube 155. Likewise if the quotient is to be negative (conductor 144) the final remainder on the restoration of the last overdraft will be negative so that the memory tube 152 will be fired so that the pulse created by the display control tube 171 will be transmitted through tubes 152 and 154 to fire the negative sign display tube 156.

*Square root*

Square root extraction, like division, may be performed in two ways, (1) by the iterative addition of the complement of the root divisor to exhaust the number whose root is being sought and herein for convenience called the square and (2) by the iterative addition of the root divisor to exhaust the complement of the square. Let us call the first root extraction and the second inverted root extraction. The result in both cases is the same for the root digits consist of the counts of the number of summing operations using synthesized subtrahends. The sign of the root will be the same as the sign of the square, a minus sign of a root representing the square root of minus 1.

In either case the procedure is to iteratively add the synthesized subtrahends until an overdraft is made, whereupon the last used subtrahend is restored and then a shift is made to start the computation of the next root digit. If the first root digit proves to be five (by way of example) these operations will produce a succession of five remainders and upon the sixth trial a negative remainder whereupon the addition of the last used subtrahend to restore the overdraft which caused the negative remainder will produce a positive sum. Thus a sign indicating means will report a succession of five plus signs, a single negative sign and finally a plus sign. In this (square root) case the negative sign constitutes a signal to shift preparatory to the synthesis of the next subtrahend and the calculation of the next root digit. In a similar manner, if this had been inverted root extraction, then the sign indicating means would report a succession of five minus signs, a single plus sign and finally a minus sign and the single plus sign would constitute a signal to shift. In the first case, the circuits must be non-responsive to the first succession of five plus signs and in the second case they must be non-responsive to the first succession of five minus signs. In the first case the single negative sign must be used to prepare the circuits to be responsive to the generator and pulse and likewise in the second case the single plus sign must be used to prepare the circuits to be responsive to this generator end pulse. The first succession of like signs in either case cannot be used in a preparatory way since this succession may vary from 0 to 9 and hence there may or may not be such a signal. Hence in the first case, the single negative sign is the first to be usefully employed and likewise in the second case the single plus sign is the first to be usefully employed.

In Fig. 13 the first succession of plus signs in square root or of minus signs in inverted square root is transmitted as a succession of pulses over conductor 157 but since the tube 159 is not in control of the shift these pulses are not usefully employed for this purpose. The following single negative sign in square root or the single plus sign in inverted square root is transmitted as a pulse over conductor 158 and passes through tube 160 to fire tube 161 whereby the pulse at the end of the generator cycle used for the restoration of the last used root divisor may be passed through tube 161 to cause the shift from one subtrahend synthesizing counter to the next and to fire tube 159 so that it will be responsive to the last positive sign in square root or negative sign in inverted square root when transmitted after the completion of the carry operations as a pulse over conductor 157. Tubes 159 and 161 are in mutual control of each other so that as soon as 159 is fired it will cause 161 to be extinguished preparatory to the following operations for the calculation of the next root digit.

Now let us consider the organization of the sign circuits to bring this result above. There are only two sign combinations that are used since the entry of the number whose square root is to be subtracted is always on the tubes used otherwise for entering a multiplier or a dividend. Hence the sign tubes associated with the entry tubes for the multiplicand, the divisor, an augend or an addend are always positive that is the plus sign tubes 118 and 119 will invariably be operated, and in the case of a positive square the start pulse will be transmitted through tubes 117 and 118 to the positive root wire 122 and in the case of a negative square the start pulse will be transmitted through tubes 142 and 119 to the negative root wire 144. Since the square root key 163 has previously fired the two tubes 124 and 125 the results will be the same as described under division except that in division the tubes 140, 141, 148 and 149 are operative whereas in square root the tubes 164 to 167, inclusive are operative.

One other difference is to be noted. In division the first succession of like pulses over conductor 110 is not usefully employed since the divisor during the calculation of any one quotient digit remains fixed. The like succession of pulses over conductor 157 is however usefully employed in square root for the purpose of changing the root divisor on each operation. Hence the arrangement for shifting between subtrahend synthesizing counters is slightly different from the previously described arrangement for shifting between quotient digit or root digit counters. The shift control tubes 159 to 161 and 164 to 167 are labeled 3—4 to indicate that they are active only in square root whereas the tubes 112 to 115, 140, 141, 148 and 149 are labeled 3—3 to indicate that they are active both in division and square root.

*The memory tubes*

There is a pair of memory tubes, so called because their function is to remember the sign of a quantity once placed in the accumulators and not thereafter changed which are used at the time the display is to be made to report this sign and to control the display so that the number although perhaps calculated in the form of its complement is displayed in its true form.

In the arrangement herein disclosed the highest (the thousands) order accumulator serves a dual purpose, that of a sign indicator and of an extra left-hand order for the accumulation of carries. It will be realized that for the utmost accuracy separate accumulators must be provided for these two separate functions, but the present arrangement is sufficiently operative to illustrate the principle of operation of a device of enough greater capacity to have practical utility. It is, of course, understood that while digits other than zero may be entered in the thousands place it is intended that only three digit numbers (hundreds, tens and units) be used in the calculations and that the thousands place be used for entry only when the operator understands the limitations of the device and makes due allowance for operations thereof. It is intended that every number entered be in the form of a zero followed by the three digits of the number used in calculation. The zero is a sign indicator and stands for plus or the positive sign. When a minus sign is entered to characterize a number the zero entered is inverted in transfer from the entry tubes to the accumulator register to nine, its nine's complement and thus the nine stands for minus or the negative sign.

Therefore, in the accumulator the zero tube controls the positive memory tube and the number nine tube controls the negative memory tube. If at the end of a calculating operation the positive memory tube is in operation the display signal will cause the plus sign to be displayed and the accumulated sum to be displayed in the form in which it is registered in the accumulators. If on the other hand the negative memory tube is in operation at this time, this will be an indication that the accumulated number is in its complemental form, so the minus sign will be displayed and the number inverted in its transfer from the accumulator tubes to the display tubes so as to be displayed in its true form.

On the start of a new operation the accumulators are all automatically set to zero. Therefore, the positive memeory tube is fired and this tube will remain in its fired condition throughout an indefinite number of accumulations until the nine tube of the thousands accumulator is definitely fired. Let us assume the following example of calculation 345+823+756+242=2166. At the start of operations the four accumulators will be set to 0000, and the plus memory tube will be operated. Thereupon the number 0345 is entered and transferred to the accumulators, whereupon a signal to operate the plus memory tube is again transmitted but is ineffective since this tube is already in operation. The partial result is displayed as +0345. Next the number 0823 is entered and then transferred to the accumulators so that the accumulation becomes 1168. No signal to the memory tubes is sent at this time, but the plus memory tube having previously been fired remains in operation so that the partial result is displayed as +1168. Now the number 0756 is entered, accumulated and the partial result +1924 is displayed. Again the number 0242 is entered and accumulated, now changing the registration in the thousands accumulator from one to two. No new signal is sent to the memory tubes so that the plus memory tube continues to be operative and thus the now final result is displayed as +2166.

Now it will be understood that the present arrangement is for the purpose of illustration and that it is not intended that the device be operated for the addition of more and more numbers until the digit in the thousands place changes to a nine, so it will be recognized here that the apparent erroneous operation that would result from such circumstances is not a sign of inoperativeness but rather an operation of the device beyond its capacity and that for the purpose of illustration it is not necessary to provide the extra apparatus needed to make extraordinary calculations. Likewise in multiplication it is possible by multiplying two numbers such as 0950 or higher together to produce a nine in the thousands place and thus cause the (erroneous) display of a negative number. When these limitations, which in a full sized practically useful device would be eliminated in known manner, are understood, it will be seen that the memory tubes will operate over a wide range. Thus in addition the plus memory tube, once fired, will continue to operate regardless of any digit other than nine which may appear in the thousands accumulator. Likewise if the alegbraic sum of −0567, −0844 and −0799 equalling −2210 is calculated the device is first set to zero and the plus memory tube is fired. However, the first minus number (−0567) is entered and in transfer to the accumulator is inverted to its complement 9433 so that the minus memory tube is fired (extinguishing the previously fired plus memory tube) and the partial result is displayed as −0567, thus being again inverted in transfer from the accumulator to the display tubes. Now the number −0844 is entered and upon transfer to the accumulator is inverted to 9156 which added to the number 9433 already in the accumulator produces the sum 8589. This time there is no new signal to the minus memory tube but it nevertheless remains in operation so that the display becomes −1411. Lastly, the number −0799 is entered and in transfer to the accumulator is inverted to 9201 which added to the 8589 in the accumulator makes the sum 7790. The minus memory tube remains operated and the now final result is displayed as −2210.

As another example let us explain the algebraic sum of the numbers −0567, +0321 and +0428 equalling +0182. At the start of the operation the accumulators are set to zero and therefore the plus memory tube is fired. Now the number −0567 is entered and in transfer to the accumulators is inverted to 9433 so that now the minus memory tube is fired. Therefore, the minus sign display tube is fired and in transfer from the accumulators to the display tubes the number 9433 is inverted and thus displayed as −0567. Next the number +0321 is entered and upon being added to the number 9433 in the accumulators produces the sum 9754, so that the operation of the minus memory tube is not disturbed and this sum is displayed as −0246. Lastly, the number +0428 is entered and being added to the 9754 in the accumulator produces the sum 0182. Therefore, the plus memory tube is now fired, the minus memory tube is extinguished and the number is displayed as +0182.

In multiplication, it will be remembered that the sign of the product is determined by the combination of the signs of the multiplicand and the multiplier and that regardless of the individual signs of the factors both the multiplicand and the multiplier are transferred to the accumulators in their true forms if the product is to be plus or in the forms of complements if the product is to be minus.

In the first case the plus memory tube is fired when the accumulators are set to zero and since no latter accumulation will increase the digit in the thousands accumulator to nine the plus memory tube will be in operation when the display is to be made.

In the other case the plus memory tube is fired when the accumulators are set to zero but upon the first transfer of the multiplicand inverted to its complement the minus memory tube is fired (thus extinguishing the plus memory tube) and since no later accumulation will produce a zero in the thousands accumulator the minus memory tube will be in operation when the display is to be made.

In division and square root the actions of the memory tubes are much more intricate. It will be remembered that the sign of the quotient is determined by the combination of the signs of the dividend and the divisor and that regardless of the individual signs of either the dividend is transferred to the accumulators as a positive number and the divisor as a complement when the quotient is to be positive and the dividend is transferred as a complement and the divisor in its true form when the quotient is to be negative. It will be remembered also that in the first case the final remainder will be positive and in the second case the final remainder will be negative.

Now where the remainder is positive the circuits are arranged so that the following entry of the divisor will be negative, that is in the form of a complement and therefore the negative generator selector tube is fired. However, the final remainder is positive and therefore the plus memory tube is operative so when the signal to display is transmitted it is passed through this positive memory tube to not only cause the display of the plus sign but to fire the plus generator selector tube and to extinguish the minus generator selector tube.

Likewise where the remainder is negative the circuits are arranged so that the following entry of the divisor will be in its true form, or positive and therefore the positive generator selector tube is fired. However, the final remainder is negative and therefore the minus memory tube is operative so when the signal to display is transmitted it is passed through this negative memory tube to not only cause the display of the minus sign but to fire the negative generator selector tube and to extinguish the plus generator tube.

It should also be noted that the quotient is always positive, that is it consists of three digits resulting from a count of the number of operations performed and hence it is never calculated in the form of a complement. Therefore, regardless of whether or not the remainder is inverted in transmission from the accumulators to the display tubes and regardless of whether the plus or minus sign is displayed, the quotient is always transferred and displayed in its calculated form. Thus we have one instance in which part of the final display comes to the display tubes in one form and another part in another form.

In square root calculations the same operations as in division take place. If the square is positive, then it, like the dividend is transferred to the accumulators as a positive number and the root and the remainder are displayed as positive numbers. If the square is negative, then it like the dividend is transferred to the accumulators as a complement and the display is of a negative sign representing the square root of minus one with the root and the remainder in their natural forms.

In Fig. 12 it will be noted that when the display signal is transmitted over the conductor 150, five tubes, namely 153, 154, 171, 172 and 173 are simultaneously fired. If the plus memory tube 151 has been fired then the pulse created by the tube 171 will pass through tube 153 to cause the display of the plus sign and pass through tube 172 to fire the plus generator selector tube 132. If on the other hand the minus memory tube had been fired, then the pulse from tube 171 would pass through tube 154 to cause the display of the minus sign and pass through tube 173 to fire the minus generator selector tube 133 so that the remainder will be inverted in transmission to the display tubes.

*The start circuit*

Since most of the operations in the device disclosed herein depend on a cycle of operation of the pulse generator the various means of starting the generator are of interest and should be clearly understood.

The generator is first used in entering the digits of the numbers comprising the factors of the problem. This is represented in Fig. 14 by a number of digit keys 180, 181, 182 and 183, any one of which on operation will cause a tube 184 to be fired and which in turn will transmit a pulse into the start wire 185 of the generator.

After the problem has been entered and the device is ready to start the computation the operator will operate the start key 186. This will transmit a start pulse through a combination of sign tubes, fired to characterize the entered factors. Where by way of example the problem is to be one in multiplication, the tube 187 will be fired for a positive multiplier, 188 for a negative multiplier, 189 and 190 for a positive multiplicand and 191 and 192 for a negative multiplicand. If the multiplier and multiplicand are both positive then the start pulse will be passed through tubes 187 and 189 to the positive product wire 193 thence through a positive gate tube 194 to the start wire 195. Under any condition the start pulse from the key 186 will reach the start wire 195, and under any condition it will fire the tube 196 to clear or extinguish the display tubes, fired at the end of a previous calculation, by affecting the triode 197.

It will be noted that there is a tube for each type of problem which will pass the start pulse. Thus for addition the tube 198 will immediately pass the start pulse to the generator start wire 185. For multiplication the tube 199 will be effective to pass the start pulse to fire a tube 200 which in turn will, through a delay network fire the tube 201. Tube 201 transmits a pulse into the generator start wire 185. For division, a tube 202 and for square root a tube 203 will pass the start pulse to fire a tube 204 which in turn will transmit a pulse into the generator start wire 185.

During the calculation and at the end of each operation of the accumulator when the carry operations have been completed a pulse will be transmitted over the wire 205 to fire the tube 206. In addition (or subtraction) there will be one cycle of the generator to transfer the amount from the entry tubes to the accumulators and then the final cycle to transfer the accumulated amount to the display tubes. Therefore, the pulse over wire 205 and through tube 206 will be by-passed through a tube 207 to fire the addition display signal tube 208 which in turn fires the final display signal tube 209 to transmit a pulse into the generator start wire 185.

In all other types of computation there will be a series or plurality of operations controlled by counting means, in multiplication to count the iterative additions of the multiplicand, and in division and square root to count the iterative subtraction of the divisor or the so-called root divisor. Therefore, in all intermediate operations in multiplication the pulse from tube 206 will cause the operation of one or another of the counting tubes 210, 211 or 212 any one of which will transmit a pulse into the generator start wire 185. After the computation has been completed the final pulse from the tube 206 will fire the tube 213 which thereupon fires the final display signal tube 209 to start the generator on its final cycle for the transfer of the accumulated product to the display tubes.

In division or square root at the end of each subtraction of the divisor or the root divisor the pulse from tube 206 will pass through tube 214 to fire some one or another of the counting tubes 215, 216 or 217 any one of which will transmit a pulse into the generator start wire 185. After the computation has been completed the final pulse from the tube 206 will fire the tube 213 which thereupon fires the final display signal tube 209 to start the generator on its final cycle for the transfer of the calculated quotient or root and the accumulated remainder to the display tubes.

It is believed that with the help of Figs. 12 and 13 showing schematically how the positive and negative generators are selected and with Fig. 14 showing schematically how the selected generator is started under various conditions, the complete circuit diagrams may be easily followed.

GENERAL ORGANIZATION OF THE SYSTEM

The remaining part of this specification will comprise a description of the system as a whole. While it will be more convenient to describe certain parts as units, such parts are all shown together in the drawings as indicated in Fig. 15. It is to be observed that the various numerals applied to the elements of the circuits each consists of four digits, the first two of which correspond to the number of the figure. It may also be observed that where a circuit extends through several figures its figure designating numeral will indicate in which figure the circuit originated so that the reader may at once turn to such figure to find the origin thereof. It will also be helpful to have Fig. 11 at hand so as to identify the various power leads and have a quick reference to the conditions under which they are operative or the conditions under which the potentials thereof are depressed.

The system in general consists of a bank of operating keys for controlling a bank of vacuum tubes. There is one key for each different pattern of operation, that is, one key for addition or subtraction, one key for multiplication, one key for division and one key for square root. Next there is a positive and a negative sign key and ten digit keys. This single set of digit keys is used for writing up the digital values in all the various decimal denominational orders for all the factors of a problem. There is also a clearing key for erasing any amount standing on the accumulators and resetting them to zero as well as for initially setting the accumulators to zero at the start of a new problem when the device is first put into operation. And lastly there is a start key to start operations after a problem has been properly entered.

The system next includes a system of sign tubes, four for the first factor entered and two for the second factor entered whereby the sign of the result when it depends on the signs of the entered factors alone is at once determined. The determined sign of the result will control the pattern of operations, that is, by way of example, if in multiplication the signs of the multiplicand and the multiplier are different it is at once apparent that the product will be negative and in this case the calculation will be performed by the iterative addition of the complement of the multiplicand in accordance with the value of the multiplier digits.

The system next includes a set of entry registers each consisting of ten tubes to register the ten digital values. In the system disclosed for the purpose of demonstrating the operativeness of the means employed there are eight registers for registering two four-digit factors. The device is capable of making simple additions of two four-digit numbers where no carry to a higher decimal order is produced or any additions of two three-digit numbers. The device may also perform multiplication with reasonable accuracy of two three-digit numbers or with strict accuracy of two two-digit numbers. In division the device will produce a three-digit quotient, the accuracy of which will depend on the number of digits used in the dividend and divisor. In square root the root will also be limited to three digits.

If the eight entry registers are listed in the order in which they are filled through the operation of the digit keys, then the numbers written up will be as follows:

| | 1 Thousands | 2 Hundreds | 3 Tens | 4 Units | 5 Thousands | 6 Hundreds | 7 Tens | 8 Units |
|---|---|---|---|---|---|---|---|---|
| Addition | Augend or Addend | | | | | | | |
| Subtraction | Minuend or Subtrahend | | | | | | | |
| Multiplication | Multiplicand | | | | Multiplier | | | |
| Division | Divisor | | | | Dividend | | | |
| Square Root | | | | | Square | | | |

From the above it will be noted that the fifth, sixth, seventh and eighth registers are not employed in addition and subtraction and that in square root the first, second, third and fourth registers are not employed.

The reason for serially listing the eight registers as above is found in the fact that a progress circuit is employed for progressively associating the entry keys with each of these registers in turn, that is, upon the depression of one digit key a corresponding digital value will be registered in the first register and the progress circuit advanced so that upon the next depression of either the same or any one of the other digit keys a digital value will be registered in the next register.

One aspect of the entry registers is that upon the operation of a pattern key such as the addition key or the multiplication key each of the registers has its zero tube automatically fired and the plus sign tubes for both factors automatically fired thus automatically setting the entry registers to read +0 0 0 0 +0 0 0 0 before any digital or sign key is operated. The later operation of other digital or sign keys will change this setting.

For the purpose of operating the tubes of the registers from the digital keys and for the purpose of transferring numbers from the entry registers to the accumulator registers and from the accumulators to the display means as will shortly appear, a pulse generator is employed. This comprises an open chain of tubes which when started will sequentially transmit a pulse over each of ten digital conductors. The generator, so called, actually comprises two such generators, one called a positive generator and the other a negative generator. When the positive generator is used to transfer a number from one place to another it will do so without change, but when the negative generator is used the number will be inverted to its nine's complement in transfer. The generator includes a selecting means whereby the positive or the negative generator may be selected, a starting means for starting the selected generator and a stopping means whereby the action of the generator may be stopped at any stage of its operation although this means is only employed in one particular operation. Upon each operation of a digital key the positive generator is invariably selected and started and functions to cause the operation of the tube in the register now associated with the entry keys corresponding to the key depressed. The digits are thus invariably entered into the entry registers in their true form regardless of the entered sign of the factor. The negative or complemental form of a factor does not appear until after transfer from the entry tubes to the accumulator register tubes.

Next, in turn, come what may be termed the pattern tubes. Each pattern key controls a plurality of different pattern tubes which determine the particular sort of circuit changes that must be performed for each different kind of operation. In addition to the individual pattern tubes there are others common to the pattern keys operated by the individual pattern tubes which control the power supply to various groups of tubes. There are mainly three power supply leads (Fig. 11), none of which is active for addition, one of which (3—2) is active for multiplication, another of which (3—3) is active for division and two of which (3—3 and 3—4) are active for square root.

There are a plurality of what are known as shift tubes which control the paths between the entry tubes and the accumulator register tubes. For instance in multiplication four tubes are used to provide four paths from the thousands, hundreds, tens and units entry registers to the corresponding accumulator register orders for transferring the multiplicand. In addition, there is a multiplier digit shift tube to provide communication between the entry register holding the first multiplier digit and the means for counting the number of iterative additions of the multiplicand to be made. When this count has been satisfied a shift is made, the shift tubes just used being dismissed and a new set fired. After this first shift is made then the thousands place in the entry register is put in communication with the hundreds accumulator register and so on and the next multiplier digit to be used is put in communication with the counting means. As many sets of shift tubes as there are multiplier digits to be used are provided, herein, by way of example, three sets. At the end of the operations on the third shift another shift is made this time to produce a signal to display whereby the amount standing on the accumulators is transferred to the display tubes and all the patterns and shift tubes dismissed.

There are also provided tubes to automatically fill in zeros (or nines in the case of a complement) in those orders of the accumulator registers when the shift carries such orders beyond communication with an entry register.

Next in order should be mentioned the accumulators and their registers. Each such unit consists of two closely associated sets of tubes, the accumulator being a closed ring of ten tubes and the accumulator register being an open chain of ten tubes. When a number or its complement is transferred from an entry register to the accumulator register the tube in the latter corresponding to the fired tube in the former is fired. Immediately this fires the next primed tube in the accumulator, which results in the firing of the next primed tube in the accumulator register which results in the firing of the next primed tube in the accumulator and so on until the accumulator register is run down to zero and the accumulator is run up a corresponding number. Thus the value brought over from the entry register is accumulated.

As part of the accumulator there is an eleventh tube which is operated each time the value in the accumulator passes from its number nine to its number zero tube which controls the carry circuit. Also there is a tube associated with each accumulator register which is fired each time such register becomes completely run down as a signal that the number transferred thereto has been completely accumulated. These last tubes control what is known as the carry circuit so that when all four (in the presently disclosed calculator) are in operation one of the two carry start tubes will forward the signal to the carry circuit. Two carry start tubes are provided, one operated whenever a value is transferred without change from the entry registers and the other when a value is inverted in transfer. The latter operates to add one to the lowest order accumulator to compensate for the fact that inversion is on the basis of the nine's complement. In the following operation any carries which are registered or which are produced during the carry operations are added to the next higher order accumulator. When all such carries are satisfied a carry complete signal is produced for the purpose of starting the next transfer operation.

The highest or thousands order accumulator is used for sign control. Zero is an indication of plus and nine is an indication of minus. By the use of a pair of memory tubes, once the zero tube of this first order has been fired to indicate a positive quantity the sign indication will remain positive until the No. 9 tube has been definitely fired even though any one or all of the other tubes 1 to 8, inclusive, come from time to time in operation. Likewise, after the No. 9 tube has been fired the indication will remain negative until the No. 0 tube is definitely fired even though any one or all of the other tubes 8 to 1, inclusive, come from time to time in operation. The memory tubes exercise an important function in the display operations which will be shortly described.

The next elements of importance are the counting tubes. There is one string of counting tubes for multiplication and three strings for division. In the arrangement for multiplication some one of the counting tubes is selectively fired by each multiplier digit and the string is then counted down to zero whereupon the shift tubes are operated and another multiplier digit is used. There is a special zero tube used when a zero multiplier digit is encountered. Since the generator must be in operation to transfer any value including the value of a multiplier digit to the counting tubes and the shift takes place as soon as a counting tube, including this special zero tube, fires the generator must be stopped so that no value may thereafter be transferred until the next generator operation. For this purpose the signal for causing the shift is also transmitted to the stop tube of the generator.

In the arrangement for division and for square root three quotient digits or root digits are calculated so that as many strings of counting tubes are provided. Each counting tube chain counts up as the divisor or root divisor, so called, is iteratively subtracted from the dividend or square. When the proper quotient digit is found, by calculating an overdraft and then restoring it, a shift tube of a string individual to these quotient digit shift tubes operates and brings into operation the next string of counting tubes, leaving the previously calculated quotient digit registered until it can be transferred to the display tubes.

For division there is provided in the sign circuit a group of four tubes forming a double-pole, double-throw switching arrangement, popularly known as a flip-flop, for controlling the successive selection of the plus and minus generators in accordance with the sign of the previously calculated remainder and another such organization of tubes to control the shift from the counting of one quotient digit to another. An additional shift control set of tubes alternatively employed with the last-named set is used for square root operations. The same set is not used for both operations because the iterative subtractions in division and square root are not exactly the same. In division it is the divisor which is iteratively subtracted from the dividend while in square root a synthetically produced root divisor, changed on each operation, is subtracted from the square.

For this latter purpose there is provided three strings of what might be termed counting tubes for synthesizing the values to be successively subtracted from the square. They may roughly be called counting tubes for they are numbered and are equal to a digital string of tubes and they do operate according to successive numbers though in this case in accordance with successive odd numbers (the series 1, 3, 5, 7 and so forth). When an overdraft has been made there is a peculiar or novel arrangement for subtracting one from the last number synthesized in order to form the next so called root divisor.

There is among the shift tubes, hereinbefore mentioned, a set of four tubes for putting the root divisor synthesizing tubes into communication with the shift tubes and thus into communication with the accumulator registers so that this synthetic value may be handled in the same manner as a divisor in the operations of division.

Further, there are among the square root tubes, certain additional tubes for carry and transfer purposes necessary in the synthetic formation of the root divisor and progress tubes for properly changing the growth of this value as roots are successfully calculated. This can be understood when it is mentioned that the root divisor grows according to the following succession of values 1, 3, 5, 7, 9, 11, 13, 15, 17 when the square root of 81 is being calculated and the following succession of values 1, 3, 41, 43, 441, 4421 and so on when the square root of 489 is being calculated.

Among these square root tubes is a zero setting tube, operated as part of the pattern control to establish an initial value 0 1 0 0 as a root divisor (the first root divisor being invariably one).

Common to the system is one set of tubes responsive to the signal to display, a set of tubes to bring the display tubes into operation and to transiently depress the potential on the power leads to the various pattern and shift tubes so that at the end of any calculation all these tubes are automatically released. Another arrangement similar in nature is a set of tubes responsive to a start signal for transiently lowering the potential on the power leads to the display tubes so that the result of any previous calculation displayed even through the entry of a new calculation may be erased when the order to start the new calculation is given. A third arrangement of tubes to transiently depress the potential to the accumulator tubes is controlled by the clearing key. This additionally creates a zero setting pulse which automatically sets the accumulators all to zero after the potential of their power lead is restored.

Lastly, there is a set of display tubes. There are four strings of digitally arranged tubes for displaying the four digits of calculated sums, remainders and products and the remainders produced in division and square root and three other strings also digitally arranged for displaying calculated quotients and roots. Each display tube controls a lamp to make a visual display. It may also be mentioned here that each of the entry register tubes controls a like display lamp so that the operator, before depressing the start key, may observe not only the result of a previous calculation but the factors entered for the next problem. If a mistake in entry has been made the entry may be erased by the clearing key and the factors entered anew.

There is an entry tube for each display register to put the display register into communication with the accumulators for the transfer of products and so forth and into communication with the quotient counting tubes for the transfer of quotients and roots. There is also a pair of sign tubes and their entry tubes for placing these tubes in communication with the sign circuit by way of the memory tubes. Finally there are three carry tubes associated with the units, tens and hundreds strings of display tubes controlled by the minus sign display tubes for the purpose of adjusting the number displayed when it is inverted in transfer to the display tubes.

*General operation of the system*

The device of the present invention as disclosed is a key operated device manipulated in a conventional manner. Appearing before the operator is a bank of keys hereinbefore described and a bank of lamps to display the factors entered and the results calculated. It will be understood that the invention is not limited to the use of entry keys and to lamps for visual display but resides in the use of electronic means for calculating in combination with any conventional means for entering the data for calculation and any conventional means for indicating, displaying or recording the results of the calculation.

As disclosed, the device is capable of performing simple algebraic calculations but, of course, may be used as a calculator in a large computer where other means are employed to select factors from various tapes and registers in accordance with a prepared routine, present such factors to the calculator and dispose of the results again in accordance with the said prepared routine.

In the present disclosure, the operator will first operate a pattern control key, such as the addition key, the multiplication key, the division key or the square root key. This will result in the immediate operation of the corresponding pattern control tubes. If the device is then to be used for the first time the clearing key is depressed to be sure that the accumulators are clear and to set them to zero. The lamps associated with the entry tubes will indicate the values +0000+0000 so that the operator may now enter the signs and the digital values of the factors. When this has been completed and the operator has checked the entry lamps she will operate the start key and then read the result of the calculation from the display lamps.

It is to be noted that in addition the function key will have to be operated for each factor, that is each factor, the augend and the addend is entered as a separate problem, a number to be added to whatever value is standing on the accumulators at the time, be it zero or the result of some previous calculation. In multiplication and division both factors are entered and the function key has to be operated only once. In square root only a single factor, the square, is entered.

*Solution of algebraic expressions*

The device of the present invention may be used as any conventional calculator is used to solve algebraic problems, and will naturally require some ingenuity on the part of the operator. In addition or subtraction the number on display at any time is the amount accumulated and is the amount standing on the accumulators and may, therefore, be used as an augend or a minuend, to which some other number now entered may be added or subtracted. It must be remembered that the operation is essentially algebraic so that if the number displayed is −1234 and it is wished to add +0567 to this to produce the algebraic result −0667, the orders written up on the keys will be Add +0567 Start. If it is intended that the problem be one in algebraic subtraction as (−1234)−(+0567)=−1801 then the orders written up on the keys will be Add −0567 Start. Long columns of figures may be added with this one precaution in mind, that the device is intended to be a demonstration of the operativeness of electronic means and three decimal denominational orders have been provided for calculation and only one order for sign control and for this reason if the operator attempts to add some unduly long column of figures the capacity of the sign control order may be exceeded in adding carries so that a wrong sign may be reported. Under simple operation the device will respond with perfect accuracy in addition and subtraction.

In multiplication, the accuracy does not approach perfection simply because the decimal denominational orders necessary are not provided but otherwise the operation is satisfactory. Usually the problem is entirely entered and the accumulators are cleared of any previously accumulated result. However, such a previously accumulated result may be used as a factor by the proper manipulation of the device. Let us say by way of example that the previously accumulated result +1234 is displayed and that it is desired to multiply this by +0222. In this case, the problem entered on the keys must be Multiply +1234 +0122 Start. In other words since the multiplicand is already in the accumulator, the first multiplier digit must be entered one less than its true value. Strictly speaking a previously accumulated value cannot be used as a multiplier or a multiplicand and the new problem should be entered as Multiply, clear, +1234 +0222 Start. That is, the accumulator should be cleared and the complete problem entered anew.

In division and square root a previously accumulated result may be used as the dividend by entering zero as the new dividend. Thus if the previously accumulated result is displayed as +1234 and it is desired to divide this by 0222 the problem will be entered as Divide, +0222 +0000 Start. Thereupon, the value 0000 will be added to the amount previously accumulated so that the value +1234 will stand on the accumulator as the dividend.

Should the display have been −1234 then the orders entered will be Divide +0222 −0000 Start, because when the display is negative it means that the complement thereof or 8766 stands on the accumulator and unless the dividend is entered as minus the device will faithfully divide the number 8766 by 0222 rather than perform the operation of inverted division for which the negative dividend calls.

The same considerations hold for operations in square root. If the square root of a number standing on the accumulators is to be calculated, the problem must be entered as plus or minus zero as the square in accordance with the sign displayed, or the accumulators must be cleared and the problem entered in the regular way.

No calculated quotient or root may be used as a factor except when the accumulators are cleared and the problem entered anew for the quotient or the root does not stand on the accumulators at the end of a calculation.

It may be stated that if this device were to be invariably employed to solve separate problems and in every case the accumulators were to be cleared and reset to zero, then the sign of the display might be operated directly from the positive or negative sum, product, quotient or root conductors. The use of the memory tubes, then, makes it possible to use the quantities standing on the accumulators in further computations, that is for algebraic purposes.

Further details of operation will appear in the following detailed description of the drawings shown on Fig. 15.

*The generator circuit*

Fig. 16 shows the positive generator; Fig. 19 shows the negative generator and Fig. 22 shows certain common controls for both. There are four common control leads to these generators, the positive generator selecting lead 1600, the negative generator selecting lead 1900, the starting lead 2200 and the stop lead 2201. There are, in addition, four groups of ten wires each leading to various parts of the device for priming and firing the tubes therein. The bundle in Fig. 16 designated 1601 are priming leads and contain ten wires digitally arranged and which will be shown in various parts of the circuit diagram with hyphenated digital designations. Thus the individual conductor 1601—0 represents the conductor leading from the "0" tube of the generator. Likewise, the individual conductor 1601—9 represents the conductor from the "9" tube of the generator. The next group of conductors 1602 are ten digitally arranged firing conductors. Likewise, the groups 1603 and 1604 are priming and firing conductors respectively. These conductors extend from a group of transformers in the positive generator and a similar group of transformers in the negative generator. The conductors in the group 1603 are inverted as they come from the transformers in the negative generator so that the conductor 1603—0 extends from the "0" transformer of the positive generator and also extends from the "9" transformer of the negative generator. This group in Fig. 19 is labelled as "Priming-Inverted" to indicate that when the negative generator is in operation the priming pulses generated thereby are inverted in order.

In operation, either the positive generator selecting conductor 1600 or the negative generator selecting lead 1900 is first affected, that is, a pulse is sent over one or the other. Let us assume that a pulse is sent over the positive lead 1600. This will cause the positive generator selector tube 1605 to fire. If, just prior to this operation, the negative generator selector tube 1905 had been in operation, then the firing of the tube 1605 would have transmitted from its slotted anode a negative pulse through the condenser 1606 to extinguish the selector tube 1905.

After a generator is thus selected, a pulse is transmitted over the start wire 2200 and this results in the firing of the start tube 2202. The firing of this tube results firstly, in the transmission of a pulse over the conductor 2203 to fire the two priming tubes 1607 and 1907. Under the present assumption, the firing of the priming tube in the negative generator is without effect but the firing of the priming tube in the positive generator will result in the priming of the "0" tube of this device.

Associated with the start tube 2202 there is a transformer 2204 whereby, upon the firing of the tube 2202, a priming and a firing pulse will be simultaneously transmitted to one of the driver tubes 2205. This driver tube will thereupon fire and transmit into the driving conductor 2207 a pulse which will be extended over an electronic circuit through the fired tube 1605 to the common firing conductor 1608 of the positive generator whereby this driving pulse will be delivered in parallel to all ten of the generator tubes. Only the "0" tube 1609, however, will respond since it is only this tube which has been primed by the priming tube 1607. As the tube 1609 fires it transmits a pulse into a common output circuit connected to conductor 2208 whereby a pulse is transmitted to the driver tubes 2205 and 2206. At this point, the tube 2205 is in operation and therefore the tube 2206 has been primed so that the tube 2206 will now respond to this pulse over the conductor 2208. As the tube 2206 operates, it transmits a negative pulse from its slotted anode through the condenser 2209 to extinguish the tube 2205. The firing of tube 2206 transmits another pulse into the conductor 2207 through the tube 1605 to the conductor 1608 which now results in the firing of the "1" tube 1611 of the generator. When the tube 1609 had fired, it transmitted a negative pulse through the condenser 1610 to extinguish the priming tube 1607. Now as the "1" tube 1611 fires, it in turn transmits a pulse through the condenser 1612 to extinguish the "0" tube of the generator.

In this manner, the generator will automatically run through a complete cycle during which tubes 0, 1 to 9, inclusive, are fired sequentially, finally ending up with the last tube 1613 which signals the completion of the cycle. Upon the firing of this last tube, a pulse is fired into the stop wire 2201 so that this results in the firing of the end tube 2210. This tube in firing transmits a pulse over the end-of-cycle signal conductor 2211 for various purposes as will hereinafter appear.

Upon the firing of the "0" tube 1609 a pulse is transmitted through the primary windings of two transformers 1614 and 1615. Through the secondary windings associated therewith, priming pulses are transmitted over the conductor 1610—0 and 1603—0, and firing pulses are transmitted over the conductors 1602—0 and 1604—0. In like manner, when the "1" tube of this generator fires, priming and firing pulses are transmitted over the "1" wires of these groups.

The operation of the negative generator is similar to that of the positive generator the only exception being that during the operation of the negative generator the digitally arranged conductors of the group 1603 are effected in inverse order, that is, the zero tube 1909 will cause a pulse to be transmitted over the conductor 1603—9, and so on.

It may be noted that after the generator has been started it will automatically operate through a complete cycle. If another pulse is transmitted over the start conductor 2200 it will have no effect for the start tube 2202 having been fired will in no way respond to another firing pulse unless it has in the meantime been extinguished. In the normal operation of these generators, the tube such as 1613 which signals the completion of the cycle causes the firing of the end tube 2210. This tube, in firing, besides delivering a pulse into the wire 2211 acts to restore the generator to its normal condition. It may be noted that in these three figures, most of the positive potential is designated as coming from the (4) lead. This is a lead which is indicated in Fig. 11 and shown in Fig. 22 as being connected to the impedance coil 2212 associated with an impedance coil 2213 and a condenser 2214. The two coils together derive their plus battery potential from the main source of positive potential (0), here, for convenience, numbered 2215. Upon the firing of the end tube 2210, the previously described action takes place, that is, the rush of current through the coil 2213 upon the firing of the tube 2210 and through the action of the condenser 2214 transiently depresses the potential on the (4) power lead whereby all of the tubes connected thereto are extinguished. Thus, the tube 2205 or 2206, whichever one is at this time in operation, will be extinguished. Likewise, the tube 1613 will be extinguished.

In starting the generator when, for instance, the start tube 2202 is operated, the first use of current over the (4) power lead fed through the coil 2212 will thereby and through the action of the condenser 2214, transiently depress the potential derived from the coil 2213 and thereby extinguish the end tube 2210.

In most operations of the generator the end tube 2210 will be fired from one of the tubes such as 1613 signaling the completion of the cycle. There are, however, instances in which the generator must be stopped before it has advanced in its cycle. Thus in the case of a "0" multiplier digit, after the "0" priming and firing pulses have been transmitted, so that the "0" counting tube respective to the multiplier digit, operates. The generator must be stopped before it can transmit any other digital pulses. Therefore, "0" multiplier counting tube is arranged to transmit a pulse into the stop conductor 2201 and this has the effect of immediately stopping further action of the generator.

The tubes 2216, 2217 and 2218, shown among the generator control tubes, are employed for certain purposes which will be described hereinafter.

In the following description, reference will be made to the various control conductors of the generators but no further description of the operation thereof will be given, it being understood that when a selection of either the positive or negative generator is made and then a start pulse is sent, that the digitally priming and firing pulses as described and finally an end-of-cycle pulse over the conductor 2201 will be transmitted.

*The entry registers*

When a problem is to be entered one of the pattern keys is first operated. These consist of the four keys, 1801, 1802, 1803 and 1804. The key 1801 will operate the pattern tubes for square root operations, the key 1802 will operate the pattern tubes for operations in division, the key 1803 will operate the pattern tubes for operations in addition (or subtraction) and the key 1804 will operate the pattern tubes for operations in multiplication. As it appears hereinafter, the first tube of the progress circuit for the entry registers will be operated. This is tube 2600. If the problem is to be one in multiplication then after the operation of the pattern key 1804 and the operation of the clearing key, if that be necessary, the digit keys are used to enter the first and second factors of the problem. Let us suppose that the first factor is a negative quantity, then minus sign key 1805 will be operated and plus potential from the (3) source will be connected to the conductor 1806 whereby it will find a path through the fired tube 2600 to the conductor 2601 to simultaneously fire the two negative tubes 2602 and 2603. This effect will merely be noted at this time and explained in detail hereinafter. The operation of the sign key 1805 also connects the positive potential to the conductor 1807 which is without effect at this moment.

Thereafter the operator will press some one of the digit keys to enter the first digit of the first factor. Let us assume this to be "1." Therefore, the digit key 1808 is operated. This will result in the connection of positive battery to the common conductor 1809 which extends to the common firing circuit for all progress tubes for the eight entry registers. Since the first register progress tube 2600 is now in operation, the next progress tube 2604 has been primed and therefore the tube 2604 will respond to the pulse delivered to it over the conductor 1809. At the same time, the "1" key 1808 will connect the firing conductor 1602—1 from the generator to the common conductor 1806 so that it will now be in communication through the tube 2604 to the firing conductor 2605 leading to the "1" to "9" tubes of the first denominational order register for the first factor. Since the "1" tube 2606 is primed over the priming conductor 1601—1, then the tube 2606 will respond to the "1" pulse from the generator.

The operation of this tube will derive current through the impedance coil 2607 and through the action of the condenser 2608, will cause the potential derived through the companion coil 2609 to be depressed transiently to extinguish the "0" tube 2610. The positive potential applied to conductor 1809 fires tubes 2217 and 2218 to select the positive generator and to then start it. It should be especially noted that every factor on entry is entered as a positive number by the positive generator regardless of its sign and that signs do not enter into the calculations.

Prior to the firing of the tube 2606, a two-element glow lamp 2611 remains dark but as soon as the tube 2606 fires, this lamp glows to indicate that the digit "1" has been registered.

In similar manner, the remaining seven digits of the two factors of the problem may be entered on the registers shown in Figs. 26, 30, 27 and 31. As each digit of a factor is entered, the progress tube for its register is operated and the generator pulse selected by the digit key is passed through this fired progress tube to fire the corresponding tube of the register. There are in all, ten progress tubes for the entry of the sign and the four digits of each of the two factors. Variation of the use of these registers in accordance with the pattern of the calculations will be noted hereinafter. It is only necessary at this time to note that the tubes of the entry registers each consist of an array of ten tubes for registering one of the ten digits in each of the four denominational orders of each of the factors. The repeated use of the digit keys advances the progress circuit and enters the numerical values in these registers. After the entry of the sign and the four digits of the first factor, then the sign for the second factor must be entered, even though, as will appear hereinafter, the plus sign tube has been previously fired. This is for the purpose of advancing the progress circuit.

A special arrangement for breaking into the progress circuit to operate the sign tube for the second factor, is provided in square root operations where the four registers for the first factor are not employed.

*The clearing-out key*

The clearing-out key circuit is shown in Fig. 21. This is what might otherwise be termed a general release means, for by its operation any value standing on the accumulators is dropped and the accumulators are returned to zero. The means also is useful for putting the device in condition for operation on the initial start of operations, for the accumulators must have some value such as 0000 standing thereon in order to be responsive to the transfer of a value from the entry registers. This means is operated by the momentary depression of the clearing key 2100 in the operator's keyboard.

Upon the operation of key 2100, positive battery from the source (3) is extended through the resistance 2101 and the key 2100 to fire the tube 2102. Tube 2102 creates and transmits a pulse to fire the tube 2103 and this so affects the voltage divider point between the resistances 2104 and 2105 that the grid of the triode 2106 is made sufficiently positive to operate this triode. Consequently, the current drain caused thereby through the resistance 2107 lowers the potential on the conductor 2108 constituting the source (3) that all tubes depending thereon are extinguished. This includes the tube 2102 which in returning to its non-conducting state produces a rise of potential constituting a positive pulse at its slotted anode. This pulse is slightly delayed in its effect by the delay network consisting of the resistances 2109 and 2110 and the condenser 2111 but in time causes the tube 2112 to fire. Tube 2112 in firing extinguishes the tube 2103 by means of the connection through condenser 2113 between the slotted anodes of these two tubes. The tube 2103 in returning to normal releases the triode 2106 which therefore restores the potential on the conductor 2108, source (3). The rise of potential at the slotted anode of tube 2103 now constitutes a positive pulse which is extended through the delay network consisting of the resistances 2114 and 2115 and the condenser 2116 to fire the tube 2117. Tube 2117 creates and transmits a pulse into conductor 2118 which will later be seen to be employed for setting the accumulator carry circuit to zero. The pulse created by the tube 2117 will also be transmitted through a delay network consisting of resistances 2119 and 2120 and the condenser 2121 to fire the tube 2122. This tube 2122 now creates and transmits a pulse into the conductor 2123 which will later be seen to be employed to set the accumulators to zero.

During the ensuing operations tubes 2112, 2117 and 2122 will remain in operation. At some later time when the clearing key 2100 is again operated the firing of tube 2103 will extinguish tube 2112 and the depression of the potential of the source (3) will release the tubes 2117 and 2122 ready for another operation as above described.

Therefore the practical result of the depression of the clearing-out key is to transiently depress the potential of the source (3) and after that is restored to transmit zero setting pulses over the conductors 2118 to the carry tubes and over 2123 to the accumulators.

*The start key*

After the problem has been entered the operation of the calculating means is started by the operation of the start key 1800. This directly fires the start tube 1810 which creates and transmits a start pulse into the conductor 1811 for purposes and with results which will be described hereinafter. The potential for the operation of the tube 1810 is derived from the source (3) (conductor 2108) and therefore the start tube may be extinguished by the operation of the clearing key 2100. It may also be noted that upon the operation of any one of the tubes deriving their potential from the source (3—6) or (3—7) by the operation of the network including the inductances 1812 and 1813 and the condenser 1814 the potential supplied to the tube 1810 is transiently depressed so that this tube is extinguished. By the same token when the tube 1810 is fired the potential of the sources (3—6) and (3—7) is transiently depressed so that all tubes depending thereon will be released. The source (3—6) supplies the progress tubes for the entry registers for the first factor and the source (3—7) supplies the progress tubes for the entry registers for the second factor and therefore upon the operation of the start key the progress tubes will be entirely released.

It may also be noted here that through the network consisting of the inductances 1815 and 1816 and the condenser 1817 the two sources (3—6) and (3—7) become mutually controlling so that when one is used the tubes depending on the other are released. The use of this arrangement is described elsewhere.

*The accumulators*

The accumulators, one for each of the four denominational orders are shown in Figs. 40, 42, 45 and 48. A description of one will suffice to explain the operation of all. The accumulator, so called, is actually the combination of an accumulator and a register. Each is a counting chain, the accumulator in the form of a closed ring and the accumulator register in the form of an open chain. When a digital value is offered for accumulation, that value is placed in the register whereupon an automatic transfer from the accumulator register to the accumulator takes place, the register counting down to zero and the accumulator counting up an equal number of steps. Each has a common firing circuit and each has a common output circuit, the common firing circuit of one being connected to the common output circuit of the other. The tubes of the register may be selectively fired while only the zero tube of the accumulator may be so fired either to start a new calculation or on clearing out the result of a previous calculation.

In Fig. 40 the tubes 4000, 4001 and 4009 are the 0, 1 and 9 tubes respectively of the closed ring accumulator and the tubes 4004, 4005 and 4006 are the 9, 8 and 0 tubes of the register. The conductor 3403 constitutes the common firing circuit of the register and the common output circuit of the accumulator. The conductor 4008 constitutes the common firing circuit of the accumulator and the common output circuit of the register. The one exception to this is that the zero tube of the register is not connected to this common output circuit since the zero tube when fired, does not advance the accumulator but merely extinguishes the No. 1 tube of the register and reports the completion of the operation of the register to the carry circuit.

By way of example, let us suppose that the digit 0 is registered in the first denominational order register of the first factor, that is that tube 2610 has been fired, and that this is to be transferred to the accumulator as part of a multiplicand. Let the multiplier digit be any one of the digits 1 to 9. When the transfer is signaled and the positive generator is started on its cycle, a priming pulse will be transmitted from the transformer 1615 over conductor 1603—0 to the priming point for tube 4006. Simultaneously a firing pulse will be transmitted from transformer 1615 over conductor 1604—0 through tube 2610, conductor 2623, tube 3506, conductor 3403, to the firing circuits of all the accumulator register tubes of the highest order in common. The tube 4006 being the only register tube thus simultaneously affected, will fire. Each of the other tubes may be similarly selectively fired.

If the negative generator had been operated, as when the product is determined to be negative, then the priming pulse would come from transformer 1915, over conductor 1603—9 to prime tube 4004. The firing pulse would be transmitted in the same manner as above over conductor 1604—0 and consequently the number 9 tube representing the nine's complement of zero would be fired.

Now upon the firing of tube 4004, a pulse is created and transmitted into conductor 4008 whereupon that one of the accumulator tubes which is primed will be fired. Tube 4004 primes tube 4005 so that when tube 4001 (assuming the accumulator to be set to zero) fires, it creates a pulse, transmits it to conductor 3403 and thereby in turn causes the No. 8 tube 4005 of the register to fire. In this manner the register is counted down to zero and the accumulator is counted up to 9.

One aspect of the particular accumulator shown in Fig. 40 should be noted. This accumulator is the first or extreme left-hand denominational order accumulator and its function primarily is to act as a sign indicator. Tube 4000 fired represents a positive number registered and tube 4009 represents a negative number registered. Each of these tubes when active may be used to pass a sign indication. By way of example, a transformer 4014 is connected to the tube 4000 so that when the signal that the accumulation has been completed is passed over conductor 4015 it will be transformed by transformer 4016 to a negative pulse, passed through the grid and main anode of tube 4000, and transformer 4014 to transmit a pulse over the positive conductor 4002. In like manner a transformer 4017 is connected to tube 4009 so that when the signal that an accumulation has been completed is passed over conductor 4015 it will be transformed by transformer 4018 to a negative pulse, passed through the grid and main anode of tube 4009 and transformer 4017 to transmit a pulse over the negative conductor 4003. It should be noted that when either tube 4000 or 4009 is fired a pulse will be created in the associated transformer and passed to either conductor 4002 or 4003 but that such pulse is negative and will have no effect on the circuits to which these conductors extend.

It should be noted that after the clearing out key 2100 is operated, a pulse is passed over conductor 2123 which will pass through transformer 4019 to fire the zero tube 4000 and thus set the accumulator to zero. Through transformer 4020 a zero setting pulse is also passed to the positive conductor 4002 for the purpose of firing the positive memory tube initially. Other aspects of this accumulator will be found in the following description of the carry circuits.

*The carry circuits*

Since each accumulator is in the form of a closed ring on a decimal basis there must be means for carrying over one whenever an accumulator exceeds its original capacity. Thus, in Fig. 40 the three tubes 4000, 4001 and 4009 represent the ten tubes in the ring. The No. 9 tube is arranged to prime the No. 0 tube and at the same time it primes a carry tube 4010 so that when the accumulation passes from the 9 tube into the 0, 1, 2 or 3 tubes beyond, the tube 4010 will be operated and left in this condition. There is a similar tube for each of the other decimal order accumulators, namely, tubes 4210, 4510 and 4810.

There is also associated with each accumulator register a tube which is triggered off to indicate that the register has completely counted down. In Fig. 40 this tube is that numbered 4007 and will become operated as soon as the register has completely counted out. Similar and corresponding tubes in the other accumulator registers are the tubes 4207, 4507 and 4807. There is a tube in Fig. 41 designated 4100 which may be put in operation when and if both the tubes 4007 and 4207 are triggered on. Correspondingly, a tube 4101 will be fired when and if both of the tubes 4507 and 4807 are triggered on. In like manner the tube 4102 will be fired when and if both tubes 4100 and 4101 have been fired. Thus, when and only when all of the various accumulator registers have completely discharged their functions the signal is given to operate the carry means. This consists in the creation and transmission of a pulse by the tube 4102 over the conductor 4103 and thence through either tube 4820 or 4821. It may be noted that these latter two tubes have their firing circuits connected respectively to the plus and minus generator selecting wires 1600 and 1900, respectively. Thus, if the last operation which resulted in the operation of the accumulators was one performed under the positive generator cycle the tube 4820 would have been operated so that the pulse over conductor 4103 would then be transmitted to the conductor 4822. If during the accumulation the carry tube 4810 had been operated it would have caused the tube 4811 to be extinguished. It may be noted that on the zero setting pulse over conductor 2118, that the four tubes 4011, 4211, 4511 and 4811 were originally triggered on. Now, if the tube 4810 has been triggered on and left in operative condition it would have triggered the tube 4811 off and then left this tube in a primed condition so that now with the pulse being delivered to the carry wire 4822 by the tube 4820, the tube 4811 will be operated. This will create a pulse and transmit it into the conductor 4508 which will cause the next higher denominational order accumulator to be advanced one. Let us assume in this case that the tube 4510 has not been triggered on nor will it be triggered on by this addition of the one carried into this order. Some one of the tubes of the accumulator which have thus been fired will create and transmit into the accumulator output conductor 3405 a pulse which will be passed through the transformer 4523 as a negative pulse and thence through the grid and main anode of the tube 4507 thence through the transformer 4524 as a positive pulse to now operate the carry tube 4812 for the purpose of creating and transmitting a pulse into the conductor 4825. The pulse in contactor 4825 will cause the tube 4512 to fire since in this case the tube 4511 has been left undisturbed since it was originally set on a zero setting operation. The tube 4512 will create and transmit a pulse into the conductor 4525 so as to trigger on tube 4211 if the tube 4210 is operated or otherwise to trigger on tube 4212. If the tube 4211 is triggered on at this time then a carry 1 will be added to the tubes of the first or extreme left-hand decimal denominational order and in turn a pulse will be sent back over conductor 3403 through the transformer 4023, the tube 4007, the transformer 4024 to fire the tube 4212. It will thus be seen that eventually the four tubes 4812, 4512, 4212 and 4012 must be fired in turn so that the tube 4012 will create and transmit into the conductor 4025 a pulse which constitutes a signal that the carry operation is complete. This signal in one direction will be transmitted through the transformer 4026, the tube 4011, the transformer 4027, the conductor 4015 and thence either through the tube 4000 or 4009 to establish the plus or minus sign indication. The sign indications will be transmitted over the conductors 4002 for positive and 4003 for negative where they in one case will operate the positive memory tube 4402 or the negative memory tube 4403 as the case may be.

The pulse on conductor 4025 performs its main function by firing the tube 4104. This tube performs two functions, firstly, it creates a pulse and transmits it over conductor 1713 to advance the counting relays in multiplication by way of example and secondly, it operates the triode 4105 which through the action of the impedance coils 4106 and 4107 with the condenser 4108 momentarily or transiently depresses the potential on the source (3—1). Since this source supplies potential for the tube such as 4012 and all the tubes of the register circuit as well as the common tubes 4100 to 4102 such tubes will at this time be extinguished leaving in each case either the tube such as 4010 or the tube 4011 in operation.

The tube 4109 functions in the first or extreme left-hand accumulator order to pass a carry pulse from this order to cause the firing of tube 4012. This carry pulse is lost as far as registration goes.

In the event that the operation of the accumulator has been carried out by a negative cycle then the conductor 1900 will have received a pulse and this will of course cause the tube 4821 to operate instead of the tube 4820 and to extinguish this tube 4820. When therefore the pulse is received over the conductor 4103 the tube 4821 will transmit a pulse into the conductor 4808 to add one to the amount extending on this last order accumulator. Thereafter, the operation is as previously described. Thus each time a number in the form of a complement is transferred to the accumulator a one is automatically added through the operation of the tube 4121.

*The column shift tubes*

The tubes which are included under this general heading are shown in Figs. 34, 35, 38 and 39. In Figs. 34 and 38 there are shown two sets of tubes for establishing electronic circuits from the second factor entry registers to the accumulator registers. In Fig. 27 it will be noted that the first denominational order register of the second factor will transmit over the conductor 2711, the second register over the conductor 2712 and in Fig. 31 the third order register will transmit over conductor 3102 and the fourth order register over the conductor 3103. These four conductors 2711, 2712, 3102 and 3103 are bracketed together and shown as the group 2710 leading to Fig. 34 where they are again individually identified as leading to tubes 3400, 3401, 3800 and 3801. These four tubes in turn extend the connections to the four conductors 3403, 3404, 3405 and 3406 leading to corresponding decimal denominational order accumulator registers. The tubes 3400, 3401, 3800 and 3801 therefore act as gates for the transfer of the dividend in division or for the square in square-root. Another tube in this group is designated 3802 and acts as an extinguisher for the above-named tubes.

The tubes 3402, 3803 and 3804 which are fired sequentially function to extend the conductors 2712, 3102 and 3103 to the counting relays for use in multiplication whereby the counting relays may be set in accordance with the multiplier digits, the multiplier being always registered on the second factor entry registers. A fourth tube in this group namely, tube 3805 acts as a means to extinguish the other three tubes 3402, 3803 and 3804 respectively successively.

In Fig. 35 there are shown four tubes 3501, 3502, 3503 and 3504 which function to establish electronic circuits between the square-root subtrahend synthesizer and the accumulator registers. There are four denominational order transmitting conductors from the four counters in Figs.

33 and 37 grouped under the designation 3300. The first of these conductors 3301 leads to the tube 3501, the second 3302 to the tube 3502, the third 3700 to the tube 3503 and the fourth 3701 to the tube 3504. During square-root operations the four tubes 3501 to 3504 extend these four conductors 3301, 3302, 3700 and 3701 to the conductors 2623, 2624, 3002 and 3003, respectively so that the synthetic subtrahends may be shifted in their column relations by the other tubes in Figs. 35 and 39.

The four transmitting conductors from the first factor entry registers are grouped under the designation 2622 and consist of the wires 2623, 2624, 3002 and 3003. The tubes 3506, 3507, 3508 and 3509, respectively will extend these conductors to the four conductors 3403, 3404, 3405 and 3406, respectively so that when the tubes 3506 to 3509 are operated the first factor will be transferred to the corresponding decimal denominational orders in the accumulator. In square-root operations with all eight tubes 3501 to 3509 operated the synthetic subtrahends used for calculating the first digit of the root will be transferred to the corresponding decimal denominational order accumulator registers.

After the first digit of the root or the first digit of the quotient, or the first multiplier digit has been calculated, the tubes 3506 to 3509 will be extinguished and in their place the tubes 3901 to 3904 inclusive will be fired. These tubes will extend circuits from the transmitting conductors of the first factor or from the square-root subtrahend synthesizers shifted one place to the right. By way of example, the tube 3902 will extend the conductor 2623 to the conductor 3404 whereby the first denominational order value transmitted will be connected into the second denominational order accumulator register. The tube 3901 automatically produces a zero value for the first denominational order accumulator register.

In the same manner when the third root digit or the third quotient digit or the third multiplier digit is being calculated, the tubes 3901, 3905, 3906 and 3907 will be operated and these will function to shift the value two places to the right. The tube 3901 will supply a zero value for the first denominational order accumulator register and the tube 3905 will do the same for the second denominational order accumulator register.

When the calculations are completed the tube 3908 will operate to cause the display in problems of addition and the tube 3909 will cause the display in multiplication, division and square root.

The four tubes 3509, 3904, 3907 and 3909 act as a control for the column shift tubes. When the column shift tubes are first fired the tube 3509 will be triggered on. When the calculation under this condition is complete a pulse will be transmitted into the conductor 1721 which will thereupon cause the tube 3904 to fire since this tube was previously primed by the tube 3509. It will now be triggered on and will result in the extinguishment of the tube 3509 and the priming of the next tube 3907. In a similar manner when the next calculation has been completed another pulse will be fired into the conductor 1721 to cause the firing of tube 3907 which now extinguishes the tube 3904 and primes the tube 3909. At the end of the third calculation and therefore the end of the problem another pulse transmitted into the conductor 1721 will cause the tube 3909 to be triggered on and the tube 3907 to be extinguished. The tube 3909 as previously noted will cause the result calculated to be displayed.

*The counter for multiplication*

The string of counting tubes shown in Fig. 25 are used for the purpose of controlling the number of times a multiplicand is added in accordance with a given multiplier digit. There are 10 tubes in an open chain here represented by the tubes 2501, 2502, 2503 and 2504. When a problem in multiplication is to be performed some one of the multiplier digit shift tubes 3402, 3803 or 3804 will establish an electronic connection to operate some one of these tubes. If the multiplier digit is 8 then the tube 2503 will be simultaneously primed over the lead 1601—8 and fired over the common conductor 1713. While all of the counting tubes in this string will be sequentially primed over the conductors 1601—0 to 1601—9 only the tube to be fired will receive a firing pulse over the lead 1713. The firing of the tube 2503 will transmit a pulse into the start lead 2200 to start the generator to transfer the multiplicand to the accumulators. When the accumulating operation is complete another pulse over the common firing conductor 1713 will cause the next lower-numbered counting tube to be operated since each of these tubes primes the next lower-numbered one. In this manner, this chain will count down until the zero tube 2501 is operated. Upon the operation of this tube a pulse will be transmitted into the stop wire 2201. The generator will be stopped and a pulse will be transmitted through the tube 1719 (see description of the operation of the pattern tubes for multiplication hereinafter described under he heading "Multiplication") and thence over the conductor 1721 to cause the next set of shift tubes to be fired. Assuming this to have been the first multiplier digit then it will be remembered that tube 3509 was operated so that when this pulse is put onto conductor 1721 it will cause the tubes 3901, 3902, 3903 and 3904 to become fired. The tube 3903 in firing will create and transmit into conductor 3910 a pulse which will traverse the windings of the transformer 2506 to cause the firing of tube 2505. This is delayed slightly by the delay circuit consisting of the resistances 2507 and 2508 and the condenser 2509 in order to give the generator time to reach its starting position. Thereupon the tube 2505 in firing creates and transmits a pulse into the starting conductor 2202 so that the next operation can take place.

In case any one of the multiplier digits is zero then the tube 2500 is operated instead of one of the tubes in the counting chain itself. This operation takes place through the fact that tube 2500 is simultaneously primed over the transformer 2510 and fired over the common conductor 1713. Tube 2500 immediately stops the generator by transmitting a pulse into the wire 2201 and restores the tube 2505 if this has been left operated from some previous operation. The pulse transmitted into the stop wire 2201 is also passed through the tube 1719 to the conductor 1721 to cause the shift in the decimal column arrangement as above described. When this shift takes place one of the shifting tubes, such as 3903 or 3906 transmits a pulse into the conductor 3910 with the result hereinbefore described, that is, the tube 2505 will be operated to start the generator on its next cycle. Thus the shift is made on a zero multiplier digit without the generator advancing to a point where it could transfer any value from an entry register to an accumulator register.

*The counters for division and square root*

In Fig. 29 there are shown three groups of tubes used as a means for counting the digits of a calculated quotient or a calculated root. The group of tubes 2900 to 2906 inclusive count the first quotient digit, the group of tubes 2907 to 2912 inclusive count the second quotient digit and the group of tubes 2913 to 2918 inclusive count the third denominational order quotient digit. General control over these tubes is exercised by the tubes of Fig. 28. The three tubes 2800 to 2802 constitute pattern tubes and are fired by a pulse over the conductor 2007 when the division or square root key is operated. The tube 2800 in firing creates and transmits into the conductor 2810 a pulse for firing the three priming tubes 2900, 2907 and 2913 as well as the first tube 2806 in the division counter progress circuit. This puts the counter in operative condition.

The tube 2801 establishes an electronic circuit from the output of tube 2804 to the conductor 1721 for the purpose of signaling the successful completion of a shift. Upon the initial operation of the tube 2801 it creates and transmits a pulse into the conductor 2811 which fires the tube 2408 whose function it is to extinguish the tube 2409. The tube 2409 should not be fired at this time but the firing of the tube 2408 will assure the fact that 2409 is in its proper condition.

The tube 2802 functions to establish an electronic circuit between the generator start wire 2200 and the firing circuit of tube 2805 so that on every subsequent starting operation of the generator the tube 2805 will become operated and will function to extinguish the tubes 2803 and 2804. Upon the initial operation of the tube 2802 it will create and transmit into the start conductor 2200 a pulse for starting the generator. This will operate through one cycle to transfer the dividend from the second factor entry registers to the accumulators as will be fully described hereinafter under the heading "Division."

Upon the operation of either the division key or the square root key both the tubes 2403 and 2404 will have become operated. If both the dividend and the divisor are plus quantities or are both minus quantities then we know through the principles of algebra that the quotient will be positive. Therefore, when the start key is operated a pulse will be sent over the plus quotient wire 2612 and will be transmitted through the tube 2404 to the positive conductor 2406. This will result in the firing of the tubes 2410, 2411, 2412, 2413 and 2414. The tube 2414 creates and transmits a pulse into the conductor 1600 to select the positive generator. With the positive generator selected as just described and the generator started as previously described the dividend will be transferred as a positive quantity to the accumulators. As a result of this the positive conductor 4002 will carry a pulse at the end of the carry operations. This pulse will be transmitted through two of the four tube combinations in Fig. 24. In the first place it will pass through tube 2412 to transmit a pulse into conductor 1900 for the purpose of selecting the negative generator. This is because the dividend having been transferred as a positive quantity the divisor must next be transferred as a negative quantity. The pulse on conductor 4002 will also pass through the tube 2410 to the primary conductor 2415 leading to the tube 2409. However, this tube is not operated at this time and will not pass this pulse. To anticipate the operation of this circuit it may be noted at this time that in the calculation of the first quotient digit there will be a series of pulses over the conductor 4002 corresponding to a series of positive remainders calculated. When the dividend has been exhausted however, a negative remainder is produced and this will transmit a pulse over the conductor 4003 thence through the tube 2411 to the secondary conductor 2416. This causes the tube 2409 to be fired at the same time extinguishing the tube 2408. The pulse through the tube 2403 is a signal that a negative remainder has been produced so that the error will have to be rectified by restoring the divisor in its natural form. The pulse over conductor 4003 finds a path also through the tube 2413 to the positive generator selector conductor 1600 so that the next operation of the generator after the overdraft has occurred will be an operation of the positive generator to restore the divisor. This produces a positive remainder (one having a zero in the first denominational order) so that the next pulse is one over conductor 4002 and this finds a path to the primary conductor 2415 thence through tube 2409 which is now operated, the conductor 2407 through the tube 2013 thence over conductor 2014 to fire the tubes 2803 and 2804. The tube 2803 creates and transmits a pulse to the common firing circuit of the tubes 2807, 2808 and 2809 of the progress chain. This firing pulse is slightly delayed by the network consisting of the resistances 2812, 2813 and the condenser 2814. The tube 2806 fired before the calculation of the first quotient or root digit, primes the tube 2807 so that now upon the firing of tube 2803 the tube 2807 will respond and will extinguish the tube 2806. The tube 2804 also fired at this time will transmit a pulse into the conductor 2811 for the purpose of firing the tube 2408 and thus extinguishing the tube 2409.

It may now be noted that if the dividend and divisor had had unlike signs that then the negative quotient or the negative root conductor 2613 would have been used for transmitting the start pulse. In this case the start pulse would have been transmitted through the tube 2403 to the conductor 2405 thereby firing the tubes 2417, 2418, 2419, 2420 and 2421. The tube 2421 would have created and transmitted a pulse into the conductor 1900 for selecting the negative generator so that the first operation of the generator would cause the dividend to be transferred to the accumulators as a negative quantity. This, of course, would result in a pulse at the end of the carry operations over the negative conductor 4003 thence through the tube 2420 to the conductor 1600 to select the positive generator. This is because the dividend having been transferred as a complement the divisor must be used in its normal form. The pulse over conductor 4003 would also find a path through the tube 2418 to the primary conductor 2415 leading to the tube 2409 but without effect since the tube 2409 is not operated at this time. In a manner like to that hereinbefore described during the operation of diminishing the dividend a series of negative remainders will be calculated followed by a positive remainder when an overdraft occurs followed in turn by a negative remainder when the error has been rectified. Thus a series of pulses will be transmitted over the primary wire 2415 which will be ineffective. This is followed by a single pulse over the secondary wire 2416 which fires the tube 2409 and prepares it to pass the next pulse created on the restoration of the divisor.

Returning to the operation of the counters it may be stated that upon the completion of an accumulating operation the signal that the accumulation is complete is in the form of a pulse transmitted over the conductor 1713. This will be transmitted through the tube 2015 and thence over the conductor 2016 where it finds a path through the tube 2806 to the common firing circuit of the first counter here numbered 2815. Thus when the dividend has been entered into the accumulators and the operation is complete a pulse over conductor 2815 will fire the tube 2901 primed by the start tube 2900. The tube 2901 therefore counts the transfer of the dividend, and transmits a generator starting pulse into the conductor 2200. This as before stated produces a positive remainder (if the dividend is transferred as a positive quantity). The divisor is now entered and causes another operation of the accumulator and at the end of this operation a pulse over the conductor 2815 will cause the operation of the counting tube 2902. If this produces a negative remainder (meaning that the first quotient digit is zero) then an overdraft will have occurred at the end of which the tube 2902 is fired as described. Upon the restoration of this overdraft the tube 2903 will be fired and this counter will thereafter remain in this condition, that is, with the tube 2903 fired. It may now be noted that when the display takes place a firing pulse will be transmitted over the conductor 1602—0 through the tube 2903 to the conductor 2920 leading to the means for displaying the first digit of the calculated quotient.

In this manner it will be understood that the first counter will register first to the transfer of the dividend, then the number of proper remainders produced up to and including the overdraft and finally the restoration of the overdraft so that the proper counting tube is operated for purposes of controlling the display.

When the overdraft has been restored then the progress circuit will be operated as hereinbefore described so that the next series of pulses transmitted over the conductor 2016 will be transmitted through the tube 2807 to the second counter consisting of tubes 2907 to 2912 inclusive. This counter is the same as the counter above described with the exception that the dividend does not have to be counted and hence there is one less tube in this string than in the counter above. This is also true of the third counter consisting of the tubes 2913 to 2918 inclusive.

Upon the restoration of the divisor after the third quotient digit has been calculated the tube 2809 is operated. The only function of this tube is to extinguish the tubes 2808.

It may be noted that all the tubes in Figs. 28 and 29 derive their positive potential from the source (3—3). This is also true of the tubes in Fig. 24 which are used only in division and square root operations.

*The theory of square root*

From a mathematical standpoint the square root of a number may be extracted in a step by step process through the use of a series of odd numbers. Let us consider these numbers.

| | | | | | | | | | |
|---|---|---|---|---|---|---|---|---|---|
| Series | 1 | 3 | 5 | 7 | 9 | 11 | 13 | 15 | 17 |
| Sum of series | 1 | 4 | 9 | 16 | 25 | 36 | 49 | 64 | 81 |
| Square root of sum | 1 | 2 | 3 | 4 | 5 | 6 | 7 | 8 | 9 |

The method used is to create a series of synthetic subtrahends based on this series of odd numbers and to then diminish the number whose square root is sought. By way of example, if the square root of 4 is sought, the first of the series is subtracted therefrom leaving a remainder of 3. Then the next in the series, 3, is subtracted from this remainder, leaving now a remainder of 0. The count of the number of synthetic subtrahends is the square root, in this case, 2.

Let us take another example, to extract the square root of 81. Arithmetically, this looks as follows:

```
81
 1
--
80
 3
--
77
 5
--
72
 7
--
65
 9
--
56
11
--
45
13
--
32
15
--
17
17
--
00
```

In this example the synthetic subtrahends were 1, 3, 5, 7, 9, 11, 13, 15 and 17, the count being 9 so that since the last remainder is zero, 9 appears to be the square root of 81.

Now, let us advance another step, to see how the synthetic subtrahend is formed when the root proves to have more than one digit. Let us extract the square root of 529. This will appear as follows:

```
529
1
---
4
3
---
129
 41
---
 88
 43
---
 45
 45
---
 00
```

In this case, blocking the number out in groups of two digits, we first diminish the first group by using 1 and 3 of the series and when we reach a remainder less than the next number of the series, we terminate this operation and put down as the first root digit the count of these numbers of the series used, in this case 2. Now, the next operation consists in bringing down the next group of two digits so as to form a new minuend 129. The new synthetic subtrahend is formed by taking the last subtrahend used, 3, increasing it by 1 (to 4), shifting it one place to the right and then adding, in another denominational place to the right the first number, 1, of our series. Thus using the synthetic subtrahends 41, 43, 45 we diminish the remainder to zero. There was a count of 3 in this last operation, so the square root of 529 appears to be 23.

Let us go further, to illustrate the formation of a synthetic subtrahend when a zero appears in the root. Take the number 1695204 and block it out in groups of two digits whereupon we find the first group to be 01. Therefore:

```
01 69 52 04
1
—
 0 69
   21
   —
   48
   23
   —
   25
   25
   —
   00 52
    2 61
```

This synthetic subtrahend formed in the manner above described evidently cannot be used, so we take the 26, which is the last synthetic subtrahend used, 25, increased by 1 and shift it another place, add a zero and then begin the use of our series of odd numbers. Thus:

```
005204
  2601
  ————
  2603
  2603
  ————
  0000
```

and having produced a remainder of zero we find that the counts have been 1302, the exact square root of 1695204.

In the device of the present invention where the count must be determined by making an overdraft, we make a virtue of a necessity. The last synthetic subtrahend used is always a value 2 greater than the last previous subtrahend, and hence the next synthetic subtrahend used may be formed by subtracting 1 from the subtrahend used to produce the overdraft, rather than go back to the last subtrahend which produced a positive remainder and add 1 thereto. This may be illustrated as follows:

```
            484
              1
             —
              3
              3
             —
              0
              5
             —
             −5
            084
therefore,   41 the next subtrahend must be (5−1) 1=41
             —
             43
             43
             —
             00
```

As a last example, let us extract the square root of 450, as follows:

```
                                        Count
                           450
                             1            1
                           ———
                             3
                             3            2
                           ———
                             0
                             5
                           ———
Overdraft.................  −5
Restore...................  +5
                           ———
                           050
                            41            1
                           ———
                            09
                            43
                           ———
Overdraft.................  −34
Restore...................  +43
                           ———
                          0900
                           421            1
                           ———
                           479
                           423            2
                           ———
                            56
                           425
                           ———
Overdraft.................  −369
Restore...................  +425
                           ————
```

```
                                               Count
                               5600
                               4241              1
                               ————
                               1359
                               4243
                               ————
Overdraft..................   −2884
Restore....................   +4243
                             ——————
                             135900
                              42421              1
                             ——————
                              93479
                              42423              2
                             ——————
                              51056
                              42425              3
                             ——————
                               8631
                              42427
                             ——————
Overdraft..................  −33796
Restore....................  +42427
                             ——————
                             863100
                             424261              1
                             ——————
                             438839
                             424263              2
                             ——————
                              14576
                             424265
                             ——————
Overdraft..................  −409689
Restore....................  +424265
                             ———————
                             1457600
                             4242641             0
                             ———————
Overdraft..................  −2785041
Restore....................  +4242641
                             ————————
                            145760000
                             42426401            1
                            —————————
                            103333599
                             42426403            2
                            —————————
                             60907196
                             42426405            3
                            —————————
                             18480791
                             42426407
                            —————————
Overdraft..................  −23945616
Restore....................  +42426407
                            ——————————
                            1848079100
                             424264061
```

The counts have been 21213203 and simple scanning will indicate the next one to be 4. The proof of this operation will be to square the root 212132034 whereupon the number

44999999848877156 is produced.

It is interesting to note the growth of the synthetic subtrahend in this last example. Those which were valid are listed in the following column:

```
1
3
41
421
423
4241
42421
42423
42425
424261
424263
42426401
42426403
42426405
424264061
```

Using this method of calculation it will be found that the square root of 99.999999 and so on indefinitely is 9.999999 and so on indefinitely and that the synthetic subtrahend approaches 1999999 and so on indefinitely.

*The counters for square root subtrahends*

In Figs. 33 and 37 there are shown the four counters for synthetically producing the subtrahends used in square root operations. The two tubes 3303 and 3304 comprise the counter for producing the first denominational order digit which is transmitted over the conductor 3301.

The next horizontal row of tubes 3305 to 3312 inclusive represent the counter for producing the second denominational order digit of subtrahend which is transmitted over the conductor 3302. The tubes 3305 to 3310 inclusive represent the 0, 1, 2, 3, 8 and 9 tubes of a digital arrangement of a counter made up of a closed ring of tubes in a special arrangement. This special arrangement consists of two firing conductors one for the odd-numbered tubes and one for the even-numbered tubes. Each odd-numbered tube when fired primes the next odd-numbered tube and the preceding even-numbered tube. Thus the No. 1 tube 3306 when fired primes the No. 3 tube 3308 as well as the No. 0 tube 3305. Each even-numbered tube when fired primes the next odd-numbered tube.

It will be remembered that in the calculation of a root digit the method employed consists in successively subtracting, from the square, odd numbers beginning with one and in some cases going as far as 17. When the square has been exhausted so that the next odd number to be subtracted would produce an overdraft the last odd number used successfully is increased by one and made the basis for the next shifted synthetic subtrahend. Since the device is unable to forecast that another subtraction will produce an overdraft this overdraft must be calculated and therefore the last subtrahend used will be two greater than the last one which might have been successfully used. Therefore, instead of increasing this by one, the value which produced the overdraft is decreased by one.

Therefore in synthetically producing these subtrahends the firing conductor to the odd-numbered tubes is used to advance the values through the series of odd numbers until the overdraft has been calculated. At that time, a change in sign of the remainder will cause a pulse to be transmitted over the firing conductor for the even-numbered tubes whereby a tube one less in value than the last one fired will now be triggered on. For instance, if the subtrahend which produced the overdraft had caused the No. 3 tube 3308, representing either the digit 3 or 13, to be fired, then upon the calculation of this overdraft a pulse would be fired into the even-numbered tubes to cause the tube 3307 to be triggered on.

In further calculations this condition arrived at will remain fixed unless there is a carry from a subsequently used counter. In that case, another pulse will be fired into the odd-numbered firing conductor 3313 to now cause the No. 3 tube to again become triggered on.

In the counter now under description the tube 3311 is primed by the No. 9 tube 3310 so that as the series of odd numbers increases from 9 to 11 the tube 3311 will be operated to carry a one into the counter for the first denominational order consisting of the two tubes 3303 and 3304.

It may be interesting to note at this time that the counter for the first denominational order consists of only two tubes because the value of the synthetic subtrahend in this denominational order will never exceed the value 1. It may be noted as a point of interest that the greatest synthetic subtrahend is 1999 with the value 9 recurring indefinitely when the value 99 followed by a string of 9's recurring indefinitely is used as the square.

The last tube in this counter namely the tube 3312 is used to extinguish the carry tube 3311.

A group of tubes 3710 to 3717 inclusive comprises the third denominational order counter and these tubes correspond in function exactly to the tubes 3305 to 3312 respectively. The odd-numbered tubes of this counter will be fired over the conductor 3703 and the even-numbered tubes over the conductor 3702.

A tube 3704 represents the zero tube of the next counter, that is, the counter for the last denominational order digit of the synthetic subtrahends. Since in the present arrangement the first column shift of the synthetic subtrahend will take the conductor 3701 out of use the other tubes of this counter would never be usefully employed though in a larger computer built for greater accuracy this counter would be complete and the arrangement would be exactly similar to the counters for the second and third denominational orders.

It may be noted that when square root operations are started the firing of the tube 3602 will transmit a pulse into the conductor 3601 to establish the first synthetic subtrahend 0100. The pulse on conductor 3601 will operate through the transformer 3315 to forcibly fire the zero tube of the first counter, through transformer 3316 to forcibly fire the No. 1 tube 3306 of the next counter, through the transformer 3705 to forcibly fire the zero tube 3710 of the next counter, and to directly fire the tube 3704.

The control of the synthetic subtrahend counters resides in a number of tubes shown in Figs. 32 and 36. When the square root key 1801 is operated a source of positive potential is connected to conductor 1818 which thereupon causes the tubes 3602, 3603, 3604 and 3605 to fire. The tube 3602 in operating creates and transmits a pulse over the wire 3601 for the purpose of setting up the initial subtrahend 0100.

The tube 3603 establishes an electronic circuit from the conductor 2311 to the firing circuit of the start tube 3206 for shifting between the odd-numbered firing circuits and the start tube 3207 for shifting among even-numbered firing circuits. It may be mentioned that this tube 3603 fires simultaneously with the tube 2301 and hence a pulse created by the tube 3603 and backfired into the conductor 2311 will not be communicated through the tube 2301 to the start conductor 2300.

Tube 3604 creates an electronic circuit from the secondary wire of the "flip-flop" consisting of the tubes 3200 to 3203 for the purpose of firing the tube 3205 when a change in sign has been detected.

The tube 3605 fires the tube 3204 and completes an electronic circuit from the primary wire of the "flip-flop" to the circuit for counting the number of subtractions made in calculating the square root of a number. The tubes 3204 and 3205 are mutually controlling so that the firing of tube 3204 at this time will extinguish 3205 or at least prevent it from operating.

When at some later time the start pulse is transmitted it will cause the operation of tubes 3200 and 3201 if the root is to be positive or 3202 and 3203 if the root is to be negative. During the calculation of the root and upon the completion of the carry operation there will be a series of pulses sent over the wires 4002 and 4003. If the root is to be positive there will be a series of pulses over the positive wire 4002 followed by a single pulse over the negative wire 4003 followed in turn by another single pulse over the positive wire 4002 for each root digit calculated. If the positive wire 2406 is operated then this results in a series of pulses over the electronic circuit established by the tube 3204 and extended thence through the tube 3206 to the conductor 3313 for advancing the second denominational order counter shown in Fig. 33. When an overdraft has been made then a pulse over the conductor 4003 will pass through the tube 3201, the secondary wire of the "flip-flop" through the tube 3604 to cause the tube 3205 to operate. Tube 3205 in firing extinguishes the tube 3204 and establishes an electronic circuit from the end of cycle pulse conductor 2211 to the firing circuit for the tubes 3208, 3610, 3611 and 3614. It may be noted that the tube 3207 has primed the tube 3208 and that the tube 3206 has primed the tube 3610. Therefore this pulse causes the tubes 3208 and 3610 to now become fired and the tubes 3206 and 3207 are extinguished. The firing of tube 3208 creates and transmits into the conductor 3314 a pulse for firing an even-numbered tube one less in value than the last previously fired odd-numbered tube. By way of example, if the No. 3 tube 3308 had been fired by the first series of pulses then the No. 2 tube 3307 would now be fired.

In the same manner if inverse square root is being performed, and the minus conductor 2405 is effective rather than the plus conductor 2406, then tubes 3203 and 3204 will have been operated. Under these conditions a series of the pulses over the minus conductor 4003 followed by a single pulse over the positive conductor 4002 will have exactly the same effect through the tubes 3204 and 3205 as that just described.

The tube 3206 functions to advance the second denominational order counter, the tube 3610 functions to advance the third denominational order counter and the tube 3611 merely acts as an extinguisher for the tube 3610 though if the fourth denominational order counter were complete, would function in the same manner as the tubes 3206 and 3610. The tube 3614 functions like the tube 3208 to trigger off the next lower-numbered tube in a counter. It will be realized that a pair of tubes such as 3610 and 3614 will be furnished for each complete counter.

*The display*

The display circuits are shown in Figs. 43, 46 and 49. In Fig. 43 the string of ten tubes of which 4300 to 4302 are shown represents the display means for the first decimal denominational order of a sum, a product or a remainder. The tubes 4310, 4311, 4312 and 4313 represent the display means for the second denominational order. The last of these tubes 4313 is used as a carry means whose action will shortly be described. In Fig. 46 the tubes for the third and fourth denominational orders are shown. In Fig. 49 there are three open chains of tubes for displaying the first, second and third calculated quotient or root digits. To the right of each of these groups of tubes there is a single tube corresponding to each group constituting means for establishing electronic circuits to the display means.

Whenever either one of the tubes 3908 or 3909 which order the display to be made is triggered on, a pulse is transmitted over the conductor 3912 for the purpose of firing the four tubes 4404, 4405, 4406 and 4407. The tubes 4404 and 4406 will establish electronic circuits from the output of the positive memory tube 4402, while the tubes 4405 and 4407 establish an electronic circuit from the output of the negative memory tube 4403. The memory tubes, of course, will respond and register the sign of the final accumulation and will therefore control the sign of the display. By way of example, if the final accumulation is a positive quantity then the plus memory tube 4402 will have been operated so that when the display is ordered a pulse created by the tube 4700 and transmitted over conductor 4701 will be transmitted through the tube 4402 and thence through the tube 4404 to operate the positive sign and display tube 4408. If, on the other hand, the final accumulation had proved to be a negative quantity then the pulse over conductor 4701 would be transmitted through the negative memory tube 4403 thence through the tube 4405 to the negative sign display tube 4409.

Also, if the final accumulation had proved to be a positive quantity then the pulse over conductor 4701 would have found a path through the positive memory tube 4402, the tube 4406 to the conductor 1600 for selecting the positive generator to be used in transferring the result from the accumulators to the display tubes. In like manner, if the final accumulation proves to be a negative quantity then the pulse over conductor 4701 would find a path through the negative memory tube 4403, the tube 4407 to the conductor 1900 to select the negative generator for use in transferring the final result to the display tubes. It should be noted that in this case the amount standing on the accumulators is inverted to its complemental value and hence a one will have to be automatically added before the display can take place. This is provided for by the tube 4409, since in addition to lighting the negative sign display lamp 4410 also provides an electronic path from the end of generator cycle conductor 2211 over conductor 4411 to the common firing circuit of the lowest order display counter consisting of the tubes 4604 to 4607 inclusive. Therefore, at the end of the generator cycle in which the final result is transferred from the accumulators to the display counters a one will be automatically added to the lowest denominational order counter. The carry tubes 4607, 4603 and 4313 are provided in case the automatic addition of this one produces a carry through any one or more of the other decimal orders of the display counters. The operation of these devices is believed to be obvious. For, if the No. 9 tube 4606 had been operated then the pulse over conductor 4411 would have caused the operation of the primed tube 4607 which thereupon transmits a pulse to the common firing circuit of the next in order denominational counter consisting of the tubes 4600 to 4603 inclusive.

When the display is ordered as hereinbefore stated through the operation of either one of the tubes 3908 or 3909 the pulse on the conductor 3912 fires the tube 4700 and the tube 4702. The tube 4702 establishes an electronic circuit whereby the tube 4703 may be fired at the end of the generator cycle, that is, the pulse at the end of the generator cycle in which the quantity to be displayed is transferred will find a path through the tube 4702 and will cause the firing of the tube 4703. Tube 4703 operates the triode 4704 which through the operation of the two impedance coils 4705 and 4706 and the condenser 4707 will transiently depress the potential of the conductor 4708 constituting the source (1). This will extinguish all of the pattern tubes, the shift tubes and others concerned in the actual calculation.

The pulse over conductor 3912 will also cause the operation of the tubes 4303, 4304, 4608, 4609, 4900, 4901 and 4902, whereby the electronic paths between the output conductors from the accumulators and the firing circuits of the display counters are closed. By way of example, the conductor 4033 is extended through the tube 4303 to the firing circuit 4305 of the first display counter consisting of the tubes 4300 to 4302. Therefore, when the generator is put in operation a priming pulse over conductor 1603—0, 1603—1 or 1603—9 as the case may be will prime one of the tubes 4300, 4301 or 4302 respectively. At the same time a firing pulse over conductor 1604, let us say a particular conductor 1604—1, will find a path through the operated accumulator tube 4001, conductor 4033 through the tube 4303, conductor 4305 and in common to all of the tubes of this first display counter and that tube 4301 which by way of example is primed at this time will respond and will cause the lighting of its associated display lamp 4306. In the same manner the other three display counters will be operated.

It should be noted that since the tubes of the display counters may be primed over the conductors 1603 they may be either positive or negative. The last three display counters shown in Fig. 49 however, are primed over the conductor 1601 and therefore may not be inverted.

Thus a calculated quotient or root may be transferred from the counters of Fig. 29 to the display counters of Fig. 49 only as positive quantities, whereas the sums, products and remainders which are transferred from the accumulators to the display counters of Figs. 43 and 46 may be transferred either as positive or as negative quantities.

It will appear elsewhere in this specification that at one time or another when a start pulse is transmitted over the conductor 2300 that the display will be erased through the automatic operation of the power control circuit.

*The power control—On start*

A start pulse over the conductor 2300 will cause the operation of the tube 4709. This tube in operating will cause the operation of the triode 4710 which through the action of the two impedance coils 4711 and 4712 and the condenser 4713 will momentarily or transiently depress the potential on the conductor 4714 constituting the source (2). The momentary depression of the potential on this source (2) will erase and extinguish any display which may be in existence at the time.

At the end of the calculation which takes place in response to the starting pulse the tube 4700 will be operated as hereinbefore described and this will cause the extinguishment of the tube 4709 so that it will be in condition to respond to a start pulse on a subsequent operation.

At the end of the calculation as hereinbefore described the tube 4702 will be operated and shortly thereafter a pulse will be passed therethrough from conductor 2211 to fire the tube 4703. The firing of tube 4703 will result in the operation of the triode 4704 and therefore the momentary depression of the potential on the source (1). The momentary depression of the source (1) will extinguish the tube 4702 and this tube in restoring to its normal non-operated condition will cause the operation of the tube 4715 through the sudden rise in potential on the slotted anode of the tube 4702 constituting a positive pulse. The tube 4715 acts as an extinguisher for the tube 4703 and therefore will extinguish this tube and allow the triode 4704 to restore to its normal non-operated condition. The tube 4715 will remain in operation until the potential of the source (2) is momentarily depressed or until the tube 4703 is operated.

Further operations of the circuits of this computer will be found in the following description of the sequence of operations taking place under the conditions encountered when problems in addition, multiplication, division and square root are performed.

*Addition*

The first operation in a problem of addition is the operation of the addition key 1803. This results in the immediate and direct firing of tubes 1700, 1701, 1702, 1703, 1704 and 1705. The actual firing of the last of these, 1705, is delayed slightly by the network consisting of the resistances 1706 and 1707 and the condenser 1708 to prevent a false pulse being transmitted into the start wire 2200. It will be seen that the tube 1701 fires tube 2301 and that this tube back-fires into the start wire 2300. While the firing of tubes 1705 and 2301 is practically simultaneous the delay network is introduced into the firing circuit of tube 1705 to make it equal to or even slightly later than the firing of tube 2301 thus avoiding a false pulse created by the back-fire of tube 2301 being communicated through the tube 1705 if this tube has fired and is ready to pass the pulse from 2301. The results of the firing of these six pattern tubes is as follows:

Tube 1700 creates and transmits a pulse into conductor 1709 to fire the tube 2302 which operates the triode 2303 which by creating an IR drop in the resistance 2304 so lowers the potential of the source (3—4) that none of the tubes depending thereon will operate.

Tube 1701 creates and transmits a pulse into conductor 1710 to fire the tube 2301 which operates the triode 2305 which by creating an IR drop in the resistance 2306 so lowers the potential of the source (3—3) that none of the tubes depending thereon will operate. Conductor 1710 also extends to the firing circuit of tubes 2401 and 2402 so that these two tubes also fire at this time to establish electronic circuits between the negative sum conductor 2613 and the negative generator selector wire 1900 and the positive sum conductor 2612 and the positive generator selector wire 1600 respectively.

Tube 1702 creates and transmits a pulse into conductor 1711 to fire the tube 2307 which operates the triode 2308 which by creating an IR drop in the resistance 2309 so lowers the potential of the source (3—2) that none of the tubes thereon will operate. Thus the three sources of positive potential (3—2), (3—3) and (3—4) are rendered ineffective for addition.

Tube 1703 establishes an electronic circuit between the conductors 1713 and 1714 for use at a later stage of the operations when the order to display is given.

Tube 1704 creates and transmits a pulse into conductor 1715 to fire the first tube 2600 of the progress circuit of the entry registers and the zero tubes 2610, 2620, 3000 and 3001 of the four registers for the first factor.

Tube 1705, as hereinbefore noted, establishes an electronic circuit between the conductors 2300 and 2200 so that when the start pulse is transmitted over conductor 1811 it will find a path closed to the start conductor 2200 of the generator.

Tube 2307 in addition to operating the triode 2308 creates a pulse and transmits it into conductor 2310 to fire the positive sign tubes 2614, 2615 and 2700 as well as the tubes 2616 and 2617 which establish start circuits between the positive sum conductor 2612 and the start wire 2300 and between the negative sum conductor 2613 and the start wire 2300 respectively. Thus initially the start wire 1811 is extended over an electronic circuit including the plus sign tube 2700, conductor 2701, plus sign tube 2614, positive sum conductor 2612, tube 2616, start wire 2300, tube 1705 to the generator start wire 2200 so that when the start pulse is transmitted the generator will be started. It may also be noted here that if later the minus sign tubes 2602 and 2603 are fired this start circuit will be altered without changing this last result. The circuit will then be traced from conductor 2701, through tube 2602, the negative sum conductor 2613, the tube 2617 to conductor 2300 so that the start pulse in this case will also be transmitted to properly start the generator.

The pattern for the calculation in addition is now all set. Since subtraction is algebraically the same as addition either problem may now be performed the result depending on the intelligent use of the sign keys in entering the factors.

At this stage, if the problem is the first use of the device, then the clearing out key 2100 will be operated and this will result in setting the accumulators to zero. If this is a later stage of a calculation and the factor is an addend, the augend having previously been accumulated either by direct entry or as the result of some previous calculation the clearing out key will not be operated. In any case the accumulators must have some value standing thereon. If the value is a previously accumulated one it will be on display but if it is zero from the action of the clearing out key it will not be on display.

In any case the factor, augend, addend, minuend or subtrahend is now entered by the operation of one of the sign keys followed by the operation of the digit keys to register four digits (reading from left to right of a number).

The single factor consisting of a sign, plus or minus, and four digits is then entered in the first factor registers shown in Figs. 26 and 30. If the quantity is positive the positive sign tubes 2614 and 2615, heretofore fired, will remain in operation with the ultimate result that a path will have been established from the start conductor 1811, through tube 2700, conductor 2701, the positive sign tube 2614, the positive sum conductor 2612, tube 2402 to conductor 1600, the positive generator selecting conductor. If the quantity is negative, as when the factor is being entered as a negative addend or a positive subtrahend, then the negative sign tubes 2602 and 2603 will be fired and an electronic circuit will be established from the start conductor 1811, through tube 2700, conductor 2701, the negative sign tube 2602, the negative sum conductor 2613, tube 2401 to conductor 1900, the negative generator selecting conductor. The operation of one of the sign keys will cause a transmission of a pulse either through the plus tube 2616 or the minus tube 2617 to the conductor 2300 which will then be transmitted through the pattern tube 1705 to the start conductor 2200. Upon the operation of any one of the digit keys a pulse will be transmitted over conductor 1809 which extends into Fig. 22 where it causes the tube 2217 to fire which in turn transmits a pulse to the start wire 2200. Thus, the generator is started upon the depression of each of the entry keys to cause the entry of a selected digit into the appropriate register. As each of these entry keys is operated the sequence or progress circuit is advanced through the successive firing of the tubes 2600, 2604, etc. Each digit of the factor is entered on one of the registers whose zero tubes are respectively tubes 2610, 2620, 3000 and 3001. When the factor has been completely entered and checked by the operator through observation of the entry register lamps such as the lamp 2611, the device is ready to be started.

If a mistake has been made in entry the device may be cleared by the operation of the clearing out key. This of course will also release the amount standing on the accumulators at this time, no provision being made herein for the individual release of the entry registers, though if this is believed important, any conventional means might be employed.

The device being ready to start, the start key 1800 is operated and a pulse is transmitted over conductor 1811, reaching the positive generator selector tube 1605 or the negative generator selector tube 1905 over one or the other of the electronic circuits above described.

The pulse on the positive sum conductor 2612 or the negative sum conductor, as the case may be, will then either pass through the tube 2616 or the tube 2617, to conductor 2300 whereby it finds a path through the tube 1705 to the generator start wire 2200 to fire the start tube 2202.

It may be noted that when the addition key 1803 was operated the tubes 1705 and 2301 simultaneously back-fired into the start conductor 2300. The only effect which this could have had at that time was to erase the display. This is brought about as follows:

The pulse on conductor 2300 as hereinbefore described causes the tube 4709 to fire and operate the triode 4710, whereby the source (2) is transiently depressed and thus erases the display.

The transmission of the start pulse will also cause the operation of the generator through a single cycle. If the quantity entered in the first factor registers is a plus quantity then the positive sum wire 2612 will be effective and hence the start pulse over conductor 1811 through tube 2700, conductor 2701, tube 2614 and conductor 2612 will be transmitted through the fired tube 2402 to thereby select the positive generator over the conductor 1600. At the same time this pulse will be passed through the tube 2616 and thence to the start wire 2300 to pass a pulse through the tube 1705 to the generator start wire 2200. Under this condition the accumulator registers will be primed over the wires of the group 1603 and fired over the conductors of the group 1604 through the entry tubes, conductor 2622 and the first group of shift tubes 3506 to 3509 heretofore fired over conductor 2311 through tube 2301 from the start pulse on conductor 2300 in the manner hereinbefore set forth.

At the end of this accumulation and upon the firing of the tube 4012 the tube 4104 is fired to transmit a pulse over the conductor 1713. This pulse will be transmitted through the tube 1703 over conductor 1714 through the tube 3908 and over the conductor 3912 to start the display as hereinbefore described under the title "The Display." It will also be noted that the pulse on conductor 3912 will transiently depress the potential on the source (1) so that all of the pattern tubes and shift tubes concerned in this calculation are returned to normal.

The pulse on conductor 3912 also extends to the tube 2216 in the generator circuit which responds and transmits a pulse into the generator start wire 2200 to cause the transfer of the amount standing on the accumulator to the display tubes.

Had the amount entered in the entry tubes been a negative quantity then the start pulse would have been transmitted over the negative sum wire 2313 through the tube 2401 into the negative generator selector conductor 1900 to thus select the negative generator for the next operation. The pulse on conductor 2613 would pass through the tube 2617 to transmit the pulse over the start wire 2300 thence through the tube 1705 to the generator start wire 2200 in the same manner as hereinbefore described.

It should be noted that the memory tube 4402 or 4403 controls the selection of the generator for the transfer of the amount standing on the accumulator to the display tubes in the manner also hereinbefore described.

In problems of addition and of subtraction each amount is entered as a separate problem, that is, the augend is entered as one problem and when that has been accumulated and displayed, the operator must then again press the addition pattern key and enter the addends. As hereinbefore stated, a pulse on conductor 3912 at the end of an accumulation will transiently depress the potential on source (1) so that all of the pattern tubes and shift tubes are returned to normal. Therefore, the amount accumulated is retained and other amounts may be added to this. As many augends, minuends, addends or subtrahends as wished may thus be entered, each as a separate problem. It may be noted in Fig. 12 that the conductor 122 is labeled plus product, plus quotient, plus root, plus augend, addend and minuend, and minus subtrahend. This last label is what might be termed an algebraic fiction because the subtrahend is entered in exactly the same manner as an addend with the reservation that the operator will always reverse the sign. A subtrahend therefore which is actually minus in its characteristics must be entered as a positive quantity and hence will effect this positive wire 122 in Fig. 12 or 2612 in the more detailed drawings.

*Multiplication*

The first operation in a problem in multiplication is the operation of the multiplying key 1804. This results in the immediate and direct firing of tubes 1716 to 1720, inclusive.

Tube 1716 creates and transmits a pulse into conductor 2310 to fire the positive sign tubes 2614, 2615 and 2700 as well as the tubes 2616 and 2617 which establish start circuits to the wire 2300 as hereinbefore described. Since both factors the multiplicand and the multiplier will be entered and since the multiplier may be negative a path 2702 is provided for use when the minus sign tube is fired. Again the ultimate result will be the same, the provision of a starting path between the start wire 1811 and the conductor 2300.

Tube 1717 creates and transmits a pulse into conductor 1709 to fire the tube 2302 which operates the triode 2303 which operating on the resistance 2304 renders the source (3—4) ineffective during multiplication.

Tube 1718 creates and transmits a pulse into conductor 1710 to fire the tubes 2301, 2401 and 2402. Tube 2301 operates the triode 2305 which renders the source (3—3) ineffective during multiplication, and tubes 2401 and 2402 connect the negative product wire 2613 to the negative generator selector wire 1900 and the positive product wire 2612 to the positive generator selector wire 1600 respectively.

Tube 1719 closes an electronic circuit from the zero counting tubes 2500 and 2501 and the stop conductor 2201 to conductor 1721 to the common firing circuit of the controlling group of shift tubes 3509, 3904, 3907 and 3909 so that a shift may be made as soon as one of the zero counting tubes is energized.

Tube 1720 creates and transmits a pulse into conductor 1722 to fire the two tubes 1723 and 1724.

Tube 1723 creates and transmits a pulse into conductor 1715 to fire the first tube 2600 of the progress circuit of the entry registers and the zero tubes 2610, 2720, 3000 and 3001 of the four registers for the first factor, in this case the multiplicand.

Tube 1724 creates and transmits into conductor 1725 a pulse to fire the tube 2704 which prepares to fire the sixth tube in the progress circuit and the tubes 2705, 2706, 3100 and 3101, the zero tubes respectively of the four registers for the four digits of the second factor, in this case the multiplier. It should be noted that the source (3—2) is effective now and that the sources (3—3) and (3—4) are rendered ineffective. The counting tubes of Fig. 25 are energized from source (3—2).

The device is now ready for the entry of the factors. The clearing-out key may be operated or not as hereinbefore described. If some value is standing on the accumulators then if the clearing-out key is not operated the product of the two entered factors will be added to such number. If it is intended to use that number as a factor in the problem then the better practice is to erase it by operating the clearing-out key and enter that number as one of the factors. It may, however, be done by entering that number as a multiplicand (the first factor) and then enter the multiplier with a value of its second digit (the actual first digit of the true factor) decreased by one. That is, if 0222 is to be used as a multiplier it should be entered as 0122, because the effect of the number which is to be the multiplicand standing on the accumulators is as though it had already been transferred once from the entry registers.

The two factors of the problem in multiplication each consisting of a sign and four digits are then entered. The multiplicand is entered in the first factor registers shown in Figs. 26 and 30 and the multiplier is entered in the second factor registers shown in Figs. 27 and 31. A vertical line of tubes 2600, 2604 and so on down through Figs. 26 and 30 and a similar vertical line of tubes starting with the tube 2708 down through Figs. 27 and 31 comprise the progress circuit hereinbefore described. These tubes are sequentially fired during the entry of the two factors each consisting of a sign and four digits. Thus, upon the entry of the second factor the tube 2708 will be fired. Upon the operation of the sign key, the other four tubes in this vertical line will each be fired as four operations of the digit keys are carried out. Each of these tubes is associated with the horizontal string of tubes to the right thereof so that the tube 2708 is associated with the sign tubes 2700, 2703, 2704 and 2707 and the next in line progress tube is associated with the first denominational order tubes beginning with the zero tube 2705. Thus, the sequential operation of the entry keys will (walk) the progress circuit along so that the signs and digits are entered in the proper registers.

Either factor may be positive or negative and the sign of the product is at once determined so that either the positive product conductor or the negative product conductor is made effective. If the positive product conductor 2612 is effective, then the positive generator will be used and the multiplication will be performed by the iterative addition of the multiplicand regardless of the actual sign thereof. If the negative product conductor 2613 is effective, then the negative generator will be used and the multiplication will be performed by the iterative addition of the complement of the multiplicand regardless of the actual sign thereof.

The following two examples will illustrate the mathematical principles involved:

(+) 0.370 × (+) 0.220 = (+)0.0814
(−) 0.370 × (−) 0.220 = (+)0.0814

| | | |
|---|---|---|
| Accumulators set to zero | 0000 | |
| First addition of multiplicand | 0370 | |
| First accumulation | 0370 | |
| Second addition of multiplicand | 0370 | |
| Second accumulation | 0740 | First multiplier digit satisfied |
| Third addition of multiplicand. Shifted one place. | 0037 | |
| Third accumulation | 0777 | |
| Fourth addition of multiplicand. Shifted one place. | 0037 | |
| Fourth accumulation | 0814 | Second multiplier digit satisfied |
| Displayed as | (+) 0814 | |

(+)0.370×(−)0.220=(−)0.0814
(−)0.370×(+)0.220=(−)0.0814

| | | |
|---|---|---|
| Accumulators set to zero | 0000 | |
| First addition of multiplicand | 9630 | Complement of 0370 |
| First accumulation | 9630 | |
| Second addition of multiplicand | 9630 | Complement of 0370 |
| Second accumulation | 9260 | First multiplier digit satisfied |
| Third addition of multiplicand. Shifted one place. | 9963 | Complement of 0037 |
| Third accumulation | 9223 | |
| Fourth addition of multiplicand. Shifted one place. | 9963 | Complement of 0037 |
| Fourth accumulation—shifted | 9186 | |
| Displayed as | (−) 0814 | |

The two examples above of multiplication and inverted multiplication show the processes herein employed. It may be noted that in the device described, since no extra denominational order to the right is actually provided the products will actually be displayed as (+)0081 and (−)0082 respectively and while it may be argued that this is insufficiently accurate for practical purposes it will be noted that applicant herein discloses means which by simple extension could be made to give results perfect in accuracy.

The various combinations of fired sign tubes may be followed by reference to Fig. 12 and the start circuit may be traced through the tubes of Figs. 26 and 27. When the entry has been checked the device is ready to start.

The operator then manipulates the start key 1800 and the start pulse is transmitted as hereinbefore described to select and start the proper generator.

If the entered signs of the multiplicand and the multiplier are alike then the start pulse will be transmitted through the sign tubes to the plus product conductor 2612 so that the plus tube 2402 will be fired to transmit a pulse into the positive generator selector conductor 1600. This pulse will also be transmitted through the tube 2616 to the conductor 2300 through the tube 2301, conductor 2311 to fire the shift tubes 3402, 3506, 3507, 3508 and 3509. The tube 3508 in firing will create and transmit a pulse into the conductor 3910 leading to the transformer 2506. This pulse will traverse the windings of the transformer 2506 and fire the tube 2505 which thereupon transmits a pulse into the generator start wire 2200. The positive generator having been selected and the generator started, the multiplier digit in the second denominational order register of the second factor will be transmitted by a pulse over one of the conductors in the group 1602 thence over the conductor 2712 in the group 2710 and through tube 3402, conductor 1713 to fire that one of the counting tubes of Fig. 25 which is primed at this time. The priming of these tubes will be over a corresponding one of the wires in group 1601.

If this first multiplier digit is a zero then the tube 2500 will be fired since it receives a zero pulse over the conductor 1602—0 through transformer 2510 at the same time that a zero pulse is connected to the conductor 1713. In the manner hereinbefore set forth the tube 2500 will transmit a pulse into the generator stop wire 2201 and cause a pulse to be transmitted over the conductor 1721 to shift the column arrangement by causing the operation of the tubes 3901 to 3904. Actually, the pulse on conductor 1721 fires the tube 3904 which is primed by the tube 3509 and the tube 3904 in turn transmits a pulse into the common firing circuit of the tubes 3803, 3901, 3902 and 3903. As this group of tubes is fired each will cause its companion to be extinguished, that is, the tube 3903 in firing will extinguish the tube 3508, the tube 3902 in firing will extinguish the tube 3507, and the tube 3901 in firing will extinguish the tube 3506. The end tube of the generator 2210 also transmits a pulse over the conductor 2211 to fire the tube 3805 and this tube through the combination of the two impedances 3807 and 3808 and the condenser 3809 will momentarily depress the potential on lead (3—2) to the multiplier digit shift tubes 3402, 3803 and 3804 so that by the time the tube 3904 is fired, the tube 3803 is ready to be fired.

If the multiplier digit had been one of the digits 1 to 9 inclusive, then some one of the counting tubes 2591 to 2504 would have been operated and the multiplicand entered in the first factor registers would have been transferred to the accumulators in the manner hereinbefore described. When this amount has been completely accumulated then the signal that the carry operation has been completed will be transmitted as a pulse over the conductor 1713 to fire the next lower-numbered counting tube in order. In this manner the multiplicand will be accumulated a number of times equal to the value of the multiplier digit and when this counting chain has counted out to zero so that the tube 2501 is operated, then a pulse will be transmitted into the generator stop wire 2201 and the shift to the next set of column shift tubes will be made.

As an example, let us show the multiplication 1234×0222=273948. If the multiplicand 1234 has been accumulated in some previous operation and is to be used without clearing the device, then the multiplier becomes 122 and the steps are as follows:

| | |
|---|---|
| Accumulators are already set at | 1234 |
| First addition of multiplicand through shift tubes **3506**, **3507**, **3508**, **3509** | 1234 |
| First accumulation (first multiplier digit satisfied) | 2468 |

| | |
|---|---|
| Second addition of multiplicand through shift tubes 3901, 3902, 3903, 3904 | 0123 |
| Second accumulation | 2591 |
| Third addition of multiplicand through shift tubes 3901, 3902, 3903, 3904 | 0123 |
| Third accumulation (second multiplier satisfied) | 2714 |
| Fourth addition of multiplicand through shift tubes 3901, 3905, 3906, 3907 | 0012 |
| Fourth accumulation | 2726 |
| Fifth addition of multiplicand through shift tubes 3901, 3905, 3906, 3907 | 0012 |
| Fifth accumulation (third multiplier digit satisfied) | 2738 |
| Displayed as (+) | 2738 |

It is believed that the rest of the operations in multiplication are clear since they are duplications of those just described.

When the final product has been established the last shift will cause the operation of the tube 3909 which was primed by the tube 3907 and this tube will, like tube 3908, transmit a pulse into the wire 3912 with the same results as those heretofore described.

It is believed to be clear that if the multiplicand and the multiplier have unlike signs that then the start pulse will be transmitted through the sign tubes to the minus product conductor 2613, the tube 2401 to in turn select the minus generator over the conductor 1900. In this case the multiplicand will be transferred from the entry registers to the accumulators as a complement. Also, in this case the final product will be in the form of a complement and since the negative memory tube is at that time operated the transfer of this final product to the display counters will be by the negative generator so that the actual result displayed will be positive in character but accompanied by the minus display sign.

It may especially be noted at this time that if there is a plus quantity standing on the accumulators and it is wished to add to this the product of two factors which would algebraically produce a plus product that the problem in multiplication may be entered in the usual manner. It will not be possible however, to attempt to add a positive product to a negative quantity already standing on the accumulators except in the unlikely event that the multiplicand accumulated for the first time will produce a positive quantity, that is, the multiplicand must be greater in value than the negative quantity standing on the accumulators. It has been pointed out hereinbefore that while this device is capable of a number of algebraic operations, no attempt has been made to make its operation universal.

*Division*

The first operation in a problem in division is the operation of the dividing key 1802. This results in the immediate and direct firing of the tubes 2000 to 2004, inclusive.

Tube 2000 creates and transmits a pulse into conductor 2006 to fire the tubes 2403 and 2404 which close through electronic circuits from the negative quotient conductor 2613 to the conductor 2405 and from the positive quotient conductor 2612 to the conductor 2406 (conductors 127 and 126 of Figs. 12 and 13) for purposes which will appear hereinafter.

Tube 2001 closes through an electronic circuit from the start conductor 2300 to conductor 2007 for the purpose of placing quotient digit counting circuit in operation.

Tube 2002 creates and transmits a pulse into conductor 1709 to fire the tube 2302 which operates the triode 2303 and which in turn operating on the resistance 2304 renders the source (3—4) ineffective during operations in division.

Tube 2003 creates and transmits a pulse into conductor 1711 to fire the tube 2307 which operates the triode 2308 and which in turn, operating on the resistance 2309, renders the source (3—2) ineffective at this time. It will thus be noted that during division the source (3—3) is effective and the sources (3—2) and (3—4) are rendered ineffective. The source (3—3) energizes the quotient digit counters, the "flip-flop" device (Fig. 24) for controlling the shift from counter to counter and the "flip-flop" device for selecting the positive or negative generator in response to the sign of the last calculated remainder.

Tube 2004 creates and transmits a pulse into conductor 1722 to fire the two tubes 1723 and 1724.

Tube 1723 creates and transmits a pulse into conductor 1715 to fire the first tube 2600 of the progress circuit of the entry registers and the zero tubes 2610, 2620, 3000 and 3001 of the four registers for the first factor, in this case the divisor.

Tube 1724 creates and transmits a pulse into conductor 1725 to fire the tube 2704 which prepares to fire the sixth tube in the progress circuit (for the sign of the second factor) and the tubes 2705, 2706, 3100 and 3102, the zero tubes respectively of the four registers for the four digits of the second factor, in this case the dividend.

The pattern tubes for division now having been fired the device is ready for further manipulation. The clearing-out key must be operated and the divisor and dividend entered in the normal manner. If a number is standing on the accumulators and it is wished to use this number as a dividend then the problem is entered in the normal manner except that the value 0000 is used in the entry of the dividend. Thus on the first calculating operation consisting of the transfer of the dividend from the entry registers to the accumulator registers, the value 0000 will be added to the number already standing there after which the calculation will proceed as follows. If the number standing on the accumulators is displayed with a minus sign then the dividend will have to be entered as —0000, otherwise the device will use the complement of the number displayed as a dividend.

The two factors of the problem in division each consisting of a sign and four digits are now entered. The divisor is entered in the first factor registers shown in Figs. 26 and 30 and the dividend is entered in the second factor registers shown in Figs. 27 and 31.

Either factor may be positive or negative and the sign of the quotient is at once determined so that either the positive quotient conductor or the negative quotient conductor is made effective. If the positive quotient conductor is effective, then the positive generator will be used to transfer the dividend to the accumulators and thereafter the negative generator will be used to transfer the divisor to the accumulators as a subtrahend, the dividend thus being iteratively diminished to exhaustion. If the negative quotient conductor is effective, then the negative generator will be used to transfer the dividend in the form of a complement to the accumulators and thereafter the positive generator will be used to transfer the divisor to the accumulators as an addend, the complement of the dividend thus being iteratively diminished to exhaustion. Both division and inverted division will thus be performed regardless of the actual sign of any particular factor.

$$\frac{+0.223}{+0.220}=+1.01 \qquad \frac{-0.223}{-0.220}=+1.01$$

| | |
|---|---|
| Dividend transferred to accumulators | 0223 |
| Complement of divisor—added | 9779 |
| First remainder | 0002 |
| Complement of divisor—shifted twice | 9997 |
| Final remainder | 9999 |
| Quotient+1.01 ............ remainder | 0 |

$$\frac{+0.223}{-0.220}=-1.01 \qquad \frac{-0.223}{+0.220}=-1.01$$

| | |
|---|---|
| Complement of dividend transferred | 9776 |
| Divisor added | 0220 |
| First remainder | 9996 |
| Divisor—shifted twice—added | 0002 |
| Final remainder | 9998 |
| Quotient−1.01 ............ remainder | .001 |

The two examples above, of division and of inverted division, show the processes herein employed. Due to the fact that the device cannot know that another subtraction will produce an overdraft it is necessary mechanically to continue the iterative addition of the complement of the divisor until an overdraft has actually occurred and to then rectify the error. The above examples are therefore intended to show only the principles involved in division and in inverted division. In either case the quotient digits are the results of counting the number of operations and are always positive. In the following description it will be shown how the sign of the final remainder determines the sign of the quotient.

The operator now manipulates the start key 1800 and the start pulse is transmitted as hereinbefore described to select and start the proper generator. If the dividend and the divisor have like signs then the quotient will be plus and the positive quotient wire 2612 will be used for the transmission of the start pulse through the tube 2404 to fire the tube 2414 and thus select the positive generator over the conductor 1600. At the same time the pulse on the positive quotient conductor 2612 will be passed through the tube 2616 to the start wire 2300 through the pattern tube 2001, the conductor 2007 to fire the tube 2802 as hereinbefore described which in turn will create and transmit a pulse over the generator start wire 2200.

The pulse over the plus quotient conductor 2612 is also transmitted over the conductor 2406 to operate the tubes 2410, 2411, 2412 and 2413 to control the series of sign indications at the end of each accumulation so that the shift between quotient digit counters may be made at the proper time. Since the quotient is indicated as being positive, the operation will be one in division, that is, the dividend is entered as a positive number and then diminished step-by-step through the iterative addition of the complement of the divisor until this dividend is exhausted.

The pulse passed through tube 2001 to conductor 2007 causes the tubes 2013, 2015, 3400, 3401, 3800 and 3801 to fire. The last four of these tubes constitute means for establishing electronic circuits between the entry registers and the accumulators so that the dividend registered in the second factor registers is now transferred to the accumulators. By way of example, upon the operation of the positive generator, if the tube 3104 has been fired to represent the digit one in the third denominational order of the dividend, then as the generator transmits its No. 1 pulse a firing pulse will be applied to the tube 3104 over the conductor 1602—1 and extended over the conductor 3102 in the group 2710, thence through the tube 3800, conductor 3405 to the common firing circuit of the register tubes in Fig. 45. At the same time a priming pulse will be extended over the conductor 1603—1 to prime the No. 1 tube in this register and this No. 1 tube being simultaneously primed and fired will respond in the manner hereinbefore described and will immediately transfer the value one to its associated accumulator. The other three denominational order accumulators will be similarly operated.

It should also be noted at this time that the pulse passed through tube 2001 to conductor 2007 also results in the firing of tubes 2800, 2801 and 2802. The firing of tube 2800 results in the transmission of a pulse over conductor 2810 which fires the tube 2806 and the three priming tubes of the quotient counters 2900, 2907 and 2913.

When the accumulation is complete a pulse will be transmitted over the conductor 1713 and passed by the tube 2015 to the conductor 2016 where it is extended through the tube 2806 to the common firing circuit of the first quotient digit counter to count the entry of the dividend. It should be noted that each of the quotient digit counter tubes such as 2901, 2902, 2908, 2914, etc. when fired transmits a pulse into the start wire 2200 to start the generators on the next cycle.

The pulse on conductor 4025 which through the firing of tube 4104 gave rise to the pulse on conductor 1713 also causes a sign indication through the transmission of a pulse over the positive wire 4002 in the manner hereinbefore described under the heading "The Carry Circuits." It was there stated that the pulse on conductor 4025 was transmitted through the transformer 4026, the tube 4011, the transformer 4027, the conductor 4015 and thence through either the zero tube 4000 or the No. 9 tube 4009 (in the present case the zero tube 4000), the transformer 4014 to the conductor 4002. The pulse on the positive wire will travel in one direction through the tube 2410 to the primary wire 2415 of the 4-tube arrangement herein called a "flip-flop" and in another direction through the tube 2412 for transmission over the negative generator selector wire 1900. Thus the fact that a positive dividend has been transferred to the accumulators now controls the next operation by selecting the negative generator to transfer the complement of the divisor to the accumulators.

At the end of the generator cycle during which the dividend was transferred to the accumulators the generator sends an end-of-cycle pulse over the conductor 2211 which fires the tube 3802 and thereby extinguishes the tubes 3400, 3401, 3800 and 3801. The firing of tube 3802 also creates and transmits into the conductor 2311 a pulse which will now cause the operation of the tubes 3506 to 3509 inclusive for the purpose of transferring the divisor to the accumulators in the corresponding denominational orders. The operation of the counter tube 2901 transmits a pulse into the generator start wire 2200. The accumulator register tubes again are primed over the conductors of the group 1603 and are fired over the conductors of the group 1604. Since the negative generator is now in operation the nine's complement of the divisor registered in the first factor registers of Figs. 26 and 30 will be transferred to the accumulators. It will be noted that under normal conditions a number of subtractions of the divisor will have to be made and in each case a positive remainder will be produced. In each case the production of this positive remainder will result in a pulse over the positive wire 4002 to thus transmit a pulse over the conductor 2415 which at this time is ineffective since the tube 2409 has not been fired. Also, the positive pulse over the conductor 4002 extended through the tube 2412 will continue the operation of the negative generator.

When the dividend has been exhausted then an overdraft will be made so that the next remainder is negative in sign. Therefore, the result of the overdraft will be the production of a pulse transmitted over the conductor 4003 which now is extended through the tube 2411 to the secondary conductor 2416 of this "flip-flop" for the purpose of firing the tube 2409. Also the pulse over the conductor 4003 will find a path through the tube 2413 to the positive generator selector conductor 1600 so that as a result of the overdraft the positive generator is selected for the next operation in order to restore the overdraft. Upon the next operation of the generator then the divisor will be transferred from the first factor entry tubes to the accumulators in its natural form and will therefore result in another positive remainder. This positive remainder is signaled by a pulse over the conductor 4002 which again is extended through the tube 2410 to the primary wire 2415 and in this case through the tube 2409 now operated to the conductor 2407 thence through the tube 2013 to the conductor 2014 to cause the operation of the tubes 2803 and 2804. The tube 2803 advances the progress circuit for the quotient digit counters by transmitting a pulse to the common firing conductor for tubes 2807, 2808 and 2809 and the tube 2804 transmits a pulse into the conductor 2811 to fire the tube 2408 and thus extinguish the tube 2409 preparatory to the calculation of the next quotient digit. The pulse on conductor 2811 is also transmitted through the tube 2801 to the conductor 1721 which is used for controlling the column shift tubes so that the divisor hereafter will be shifted one place to the right. The pulse on conductor 1721 will fire the primed tube 3904 and thus extinguish the tube 3509 as well as priming the next tube 3907. The firing of the tube 3904 also transmits a pulse to fire the tubes 3901, 3902 and 3903. This pulse is also extended to the tube 3803 but since the source (3—2) is ineffective at this time this tube does not respond. The tube 3901 extinguishes the tube 3506, the tube 3902 extinguishes the tube 3507 and the tube 3903 extinguishes the tube 3508.

The remaining operations are similar to those hereinbefore described.

When the three quotient digits have been calculated the transmission of a pulse over the conductor 1721 will fire the tube 3909 which will thereupon transmit a pulse into the conductor 3912 for the purpose of ordering the display as hereinbefore described. It should be noted that wherever the dividend is positive that then the last remainder on the restoration of the last overdraft taken must be positive and hence the positive memory tube 4402 will be fired to cause the display of the plus sign and the transfer of the quotient digits to the counters of Fig. 49 and the remainder to the counters of Figs. 43 and 46 in a positive form.

It may also be noted at this time that had the signs of the dividend and the divisor been unlike that then the negative quotient conductor 2613 would have been provided as a path for the transmission of the start pulse so that the dividend would be transferred from the entry registers to the accumulators in the form of a complement and the divisor thereafter would be transferred in its natural form. The normal action thereafter would be the production of a series of negative remainders and followed by one positive remainder when the overdraft occurs and then another negative remainder upon the restoration of the overdraft. Under these conditions it will be evident that the final remainder will be negative so that the negative memory tube 4403 will be operated to control the display of the sign. In this case the quotient digits will be transferred in their form without inversion but the digits of the remainder will be inverted, the negative sign tube 4409 will be operated and a one to make up for the nine's complement will be transmitted over the conductor 4411.

Thus in division, whether the operation be one in division or one in inverted division will always produce the quotient as three counted digits and the remainder even though it be zero will be displayed in its natural form if the problem is one in division or in its complemental form if the operation be one in inverted division, in which case it will be realized that the remainder is being shown in its true form because it was standing on the accumulators at this time in its inverted form.

*Square root*

The first operation in a problem in square root is the operation of the square root key 1801. This applies positive potential (from the source (1)) to conductor 1818 to fire the tubes 2008, 2009, 2010, 2011, 2707, 3602, 3603, 3604 and 3605.

Tube 2008 creates and transmits a pulse into conductor 2006 to fire the tubes 2403 and 2404 which close through electronic circuits from the negative root conductor 2613 to the conductor 2405 and from the positive root conductor 2612 to the conductor 2406 (conductors 127 and 126 of Figs. 12 and 13) for purposes which will appear hereinafter.

Tube 2009 creates and transmits a pulse into conductor 1711 to fire the tube 2307 which operates the triode 2308 and which in turn operating on the resistance 2309 renders the source (3—2) ineffective at this time. It will thus be noted that during square root the two sources (3—3) and (3—4) are effective and that only the source (3—2) is rendered ineffective. The source (3—3) thus renders the root digit counters effective together with the double-pole double-throw switching "flip-flops" used for controlling the shift from counter to counter and the selection of the positive or negative generator for the next operation. The source (3—4) renders effective the subtrahend synthesizing counters, the "flip-flop" arrangement for shifting from counter to counter and various other control tubes used only in square root.

Tube 2010 creates and transmits a pulse into conductor 2012 for the purpose of operating the tubes 3501, 3502, 3503 and 3504 used to close electronic circuits from the four denominational order conductors from the subtrahend synthesizers to the shift tubes so that the subtrahends as synthesized may be successively used in the square root calculations.

Tube 2011 closes through an electronic circuit from the conductor 2300 to conductor 2007 for the purpose of placing the root digit counting circuit in operation.

Tube 2707 operates to prime the sixth tube 2708 in the entry register progress circuit since in square root the first factor registers are not used. The square, the number whose root is to to be extracted is entered in the registers for the second factor, those shown in Figs. 27 and 31.

Tube 3602 creates and transmits a pulse into conductor 3601 for setting up an initial synthetic subtrahend of 0100. The pulse on conductor 3601 will be transmitted through each of the transformers 3315, 3316 and 3705.

Tube 3603 establishes an electronic circuit between conductor 2311 and the firing circuit of the shift tubes 3206 and 3207 for controlling the orderly sequence in the synthesis of the subtrahends used in square root operations so that when the first set of shift tubes for transferring the square from the entry tubes to the accumulator register tubes is fired the subtrahend synthesizing circuit will be enabled.

Tube 3604 establishes an electronic circuit from the square root "flip-flop" to fire tube 3205 to respond to the change in sign produced when an overdraft is produced and to therefore prepare for a shift from one synthesizer counter to another.

Tube 3605 creates and transmits a pulse to fire tube 3204 which establishes an electronic circuit from the square root "flip-flop" to forward a pulse to the firing circuit for the odd-numbered tubes of the synthesizer counters.

The pattern for square root is now established. If a number is standing on the accumulators its square root may be extracted by entering 0000 as the square, care being taken to operate the sign key corresponding to the sign displayed. Otherwise the clearing-out key is operated whereby any number on the accumulators is dropped and the accumulators set to zero.

Square root involves but a single factor consisting of a sign and four digits which are now entered in the second factor registers shown in Figs. 27 and 31. It will be understood that when the square is a minus quantity the root is equal to the root as calculated multiplied by the square root of minus one. The negative sign displayed with the calculated root therefore represents the square root of minus one.

Since only one factor is entered the combination of sign tubes will render the positive or the negative root conductor active in strict accordance with the sign of the entered factor and the calculations will be normal or inverted as in division. The operations here are essentially the same as in division except that there is no divisor to be used as a subtrahend and so subtrahends according to a mathematical conception involving a series of odd numbers must be synthesized. The following two examples show the mathematical principles involved.

$$\sqrt{+.0450}=+.210$$

| | | Count |
|---|---|---|
| Square transferred | 0450 | |
| Complement of 1st synthetic subtrahend 0100 | 9899 | 0 |
| 1st remainder | 0349 | |
| Complement of 2nd synthetic subtrahend 0300 | 9699 | 1 |
| 2nd remainder | 0048 | |
| Complement of 3rd synthetic subtrahend 0500 | 9499 | 2 |
| Overdraft | 9547 | |
| Restoration | 0500 | |
| 3rd remainder | 0047 | |
| Complement of 4th synthetic subtrahend 0041 | 9958 | 0 |
| 4th remainder | 0005 | |
| Complement of 5th synthetic subtrahend 0043 | 9956 | 1 |
| Overdraft | 9961 | |
| Restoration | 0043 | |
| 5th remainder | 0004 | |
| Complement of 6th synthetic subtrahend 0004 | 9995 | 0 |
| Overdraft | 9999 | |
| Restoration | 0004 | |
| Last remainder | 0003 | |

The root .210 here calculated is inaccurate due to two factors, (1) the use of the nine's complement without the usual provision for the compensating "fugitive 1" and (2) the fact that only sufficient decimal denominational places have been provided to demonstrate the principles involved and not to provide accuracy. The extraction of the square root of 450 to at least nine places has been set forth at length hereinbefore. When the square is a minus quantity the operations will be as follows:

$$\sqrt{-.0450}=+.212\sqrt{-1}$$

| | | Count |
|---|---|---|
| Complement of square transferred | 9549 | |
| 1st synthetic subtrahend | 0100 | 0 |
| 1st remainder | 9649 | |
| 2nd synthetic subtrahend | 0300 | 1 |
| 2nd remainder | 9949 | |
| 3rd synthetic subtrahend | 0500 | 2 |
| Overdraft | 0449 | |
| Restoration—complement of 0500 | 9499 | |
| 3rd remainder | 9948 | |
| 4th synthetic subtrahend | 0041 | 0 |
| 4th remainder | 9989 | |
| 5th synthetic subtrahend | 0043 | 1 |
| Overdraft | 0032 | |
| Restoration—complement of 0043 | 9956 | |
| 5th remainder | 9988 | |
| 6th synthetic subtrahend | 0004 | 0 |
| 6th remainder | 9992 | |
| 7th synthetic subtrahend | 0004 | 1 |
| 7th remainder | 9998 | |
| 8th synthetic subtrahend | 0004 | 2 |
| Overdraft | 0002 | |
| Restoration—complement of 0004 | 9995 | |
| 8th remainder | 9997 | |
| Displayed as | —0002 | |

The display of the minus sign will mean that the root is to be read as:

root $.212\sqrt{-1}$ with remainder .002

The two examples above of square root and inverted square root show the processes herein employed. As in division an overdraft is made and then rectified, so that the above examples are intended to show only the principles involved. In either case the root digits are the results of counting the number of operations and are always positive. The sign of the root is taken from the final remainder and will be explained in detail hereinafter.

The operator now manipulates the start key 1800 and the start pulse is transmitted as hereinbefore described to select and start the proper generator.

The operations hereafter area exactly like those described under division with the exception that the generator is started through the tube 2011 instead of tube 2001. In addition the "flip-flop" comprising tubes 3200, 3201, 3202 and 3203 are used for the purpose of synthesizing the subtrahends which are used instead of the divisor under the operations in division. It will be realized that in division the divisor is constant, whereas in square root the subtrahends are each of a different value. The synthesis of the subtrahends has been explained hereinbefore so that nothing now remains to be explained. As hereinbefore pointed out, if the square is entered as a negative number then the final remainder will be negative in character, the negative memory tube 4403 will be operated, and the negative sign displayed. It will be understood that in the case of the square root operations the display of the negative sign is equivalent to the display of the value, the square root of minus one.

*Example in operation—Square root*

The following example will be given in the form of a bare set of facts since the circuits have all been described in detail hereinbefore:

(1) The clearing-out key 2100 is operated resulting in the firing of tube 2102.

(2) Tube 2102 transmits a pulse to fire tube 2103.

(3) Tube 2103 operates the triode 2106 which lowers the potential on conductor 2108 so that all tubes depending thereon are extinguished.

(4) Tube 2102 depending upon the source (3) is extinguished and in the process provides a delayed pulse to fire the tube 2112.

(5) Tube 2112 extinguishes the tube 2103 and this allows the triode 2106 to return to normal so that the potential of source (3) is raised to normal.

(6) Tube 2103 in becoming extinguished fires the tube 2117 which in turn transmits a pulse into conductor 2118 and at the same time fires the tube 2122.

(7) The pulse on conductor 2118 is transmitted in parallel to the primaries of four transformers so as to forcibly fire the carry tubes 4011, 4211, 4511 and 4811.

(8) Tube 2122 transmits a pulse into the conductor 2123 which extends in parallel through four transformers to fire the zero tubes such as 4000 of each of the accumulators, thus setting such accumulators to zero.

(9) Square root key 1801 is operated.

(10) The resulting pulse on conductor 1818 fires tubes 2008, 2009, 2010, 2011, 3602, 3603, 3604, 3605 and 2707.

(11) Tube 2008 transmits a pulse over conductor 2006 and fires tubes 2403 and 2404.

(12) Tube 2009 transmits a pulse over conductor 1711 and fires tube 2307.

(13) Tube 2307 operates triode 2308 to render source (3—2) inactive leaving sources (3—3) and (3—4) active.

(14) Tube 2307 transmits a pulse over conductor 2310 and fires tubes 2614, 2615, 2616, 2617 and 2700.

(15) Tube 2010 transmits a pulse over conductor 2012 and fires tubes 3501, 3502, 3503 and 3504.

(16) Tube 2011 closes an electronic circuit between conductors 2300 and 2007.

(17) Tube 3602 transmits a pulse over conductor 3601 to establish the first synthetic subtrahend 0100, firing tubes 3303, 3306, 3710 and 3704.

(18) Tube 3603 closes an electronic circuit between conductor 2311 and firing circuits for tubes 3206 and 3207.

(19) Tube 3604 closes an electronic circuit between the negative remainder wire of the square root flip-flop and the firing circuit for tube 3205.

(20) Tube 3605 fires tube 3204 so that each positive remainder may be counted on the odd-numbered tubes of the second denominational order synthetic subtrahend counter.

(21) Tube 2707 transmits a pulse into conductor 1725 to fire tube 2704 and the zero tubes 2705, 2706, 3100 and 3101 of the four denominational orders of the second factor entry registers.

(22) Tube 2707 primes the first progress tube 2708 of the second factor.

(23) The positive entry key is operated and the resulting pulse on conductor 1807 is extended through the tube 2704 to operate the progress tube 2708.

(24) The progress tube 2708 primes the next progress tube 2713 for the first denominational order but does not affect the sign tubes since the sign tube 2700 has already been fired.

(25) The zero entry key is operated to transmit a pulse over the conductor 1809 to fire the next progress tube 2713 whereupon the progress tube 2708 is extinguished. The pulse over conductor 1809 is also transmitted to the generator start circuit where it fires the tubes 2217 and 2218.

(26) Tube 2218 fires a pulse into the plus generator selector wire 1600 and tube 2117 fires a pulse into the start wire 2200 to start the generator.

(27) A pulse from the generator over conductor 1602—0 will be transmitted through the zero entry key over conductor 1806 through the progress tube 2713 for the first denominational order just fired to the zero tube 2705 which is unaffected at this time since it has already been fired.

(28) The No. 4 entry key is operated resulting in the firing of the next progress tube 2714 and the No. 4 tube in the second denominational order of the second factor (Fig. 27), and the consequent extinguishment of the zero tube in this register.

(29) The No. 5 entry key is operated resulting in the firing of the next progress tube 3105 and the No. 5 entry tube of the third denominational order (Fig. 31), and the consequent extinguishment of the zero tube in this register.

(30) The No. 0 entry key is operated resulting in the firing of the next progress tube 3106 and the transmission of a pulse to fire the zero entry tube 3101 of the fourth denominational order, without effect at this time because this tube has already been fired. The device is now ready for operation.

(31) The start key 1800 is operated, momentarily depressing the potential of source (3—5) and extinguishing tube 3106.

(32) The start key 1800 operated, transmits a pulse over the conductor 1811.

(33) The pulse in conductor 1811 is transmitted through tube 2700, conductor 2701, tube 2614, conductor 2612, tube 2404, conductor 2406 to fire the tubes 2410, 2411, 2412, 2413, 2414, 3200 and 3201.

(34) The pulse on conductor 2612 is transmitted through the tube 2616, conductor 2300, tube 2011, conductor 2007 to fire tubes 2013, 2015, 2800, 2801, 2802, 3400, 3401, 3800 and 3801.

(35) The pulse on conductor 2300 causes the firing of the tube 4709 and the consequent operation of the triode 4710 thus momentarily depressing the potential on the source (2) to wipe out any display. Since there is no display at this time, this is without effect.

(36) Tube 2414 transmits a pulse into conductor 1600 to select the positive generator, and to fire tube 4820.

(37) Tube 2013 closes an electronic circuit between the conductor 2407 and conductor 2014.

(38) Tube 2015 closes an electronic circuit from the conductor 1713 to the conductor 2016.

(39) The tubes 3400, 3401, 3800 and 3801 prepare electronic circuits for transferring the four digits of the square, registered in the first, second, third and fourth denominational orders of the second factor register into the wires 3403, 3404, 3405 and 3406, respectively, so that these may be transmitted to the accumulator registers.

(40) Tube 2800 transmits a pulse into the conductor 2810 to cause the firing of tubes 2806, 2900, 2907 and 2913.

(41) The tube 2801 closes an electronic circuit between the conductor 2811 and the conductor 1721.

(42) The tube 2802 transmits a pulse into the start conductor 2200 to start the generator.

(43) The generator having been selected through tube 2414 and started through the firing of the tube 2802, the square is now transferred to the accumulators.

(44) The zero tube 4006 is primed over the conductor 1603—0 and fired over the conductor 1602—0 extending through the zero tube 2705 of the first denominational order, conductor 2711, tube 3400, conductor 3403 to the firing point of the tube 4006.

(45) The No. 4 tube of the second denominational order accumulator (Fig. 42) is primed over the conductor 1603—4 and fired over the conductor 1602—4 through the No. 4 tube of the second denominational order (Fig. 27), conductor 2712, tube 3401, conductor 3404 to the common firing point of the accumulator register tubes for the second denominational order (Fig. 42).

(46) The No. 5 tube in the third denominational order accumulator is fired in a similar manner.

(47) The No. 0 tube in the fourth denominational order accumulator (Fig. 48) is fired in a similar manner.

(48) At the end of the generator cycle the firing of the last tube 1613 transmits a pulse over conductor 2201 and fires the end tube 2210 which now transmits a pulse into the end of cycle conductor 2211. This causes the firing of tube 3802 and, therefore, the extinguishment of the tubes 3400, 3401 and 3800.

(49) The firing of tube 3802 transmits a pulse in conductor 2311 which fires the tube 3402 and the first set of shift tubes 3506, 3507, 3508 and 3509.

(50) The pulse on conductor 2311 is also transmitted through the tube 3603 to fire the shift tubes 3206 and 3207.

(51) The values in the accumulator registers are transferred to the accumulators in the manner hereinbefore described.

(52) When the accumulator registers have completely counted down, the the tubes 4007, 4207, 4507, and 4807 are fired.

(53) The operation of tubes 4007 and 4207 causes the operation of tube 4100 and the operation of tubes 4507 and 4807 causes the operation of tube 4101.

(54) The firing of tubes 4100 and 4101 results in the firing of tube 4102 and this transmits a pulse over the conductor 4103 through the tube 4820 to conductor 4822.

(55) Since the carry tubes 4811, 4511, 4211 and 4011 have been left undisturbed, the tubes 4812, 4512, 4212 and 4012 are primed and are now operated, resulting in a pulse over the conductor 4025.

(56) The pulse in conductor 4025 fires the tube 4104 which transmits a pulse into the conductor 1713 which is passed by the tube 2015 to the conductor 2016 transmitted through the tube 2806 to the conductor 2815 to the common firing circuit of the first root digit counter to fire the tube 2901 and extinguish the tube 2900.

(57) The firing of tube 4104 operates the triode 4105 to momentarily depress the potential of source (3—1) to extinguish tubes 4100, 4101, 4102, 4012, 4202, 4512, 4812, 4007, 4207, 4507 and 4807.

(58) The pulse in conductor 4025 is also transmitted through the tube 4011, the transformer 4027, conductor 4015, the transformer 4016, through the tube 4000, the transformer 4014, conductor 4002, tube 2412 to conductor 1900, thus selecting the negative generator for operation. Memory tube 4402 is fired over conductor 4002.

(59) The pulse on conductor 1900 fires the tube 4821 and this through its mutual relation with tube 4820 causes the latter tube to be extinguished.

(60) The negative generator being selected over the conductor 1900, it is now started through the firing of the first tube 2901 in the root digit counter. The firing of tube 2901 transmits a pulse into the start wire 2200.

(61) The complement of the synthetic subtrahend 0100 is now transmitted to the accumulator registers.

(62) The No. 9 tube 4004 of the first denominational order is primed over conductor 1603—9 (from transformer 1915) and fired over conductor 1604—0, tube 3303, conductor 3301, tube 3501, tube 3506, conductor 3403 to the common firing point for the tubes of the first denominational order accumulator register (Fig. 40).

(63) The No. 8 tube in the second denominational order (Fig. 42) is fired through being primed over conductor 1603—8 and being fired over conductor 1604—1, tube 3306, conductor 3302, tube 3502, tube 3507, conductor 3404 to the common firing circuit of the second denominational order accumulator register (Fig. 42).

(64) The No. 9 tube of the register (Fig. 45) is fired in a similar manner.

(65) The No. 9 tube of the register (Fig. 48) is fired in a similar manner.

(66) The value 9899 now expressed on the accumulator registers is transferred to the accumulators in the manner hereinbefore explained (Items 51 to 60) so that the accumulators will then express the value 0349.

(67) At the end of the generator cycle the pulse over conductor 2211 fires tube 3805 and thereby extinguishes the tube 3402.

(68) During the accumulation the firing of tube 4102 extinguishes tube 4104.

(69) The completion of this accumulation is also signalled by a pulse over conductor 4025 which fires the tube 4104, as hereinbefore explained, placing a pulse on the conductor 1713 which now finds a path through the tube 2015 to conductor 2016 through the tube 2806, conductor 2815 to the common firing point of the tubes in the first root digit counter whereupon the tube 2902 primed by the tube 2901 fires and extinguishes the tube 2901.

(70) The remainder 0349 is positive and hence a pulse will go out over conductor 4002, through tube 2412 to the negative generator selector wire 1900.

(71) The pulse on conductor 4002 is now transmitted through tube 3200, tube 3204, tube 3206, conductor 3313 to the common firing point of the odd-numbered tubes in the second denominational order synthetic subtrahend counter whereby tube 3308 fires and tube 3306 is extinguished. Tube 3312 is also fired.

(72) The firing of tube 2902 transmits a pulse into the generator start wire 2200 whereupon the generator goes through another cycle.

(73) During this cycle the second synthetic subtrahend 0300 is transferred in its complemental form 9699 to the accumulator registers in the same manner as that hereinbefore described, and the count is advanced from tube 2902 to tube 2903 and the No. 5 tube (Fig. 33) is fired.

(74) The accumulation now becomes 0048 and since this is positive, another count will be made and the next synthetic subtrahend will be formed and transmitted to the accumulator registers as 9499. The count is now advanced from tube 2903 to tube 2904.

(75) This accumulation will be 9547 and having a 9 in its first decimal denominational order will this time cause a pulse to be transmitted over the conductor 4003 instead of over the conductor 4002. Memory tube 4403 is fired and tube 4402 is extinguished.

(76) The pulse on conductor 4003 will find a path through the tube 2413 to the positive generator selector wire 1600.

(77) The pulse on conductor 4003 is transmitted through tube 2411 to fire tube 2409.

(78) The pulse on conductor 4003 will also find a path through the tube 3201, thence through the tube 3604 to cause the tube 3205 to fire.

(79) Through the mutual relation between the tubes 3204 and 3205, the tube 3204 is now extinguished.

(80) In this instance, since the positive generator is selected, the last synthetic subtrahend 0500 is transferred in its natural form to the accumulator registers to produce the accumulation 0047 (due to the fact that no provision has been made herein for the addition of the compensating or fugitive 1, this remainder 0047 differs from the previous remainder 0048). The count is advanced from the tube 2904 to the No. 2 tube in this first digit root counter.

(81) At the end of the generator cycle during which the synthetic subtrahend 0500 in its true form is transmitted to the accumulators, a pulse on the end of cycle wire 2210 will be transmitted through the tube 3205 to cause the firing of tubes 3204, 3208 and 3610, extinguishing tubes 3205, 3207 and 3206.

(82) The firing of tube 3208 transmits a pulse over conductor 3314 whereby the No. 4 tube in the first synthetic subtrahend counter is fired and the No. 5 tube is extinguished.

(83) The firing of tube 3610 transmits a pulse over conductor 3703 to the odd-numbered tubes of the third denominational order subtrahend counter, thus advancing this counter by the firing of tube 3711 and the extinguishment of tube 3710. It should be noted at this time that the synthetic subtrahend stands on the counters as 0410.

(84) Since the restoration of the value 0500 produces a positive remainder, the resulting pulse on conductor 4002 will now be transmitted through the tube 2410, conductor 2415, tube 2409, conductor 2407, tube 2013, conductor 2014 to cause the tubes 2803 and 2804 to fire.

(85) The firing of tube 2803 transmits a pulse through the relay network to the common firing circuit for tubes 2807, 2808 and 2809. Tube 2807 being primed, now fires and extinguishes the tube 2806.

(86) The firing of tube 2804 transmits a pulse into the conductor 2811 which now finds a path through the tube 2801 into conductor 1721 which causes the firing of the primed tube 3904.

(87) Tube 3904 in firing causes the tubes 3803, 3901, 3902 and 3903 to fire. The firing of tube 3803 extinguishes the tube 3805. The firing of tube 3901 extinguishes the tube 3506. The firing of tube 3902 extinguishes the tube 3507. The firing of tube 3903 extinguishes the tube 3508. The firing of tube 3904 extinguishes the tube 3509 and primes tube 3907.

(88) The negative generator having been selected by the firing of a pulse over conductor 4002 and thence through the tube 2412, the count is advanced from the No. 1 tube 2904 to the No. 2 tube and the generator is started by the resulting pulse transmitted into the conductor 2200.

(89) The pulse over conductor 2200 is transmitted through tube 2802 to fire tube 2805 and thus extinguish the tubes 2803 and 2804.

(90) On the next cycle of the generator the synthetic subtrahend 0410 is transmitted to the accumulators. The No. 9 tube 4004 of the first accumulator register is primed over the conductor 1603—9 (transformer 1915) and fired over the conductor 1604—0, through tube 3901, conductor 3403, to the common firing circuit for the tubes of the first order accumulator register. The No. 9 tube of the second order accumulator register is primed over the conductor 1603—9 and fired over conductor 1604—0 through tube 3303, conductor 3301, tube 3501, tube 3902, conductor 3404 to the common firing point for the tubes of the second denominational order accumulator register. In like manner the No. 5 tube and the No. 8 tube of the third and fourth orders, respectively, are fired through the tubes 3700 and 3903, 3701 and 3904 so that the value 9958, the nine's complement of 0041 is transferred to the accumulators.

(91) The remaining operations are the same as those hereinbefore described so that the accumulators will be finally brought to express the value 0003 and the count on the root digit counters (Fig. 29) will be 210. On the final restoration the pulse over conductor 2407, through tube 2013, thence over conductor 2014 will fire the tubes 2803 and 2804 and again restore the tube 2805. On this last operation the tube 2804 will transmit a pulse into the conductor 2811, through the tube 2801, the conductor 1721 to fire the tube 3909.

(92) Tube 3909 transmits a pulse into the conductor 3912 to order the display by firing the tubes 4700, 4404, 4405, 4406, 4407, 4303, 4304, 4608, 4609, 4900, 4901, 4902 and 4702.

(93) The firing of tube 4700 extinguishes the tube 4709 and the triode 4710.

(94) Tube 4700 in firing transmits a pulse over conductor 4701 through the plus memory tube 4402, the tube 4404 to fire the tube 4408.

(95) The tube 4408 causes the display of its associated lamp to indicate a positive sign.

(96) The pulse from the plus memory tube will also find a path through the tube 4406 to the plus generator selector wire.

(97) The pulse for starting the generator came from the firing of the zero tube 2915 in the third denominational order root digit counter.

(98) The generator now goes through a cycle and transfers the remainder 0003 to the tubes 4300, 4310, 4600 and the No. 3 tube in the last denominational order (Fig. 26) and the root counters to express the value 210.

(99) The No. 2 tube in the first denominational order of the root digit counters (Fig. 49), by way of example, is primed over conductor 1601—2 and fired over conductor 1602—2. The No. 2 tube located in the line between tubes 2904 and tube 2905, conductor 2920, tube 4900 to the common firing point for the tubes of the first order root display tubes. Each of the tubes in Figs. 46 to 49 has associated with it a signal lamp which now becomes lighted to indicate the values above stated.

(100) At the end of this last generator cycle the pulse over the end of cycle wire 2212 now passes through tube 4702 and operates the tube 4703 which in turn operates the triode 4704 and depresses the potential momentarily on source (1). This causes a large number of tubes to become extinguished including tubes 2009, 2010, 2001, 2307, 3501, 3502, 3503, 3504, 3901, 3902, 3903, 3904, 3909, 4700 and 4702.

(101) The extinguishment of tube 4702 causes the tube 4715 to fire whereupon tubes 4703 and 4704 are extinguished.

(102) This completes the operation of extracting the square root of the number 0450.

(103) It may be noted that if the clearing key is operated in order to prepare the device for another operation, that the following tubes will be extinguished through the momentary depression of the potential on source (3): Tubes 2008, 2013, 2015, 2212, 2217, 2410, 2412, 2411, 2413, 2414, 2409, 2614, 2615, 2616, 2617, 2700, 2704, 2707, 2705, the No. 4 tube in the second decimal denominational order, tube 3101, the No. 2 counting tube in the first denominational order (Fig. 29), tube 2910, tube 2915, tube 3303, the No. 4 tube in the second denominational order of subtrahend counter, tube 3312, tube 3704, tubes 3802, 3805, 4000, 4026, the No. 0 tube of the second denominational order accumulator, tube 4211, the No. 0 tube of the third denominational order accumulator, tube 4511, the No. 3 tube in the fourth denominational order accumulator, tubes 4811, 4820, 4104, 2800, 2801, 2802, 2805, 2809, 3200, 3201, 3204, 3614, 3611, 3604, 3605, 3603 and 3602.

(104) It may be further noted that when a new problem has been entered and the start key has been operated, the source (2) will be momentarily depressed through the firing of tube 4709 and the operation of triode 4710 whereupon the following tubes will be extinguished: Tubes 4300, 4310, 4303, 4304, 4408, 4404, 4405, 4406, 4407, 4402, 4600, 4608, the No. 3 tube in the fourth denominational order display, tube 4609, the No. 2 tube in the first denominational order root digit display, the No. 1 tube in the second denominational order, the No. 0 tube in the third denominational order and tubes 4900, 4901 and 4902.

(105) For the purpose of visualizing some of the operations the following table is submitted:

*Generator cycle*

| No. | Purpose | Started By |
|---|---|---|
| 1 | Entry of 0 | Entry key. |
| 2 | Entry of 4 | Do. |
| 3 | Entry of 5 | Do. |
| 4 | Entry of 0 | Do. |
| 5 | Transfer of 0450 to accumulators | Start key. |
| 6 | Transfer of 9899 | Tube 2901. |
| 7 | Transfer of 9699 | Tube 2902. |
| 8 | Transfer of 9499 | Tube 2903. |
| 9 | Transfer of 0500 | Tube 2904. |
| 10 | Transfer of 9958 | No. 2 tube—1st counter. |
| 11 | Transfer of 9956 | Tube 2908. |
| 12 | Transfer of 0043 | Tube 2909. |
| 13 | Transfer of 9995 | Tube 2910. |
| 14 | Transfer of 0004 | Tube 2914. |
| 15 | Display of result | Tube 2915. |

What is claimed is:

1. In an electronic calculator, open chains and closed rings each comprising a plurality of electronic devices in a circuit arrangement having a common input circuit and a common output circuit, the devices of said chains and rings being successively responsive to the pulses of a train of serially relation pulses applied to the said input circuits thereof, the said chains each being responsive to a train of pulses not more in number than the number of devices in a said chain and the said rings each having reentrant circuits and being responsive to a train of an unlimited number of pulses, each said device upon operation creating and transmitting a pulse into its output circuit, a plurality of accumulators each consisting of the combination of an open chain and a closed ring having the output circuit of each connected to the input circuit of the other and means for selectively operating the devices of the open chains of said accumulators.

2. In an electronic calculator, open chains and closed rings each comprising a plurality of electronic devices in a circuit arrangement having a common input circuit and a common output circuit, the devices of said chains and rings being successively responsive to the pulses of a train of serially related pulses applied to the said input circuits thereof, the said chains each being responsive to a train of pulses not more in number than the number of devices in a said chain and the said rings each having reentrant circuits and being responsive to a train of an unlimited number of pulses, each said device upon operation creating and transmitting a pulse into its output circuit, a plurality of decimal accumulators each consisting of the combination of an open chain of ten devices and a closed ring of ten devices having the output circuit of each connected to the input circuit of the other and means for selectively operating the devices of the said open chains of said accumulators.

3. In an electronic calculator, open chains and closed rings each comprising a plurality of electronic devices in a circuit arrangement having a common input circuit and a common output circuit, the devices of said chains and rings being successively responsive to the pulses of a train of serially related pulses applied to the said input circuits thereof, the said chains each being responsive to a train of pulses not more in number than the number of devices in a said chain and the said rings each having reentrant circuits and being responsive to a train of an unlimited number of pulses, each said device upon operation creating and transmitting a pulse into its output circuit, a plurality of decimal accumulators each consisting of the combination of an open chain of ten devices and a closed ring of ten devices having the output circuit of each connected to the input circuits of the other carry devices for each said accumulator consisting of an electronic device responsive to a complete operation of the said closed ring thereof for transmitting a pulse into the said input circuit of the said closed ring of the said accumulator of the next higher decimal denominational order, and means for selectively operating the devices of the said open chains of said accumulators.

4. In an electronic accumulator, an array of electronic devices adapted to represent the decimal digits 0 to 9 inclusive, an electronic device connected to said array and adapted to represent a "carry of one," and means whereby energization of the "9" representation device will simultaneously prime said carry device and said "0" representation device.

5. In an electronic calculator, a closed ring of ten electronic devices arranged in the order 0 to 9, inclusive in a circuit arrangement including a common energizing circuit, a priming circuit controlled by each said device for rendering the next in order of said devices capable of response to a pulse transmitted over said common circuit, and an extinguishing circuit between each of said devices and its preceding in order device for extinguishing a previously operated device responsive to the operation of the said device, a carry device connected to said common energizing circuit, said priming circuit from the number 9 of said devices additionally extending to said carry device, whereby said carry device and the number 0 of said devices will simultaneously respond to a pulse over said common energizing circuit.

6. In an electronic calculator, open chains and closed rings each comprising a plurality of electronic devices in a circuit arrangement having a common input circuit and a common output circuit, the devices of said chains and rings being successively responsive to the pulses of a train of serially related pulses applied to the said input circuits thereof, the said chains being responsive to a train of pulses not more in number than the number of devices in a said chain and the said rings each having reentrant circuits and being responsive to a train of an unlimited number of pulses, each said device upon operation creating and transmitting a pulse into its output circuit, a plurality of decimal accumulators each consisting of the combination of an open chain of ten devices and a closed ring of ten devices having the output circuit of each connected to the input circuit of the other, means for selectively operating the devices of the said open chains of said accumulators whereby the devices of said associated open chain and closed rings will alternately operate and transmit a pulse into the input circuit of the other, the said chain automatically counting down to zero from the said selectively operated device and controlling said ring to automatically count up an equal number of steps, carry devices for each said accumulator consisting of an electronic device responsive to every tenth pulse of the said common energizing circuit of said ring, a normal position electronic device for each open chain of said accumulators responsive in operation to the completion of the said counting down to zero of each said open chain and means jointly responsive to the operation of all of said normal position devices for causing each of the operated one of said carry devices to transmit a pulse into the said input circuit of the closed ring of the next higher order accumulator.

7. In an electronic calculator, open chains and closed rings each comprising a plurality of electronic devices in a circuit arrangement having a common input circuit and a common output circuit, the devices of said chains and rings being successively responsive to the pulses of a train of serially related pulses applied to the said input circuits thereof, the said chains being responsive to a train of pulses not more in number than the number of devices in a said chain and the said rings each having reentrant circuits and being responsive to a train of an unlimited number of pulses, each said device upon operation creating and transmitting a pulse into its output circuit, a plurality of decimal accumulators each consisting of the combination of an open chain of ten devices and a closed ring of ten devices having the output circuit of each connected to the input circuit of the other, means for selectively operating the devices of the said open chains of said accumulators whereby the devices of said associated open chain and closed rings will alternately operate and transmit a pulse into the input circuit of the other, the said chain automatically counting down to zero from the said selectively operated device and controlling said ring to automatically count up an equal number of steps, carry devices for each said accumulator consisting of an electronic device responsive to every tenth pulse of the said common energizing circuit of said ring, a normal position electronic device for each open chain of said accumulators responsive in operation to the completion of the said counting down to zero of each said open chain and means jointly responsive to the operation of all of said normal position devices for causing each of the operated one of said carry devices to transmit a pulse into the said input circuit of the closed ring of the next higher order accumulator, and means for signaling the completion of said carry operations.

8. An electronic accumulator comprising a closed ring circuit of high vacuum trigger devices each said device connected to an output circuit for transmitting a pulse thereover and a common triggering-on circuit for said ring, an electronic register adapted to register digital values and comprising an open chain of similar electronic devices, each said device connected to an output circuit for transmitting a pulse thereover and a common triggering-on circuit for said open chain, means for selectively operating the devices of said chain and means for thereupon automatically operating said chain to count down to zero and said ring to count up a corresponding number consisting of a connection between the output circuit of said ring and the triggering-on circuit of said chain and a similar connection between the output circuit of said chain and the triggering-on circuit of said ring.

9. In an electronic calculator, open chains and closed rings each comprising a plurality of electronic devices in a circuit arrangement having a common input circuit and a common output circuit, and in which each device in operation prepares the next device in order to respond to energization over its common input circuit, the devices of said chains and rings being successively responsive to the pulses of a train of serially related pulses applied to the said input circuits thereof, the said chains each being responsive to a train of pulses not more in number than the number of devices in a said chain and the said rings each having reentrant circuits and being responsive to a train of an unlimited number of pulses, each said device upon operation creating and transmitting a pulse into its output circuit, a plurality of decimal accumulators each consisting of the combination of an open chain of ten devices arranged in reverse order 9 to 0 inclusive and a closed ring of ten devices arranged in normal order 0 to 9 inclusive, having the output circuit of each connected to the input circuit of the other and means for selectively operating the devices of the said open chain of said accumulators.

10. In an electronic calculator, open chains and closed rings each comprising a plurality of electronic devices in a circuit arrangement having a common input circuit and a common output circuit, the devices of said chains and rings being successively responsive to the pulses of a train of serially related pulses applied to the said input circuits thereof, the said chains being responsive to a train of pulses not more in number than the number of devices in a said chain and the said rings each having reentrant circuits and being responsive to a train of an unlimited number of pulses, each said device upon operation creating and transmitting a pulse into its output circuit, a plurality of decimal accumulators each consisting of the combination of an open chain of ten devices and a closed ring of ten devices having the output circuit of each connected to the input circuit of the other, means for selectively operating the devices of the said open chains of said accumulators whereby the devices of said associated open chain and closed rings will alternately operate and transmit a pulse into the input circuit of the other, the said chain automatically counting down to zero from the said selectively operated device and controlling said ring to automatically count up an equal number of steps, carry devices for each said accumulator consisting of an electronic device responsive to every tenth pulse of the said common energizing circuit of said ring, a normal position electronic device for each open chain of said accumulators responsive in operation to the completion of said counting down to zero of each said open chain and means jointly responsive to the operation of all of said normal position devices for causing each of the operated one of said carry devices to transmit a pulse into the said input circuit of the closed ring of the next higher order accumulator, a means associated with each said accumulator for by-passing a carry device when no carry is indicated, and means for signaling the completion of said carry operations.

SAMUEL B. WILLIAMS.

REFERENCES CITED

The following references are of record in the file of this patent:

UNITED STATES PATENTS

| Number | Name | Date |
|---|---|---|
| 1,294,507 | Martin | Feb. 18, 1919 |
| 2,099,065 | Holden | Nov. 16, 1937 |
| 2,146,862 | Shumard | Feb. 14, 1939 |
| 2,158,285 | Koch | Mar. 16, 1939 |
| 2,226,885 | Williams et al. | Dec. 31, 1940 |
| 2,293,177 | Skellett | Aug. 18, 1942 |
| 2,401,621 | Desch | June 4, 1946 |
| 2,401,657 | Mumma | June 4, 1946 |
| 2,402,988 | Dickinson | July 2, 1946 |
| 2,402,989 | Dickinson | July 2, 1946 |
| 2,404,047 | Flory et al. | July 16, 1946 |
| 2,404,697 | Desch | July 23, 1946 |
| 2,404,739 | Mumma | July 23, 1946 |
| 2,405,096 | Mumma | July 30, 1946 |
| 2,405,664 | Mumma | Aug. 13, 1946 |
| 2,422,583 | Mumma | June 17, 1947 |
| 2,426,278 | Mumma | Aug. 26, 1947 |
| 2,426,279 | Mumma | Aug. 26, 1947 |

FOREIGN PATENTS

| Number | Country | Date |
|---|---|---|
| 542,927 | Great Britain | Feb. 3, 1942 |

OTHER REFERENCES

Wynn-Williams "The Use of Thyratrons for High Speed Automatic Counting of Physical Phenomena," Proc. of Royal Society, Series A, vol. 132 (1931) pages 295–309.

Getting, "Two-Pulse Oxcillator," R. S. I., Nov. 1937, vol. 8, pages 412–13.

Stevenson and Getting, "A Vacuum Tube Circuit for Scaling Down Counting Rates," R. S. I., Nov. 1937, vol. 8, pages 414–416.

Lifschutz and Lawson, "A Triode Vacuum tube Scale-of-Two Circuit," R. S. I., Mar. 1938, vol. 9, pages 83–89.